United States Patent
Tachibana et al.

(10) Patent No.: US 9,815,522 B2
(45) Date of Patent: Nov. 14, 2017

(54) BICYCLE SHIFTING APPARATUS

(71) Applicant: SHIMANO INC., Sakai (JP)

(72) Inventors: Hiroshi Tachibana, Sakai (JP); Kazuhiro Fujii, Sakai (JP); Yuta Mizutani, Sakai (JP); Keijiro Nishi, Sakai (JP); Yuki Kataoka, Sakai (JP); Ryuichiro Takamoto, Sakai (JP); Ayumi Kato, Sakai (JP)

(73) Assignee: SHIMANO INC., Sakai (JP)

( * ) Notice: Subject to any disclaimer, the term of this patent is extended or adjusted under 35 U.S.C. 154(b) by 105 days.

(21) Appl. No.: 14/956,717

(22) Filed: Dec. 2, 2015

(65) Prior Publication Data

US 2017/0158285 A1    Jun. 8, 2017

(51) Int. Cl.
*B62M 9/122* (2010.01)
*B62M 25/08* (2006.01)
*G05B 15/02* (2006.01)

(52) U.S. Cl.
CPC ............ *B62M 9/122* (2013.01); *B62M 25/08* (2013.01); *G05B 15/02* (2013.01)

(58) Field of Classification Search
None
See application file for complete search history.

(56) References Cited

U.S. PATENT DOCUMENTS

| 7,900,946 B2 | 3/2011 | Hara et al. |
| 2005/0227798 A1* | 10/2005 | Ichida ................... B62K 23/06 474/81 |

* cited by examiner

*Primary Examiner* — Justin Holmes
*Assistant Examiner* — Timothy M Hannon
(74) *Attorney, Agent, or Firm* — Mori & Ward, LLP

(57) ABSTRACT

A bicycle shifting apparatus comprises a shifting controller. The shifting controller is configured to control one of a front shifting device and a rear shifting device to change one of a front shift position and a rear shift position in response to a user input. The shifting controller is configured to control the other of the front shifting device and the rear shifting device to change the other of the front shift position and the rear shift position with a delay time period in conjunction with the one of the front shifting device and the rear shifting device in response to the user input. The shifting controller is configured to change the delay time period based on at least one of a gear ratio, the rear shift position, and a current rotational speed of a bicycle crank.

21 Claims, 47 Drawing Sheets

| SHIFT-MAP INFORMATION | | SPf | | | |
|---|---|---|---|---|---|
| | | LOW | | TOP | |
| SPr | USER INPUT | SHIFTING ACTION | | | |
| | | Af | Ar | Af | Ar |
| 1st | SIU2 | KEEP | UP | | |
| | SID2 | KEEP | KEEP | | |
| 2nd | SIU2 | KEEP | UP | | |
| | SID2 | KEEP | DOWN | | |
| 3rd | SIU2 | KEEP | UP | | |
| | SID2 | KEEP | DOWN | | |
| 4th | SIU2 | KEEP | UP | | |
| | SID2 | KEEP | DOWN | | |
| 5th | SIU2 | KEEP | UP | | |
| | SID2 | KEEP | DOWN | | |
| 6th | SIU2 | KEEP | UP | KEEP | UP |
| | SID2 | KEEP | DOWN | DOWN | UP |
| 7th | SIU2 | UP | DOWN | KEEP | UP |
| | SID2 | KEEP | DOWN | KEEP | DOWN |
| 8th | SIU2 | | | KEEP | UP |
| | SID2 | | | KEEP | DOWN |
| 9th | SIU2 | | | KEEP | UP |
| | SID2 | | | KEEP | DOWN |
| 10th | SIU2 | | | KEEP | UP |
| | SID2 | | | KEEP | DOWN |
| 11th | SIU2 | | | KEEP | KEEP |
| | SID2 | | | KEEP | DOWN |

*FIG. 5*

| RT1 |||
|---|---|---|
| SHIFT POSITION RANGE | REAR SHIFT POSITION | DELAY TIME PERIOD (SEC) |
| SPR1 | LOW (1st) | T1 |
| | 2nd | |
| | 3rd | |
| | 4th | |
| SPR2 | 5th | T2 |
| | 6th | |
| | 7th | |
| | 8th | |
| SPR3 | 9th | T3 |
| | 10th | |
| | TOP (11th) | |

*FIG. 10*

| RT2 | | |
|---|---|---|
| SHIFT POSITION RANGE | REAR SHIFT POSITION | DELAY TIME PERIOD (SEC) |
| SPR1 | LOW (1st) | T11 |
| | 2nd | |
| | 3rd | |
| | 4th | |
| SPR2 | 5th | T12 |
| | 6th | |
| | 7th | |
| | 8th | |
| SPR3 | 9th | T13 |
| | 10th | |
| | TOP (11th) | |

FIG. 28

| RT3 ||
|---|---|
| REAR SHIFT POSITION | DELAY TIME PERIOD (SEC) |
| LOW (1st) | T401 |
| 2nd | T402 |
| 3rd | T403 |
| 4th | T404 |
| 5th | T405 |
| 6th | T406 |
| 7th | T407 |
| 8th | T408 |
| 9th | T409 |
| 10th | T410 |
| TOP (11th) | T411 |

FIG. 30

| SHIFT POSITION RANGE | REAR SHIFT POSITION | RT5 | | |
|---|---|---|---|---|
| | | ROTATIONAL SPEED (RPM) | | |
| | | 0≦RSP0<RSP1 | RSP1≦RSP0<RSP2 | RSP2≦RSP0 |
| | | DELAY TIME PERIOD (SEC) | | |
| SPR51 | LOW (1st) | T511 | T531 | T521 |
| | 2nd | | | |
| | 3rd | | | |
| | 4th | | | |
| SPR52 | 5th | T512 | T532 | T522 |
| | 6th | | | |
| | 7th | | | |
| | 8th | | | |
| SPR53 | 9th | T513 | T533 | T523 |
| | 10th | | | |
| | TOP (11th) | | | |
| | | T5max | T5mid | T5min |

FIG. 32

| RT6 | | ROTATIONAL SPEED (RPM) | | |
|---|---|---|---|---|
| SHIFT POSITION RANGE | GEAR RATIO | 0≦RSP0<RSP1 | RSP1≦RSP0<RSP2 | RSP2≦RSP0 |
| | | DELAY TIME PERIOD (SEC) | | |
| SPR51 | 1.39 | T511 | T531 | T521 |
| | 1.56 | | | |
| | 1.70 | | | |
| | 1.86 | | | |
| SPR52 | 2.05 | T512 | T532 | T522 |
| | 2.29 or 3.12 | | | |
| | 2.60 or 3.53 | | | |
| SPR53 | 3.79 | T513 | T533 | T523 |
| | 4.08 | | | |
| | 4.42 | | | |
| | 4.82 | | | |

{ T5max — left column group }
{ T5mid — middle column group }
{ T5min — right column group }

FIG. 35

| RT7 | | |
|---|---|---|
| SHIFT POSITION RANGE | REAR SHIFT POSITION | DRIVING SPEED (CM/SEC) |
| SPR1 | LOW (1st) | V21 |
| | 2nd | |
| | 3rd | |
| | 4th | |
| SPR2 | 5th | V22 |
| | 6th | |
| | 7th | |
| | 8th | |
| SPR3 | 9th | V23 |
| | 10th | |
| | TOP (11th) | |

FIG. 38

BICYCLE SHIFTING APPARATUS

BACKGROUND OF THE INVENTION

Field of the Invention

The present invention relates to a bicycle shifting apparatus.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a shifting device configured to be electrically operated. Such shifting devices are configured to change a shift position in response to shift commands from an operating device.

SUMMARY OF THE INVENTION

In accordance with a first aspect of the present invention, a bicycle shifting apparatus comprises a shifting controller configured to control a front shifting device and a rear shifting device to change a gear ratio defined based on a front shift position of the front shifting device and a rear shift position of the rear shifting device. The shifting controller is configured to control one of the front shifting device and the rear shifting device to change one of the front shift position and the rear shift position in response to a user input. The shifting controller is configured to control the other of the front shifting device and the rear shifting device to change the other of the front shift position and the rear shift position with a delay time period in conjunction with the one of the front shifting device and the rear shifting device in response to the user input. The shifting controller is configured to change the delay time period based on at least one of the gear ratio, the rear shift position, and a current rotational speed of a bicycle crank.

With the bicycle shifting apparatus according to the first aspect, the delay time period prevents the front shifting device and the rear shifting device from simultaneously changing the front shift position and the second shift position. Thus, it is possible to suppress disengagement of a coupling member such as a chain or a belt from at least one of the front shifting device and the rear shifting device. Furthermore, the shifting controller is configured to change the delay time period based on at least one of the gear ratio, the rear shift position, and the current rotational speed of the bicycle crank. Accordingly, it is possible to adjust the delay time period in accordance with a state of a bicycle.

In accordance with a second aspect of the present invention, the bicycle shifting apparatus according to the first aspect is configured so that the shifting controller includes a storage device configured to store at least one reference time period as the delay time period. The at least one reference time period is defined based on at least one of the gear ratio, the rear shift position, and a rotational speed of the bicycle crank.

With the bicycle shifting apparatus according to the second aspect, it is possible to shorten a processing time to obtain the delay time period by using the at least one reference time period stored in the storage device.

In accordance with a third aspect of the present invention, the bicycle shifting apparatus according to the second aspect is configured so that the shifting controller includes a time-period selector configured to select, as the delay time period, one of the plurality of reference time periods based on the at least one of the gear ratio, the rear shift position, and the current rotational speed.

With the bicycle shifting apparatus according to the third aspect, it is possible to select the delay time period from among the plurality of reference time periods, shortening the processing time to obtain the delay time period.

In accordance with a fourth aspect of the present invention, the bicycle shifting apparatus according to the second or third aspect is configured so that the storage device is configured to store a plurality of reference tables each including the at least one reference time period. The plurality of reference tables are at least partly different from each other.

With the bicycle shifting apparatus according to the fourth aspect, it is possible to change the plurality of reference time period.

In accordance with a fifth aspect of the present invention, the bicycle shifting apparatus according to any one of the second to fourth aspects is configured so that the rear shifting device has a plurality of shift position ranges. At least one of the plurality of shift position ranges includes a plurality of shift positions. The at least one reference time period is configured to be set based on the plurality of shift position ranges. The at least one reference time period corresponding to each of the plurality of shift position ranges is different from each other.

With the bicycle shifting apparatus according to the fifth aspect, it is possible to simplify the configuration of the bicycle shifting apparatus.

In accordance with a sixth aspect of the present invention, the bicycle shifting apparatus according to any one of the second to fifth aspects is configured so that the rear shifting device has a plurality of shift positions as the rear shift position. The at least one reference time period is configured to be set based on the plurality of shift positions. The at least one reference time period corresponding to each of the plurality of shift positions is different from each other.

With the bicycle shifting apparatus according to the sixth aspect, it is possible to improve flexibility of changing the delay time period.

In accordance with a seventh aspect of the present invention, the bicycle shifting apparatus according to any one of the first to sixth aspects is configured so that the shifting controller is configured to output a first shifting signal to the front shifting device to change the front shift position in response to the user input. The shifting controller is configured to output a second shifting signal to the rear shifting device to change the rear shift position in response to the user input after a lapse of the delay time period from a timing at which the shifting controller outputs the first shifting signal.

With the bicycle shifting apparatus according to the seventh aspect, it is possible to simplify configuration of the rear shifting device with realizing configuration to delay shifting of the rear shifting device from shifting of the front shifting device.

In accordance with an eighth aspect of the present invention, the bicycle shifting apparatus according to the seventh aspect is configured so that the front shifting device is configured to change the front shift position to downshift in response to the first shifting signal. The rear shifting device is configured to change the rear shift position to upshift in response to the second shifting signal.

With the bicycle shifting apparatus according to the eighth aspect, downshifting of the front shifting device is performed before upshifting of the rear shifting device. This reduces a rider's load of pedaling compared with a case where upshifting of the rear shifting device is performed before downshifting of the front shifting device.

In accordance with a ninth aspect of the present invention, the bicycle shifting apparatus according to any one of the first to eighth aspects is configured so that the shifting controller is configured to output a first shifting signal to the front shifting device to change the front shift position in response to the user input. The shifting controller is configured to output a second shifting signal to the rear shifting device to change the rear shift position in response to the user input. The second shifting signal includes a delay-time signal indicating the delay time period.

With the bicycle shifting apparatus according to the ninth aspect, it is possible to simplify configuration of the front shifting device with realizing configuration to delay shifting of the rear shifting device from shifting of the front shifting device.

In accordance with a tenth aspect of the present invention, the bicycle shifting apparatus according to the ninth aspect is configured so that the rear shifting device is configured to change the rear shift position after a lapse of the delay time period indicated by the delay-time signal from a timing at which the rear shifting device receives the second shifting signal.

With the bicycle shifting apparatus according to the tenth aspect, it is possible to further simplify configuration of the front shifting device with realizing configuration to delay shifting of the rear shifting device from shifting of the front shifting device.

In accordance with an eleventh aspect of the present invention, the bicycle shifting apparatus according to the ninth or tenth aspect is configured so that the front shifting device is configured to change the front shift position to downshift in response to the first shifting signal. The rear shifting device is configured to change the rear shift position to upshift after a lapse of the delay time period indicated by the delay-time signal from a timing at which the rear shifting device receives the second shifting signal.

With the bicycle shifting apparatus according to the eleventh aspect, downshifting of the front shifting device is performed before upshifting of the rear shifting device. This reduces a rider's load of pedaling compared to a case where upshifting of the rear shifting device is performed before downshifting of the front shifting device.

In accordance with a twelfth aspect of the present invention, the bicycle shifting apparatus according to any one of the first to eleventh aspects is configured so that the rear shifting device has a low gear position and a top gear position as the rear shift position. The shifting controller is configured to set a minimum time period as the delay time period based on the low gear position. The shifting controller is configured to set a maximum time period as the delay time period based on the top gear position. The maximum time period is longer than the minimum time period.

With the bicycle shifting apparatus according to the twelfth aspect, it is possible to shorten a total time period for shifting operations of the front shifting device and the rear shifting device compared with a case where the delay time period for the low gear position is equal to the delay time period for the top gear position.

In accordance with a thirteenth aspect of the present invention, the bicycle shifting apparatus according to any one of the first to twelfth aspects is configured so that the shifting controller includes a time-period selector configured to select a maximum time period as the delay time period when the current rotational speed of the bicycle crank is equal to a first rotational speed. The time-period selector is configured to select a minimum time period as the delay time period when the current rotational speed of the bicycle crank is equal to a second rotational speed. The first rotational speed is smaller than the second rotational speed. The maximum time period is longer than the minimum time period.

With the bicycle shifting apparatus according to the thirteenth aspect, it is possible to shorten a total time period for shifting operations of the front shifting device and the rear shifting device compared with a case where the delay time period for the first rotational speed is equal to the delay time period for the second rotational speed.

In accordance with a fourteenth aspect of the present invention, the bicycle shifting apparatus according to any one of the first to thirteenth aspects is configured so that the shifting controller is configured to set the delay time period to be different in accordance with the rear shift position and the current rotational speed.

With the bicycle shifting apparatus according to the fourteenth aspect, it is possible to adjust the delay time period to a preferable value in accordance with a running state of a bicycle.

In accordance with a fifteenth aspect of the present invention, the bicycle shifting apparatus according to any one the first to fourteenth aspects is configured so that the shifting controller includes a storage device configured to store shift-map information. The shift-map information includes combinations of the front shift position of the front shifting device, the rear shift position of the rear shifting device, and a shifting action to be performed at the front shift position and the rear shift position in response to a single input command defined as the user input. The shifting controller is configured to control the front shifting device and the rear shifting device based on the shift-map information in response to the single input command.

With the bicycle shifting apparatus according to the fifteenth aspect, it is possible to easily operate the front shifting device and the rear shifting device by using the single input command with realizing configuration in which one of shifting operations of the front shifting device and the rear shifting device is delayed from the other of the shifting operations of the front shifting device and the rear shifting device.

In accordance with a sixteenth aspect of the present invention, the bicycle shifting apparatus according to the fifteenth aspect is configured so that the shifting controller is configured to control one of the front shifting device and the rear shifting device to change one of the front shift position and the rear shift position in response to the single input command based on at least one first combination defined in the shift-map information. The shifting controller is configured to control the other of the front shifting device and the rear shifting device to change the other of the front shift position and the rear shift position with the delay time period in conjunction with the one of the front shifting device and the rear shifting device in response to the single input command based on the at least one first combination defined in the shift-map information.

With the bicycle shifting apparatus according to the sixteenth aspect, it is possible to improve flexibility of controlling the front shifting device and the rear shifting device by setting the at least one first combination in the shift-map information.

In accordance with a seventeenth aspect of the present invention, the bicycle shifting apparatus according to the sixteenth aspect is configured so that the shifting controller is configured to control the front shifting device and the rear shifting device to change only one of the front shift position and the rear shift position in response to the single input command based on at least one second combination defined in the shift-map information. The at least one second combination is different from the at least one first combination.

With the bicycle shifting apparatus according to the seventeenth aspect, it is possible to improve flexibility of controlling the front shifting device and the rear shifting device by setting the at least one first combination and the at least one second combination in the shift-map information.

In accordance with an eighteenth aspect of the present invention, the bicycle shifting apparatus according to any one the first to seventeenth aspects further comprises the front shifting device and the rear shifting device.

In accordance with a nineteenth aspect of the present invention, the bicycle shifting apparatus according to any one of the first to eighteenth aspects is configured so that the shifting controller is configured to control the front shifting device to change the front shift position in response to a front shift input. The shifting controller is configured to control the rear shifting device to change the rear shift position with the delay time period in conjunction with the front shifting device in response to the front shift input.

With the bicycle shifting apparatus according to the nineteenth aspect, it is possible to delay one of shifting operations of the front shifting device and the rear shifting device from the other of the shifting operations of the front shifting device and the rear shifting device even if the shifting controller simultaneously receives the front shift input and the rear shift input.

In accordance with a twentieth aspect of the present invention, a bicycle shifting apparatus comprises a shifting controller configured to control a front shifting device and a rear shifting device to change a gear ratio defined based on a front shift position of the front shifting device and a rear shift position of the rear shifting device. The shifting controller is configured to control the front shifting device to change the front shift position in response to a front shift input. The shifting controller is configured to control the rear shifting device to change the rear shift position with a delay time period in conjunction with the front shifting device in response to a rear shift input when the shifting controller receives the front shift input and the rear shift input within a predetermined time lag. The shifting controller being configured to change the delay time period based on at least one of the gear ratio, the rear shift position, and a current rotational speed of a bicycle crank.

With the bicycle shifting apparatus according to the twentieth aspect, the delay time period prevents the front shifting device and the rear shifting device from simultaneously changing the front shift position and the second shift position. Thus, it is possible to suppress disengagement of a coupling member such as a chain or a belt from at least one of the front shifting device and the rear shifting device. Furthermore, the shifting controller is configured to change the delay time period based on at least one of the gear ratio, the rear shift position, and the current rotational speed of the bicycle crank. Accordingly, it is possible to adjust the delay time period in accordance with a state of a bicycle.

In accordance with a twenty-first aspect of the present invention, a method of controlling a front shifting device and a rear shifting device, comprising controlling, by a shifting controller, one of the front shifting device and the rear shifting device to change one of a front shift position of the front shifting device and a rear shift position of the rear shifting device in response to user input. The method comprises controlling, by the shifting controller, the other of the front shifting device and the rear shifting device to change the other of the front shift position and the rear shift position with a delay time period in conjunction with the one of the front shifting device and the rear shifting device in response to the user input. The method comprises changing the delay time period based on at least one of a gear ratio, the rear shift position, and a current rotational speed of a bicycle crank.

With the bicycle shifting apparatus according to the twenty-first aspect, the delay time period prevents the front shifting device and the rear shifting device from simultaneously changing the front shift position and the second shift position. Thus, it is possible to suppress disengagement of a coupling member such as a chain or a belt from at least one of the front shifting device and the rear shifting device. Furthermore, the delay time period is changed based on at least one of the gear ratio, the rear shift position, and the current rotational speed of the bicycle crank. Accordingly, it is possible to adjust the delay time period in accordance with a state of a bicycle.

In accordance with a twenty-second aspect of the present invention, a method of controlling a front shifting device and a rear shifting device, comprises controlling, by a shifting controller, the front shifting device to change a front shift position in response to a front shift input. The method comprises controlling, by the shifting controller, the rear shifting device to change a rear shift position with a delay time period in conjunction with the front shifting device in response to the rear shift input when the shifting controller receives the front shift input and the rear shift input within a predetermined time lag. The method comprises changing the delay time period based on at least one of a gear ratio, the rear shift position, and a current rotational speed of a bicycle crank.

With the bicycle shifting apparatus according to the twenty-second aspect, the delay time period prevents the front shifting device and the rear shifting device from simultaneously changing the front shift position and the second shift position. Thus, it is possible to suppress disengagement of a coupling member such as a chain or a belt from at least one of the front shifting device and the rear shifting device. Furthermore, the delay time period is changed based on at least one of the gear ratio, the rear shift position, and the current rotational speed of the bicycle crank. Accordingly, it is possible to adjust the delay time period in accordance with a state of a bicycle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 shows shifting actions to be performed in the bicycle shifting apparatus illustrated in FIG. 2.

FIG. 10 shows a reference table including a shift position range, a rear shift position, and a delay time period.

FIG. 28 shows a reference table including a shift position range, a rear shift position, and a delay time period of the bicycle shifting apparatus illustrated in FIG. 27.

FIG. 30 shows a reference table including a shift position range, a rear shift position, and a delay time period of the bicycle shifting apparatus illustrated in FIG. 29.

FIG. 32 shows a reference table including a shift position range, a rear shift position, and a delay time period of the bicycle shifting apparatus illustrated in FIG. 31.

FIG. 35 shows a reference table including a shift position range, a gear ratio, and a delay time period of the bicycle shifting apparatus illustrated in FIG. 34.

FIG. 38 shows a reference table including a shift position range, a rear shift position, and a driving speed of the bicycle shifting apparatus illustrated in FIG. 37.

DESCRIPTION OF THE EMBODIMENTS

Figure 1:
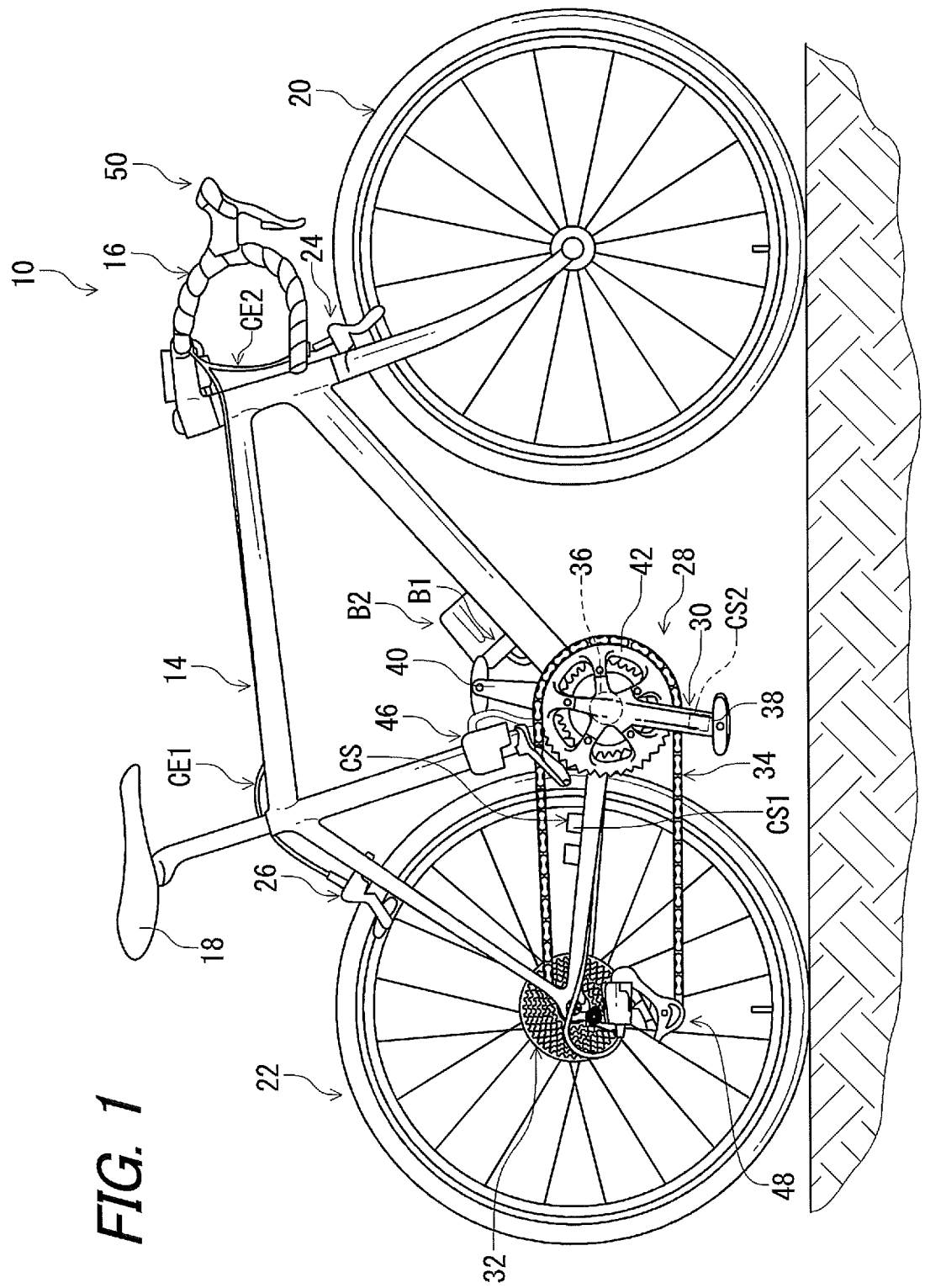
FIG. 1 is a side elevational view of a bicycle including a bicycle shifting apparatus in accordance with a first embodiment.

The embodiments will now be described with reference to the accompanying drawings, wherein like reference numerals designate corresponding or identical elements throughout the various drawings.

First Embodiment

Figure 2:
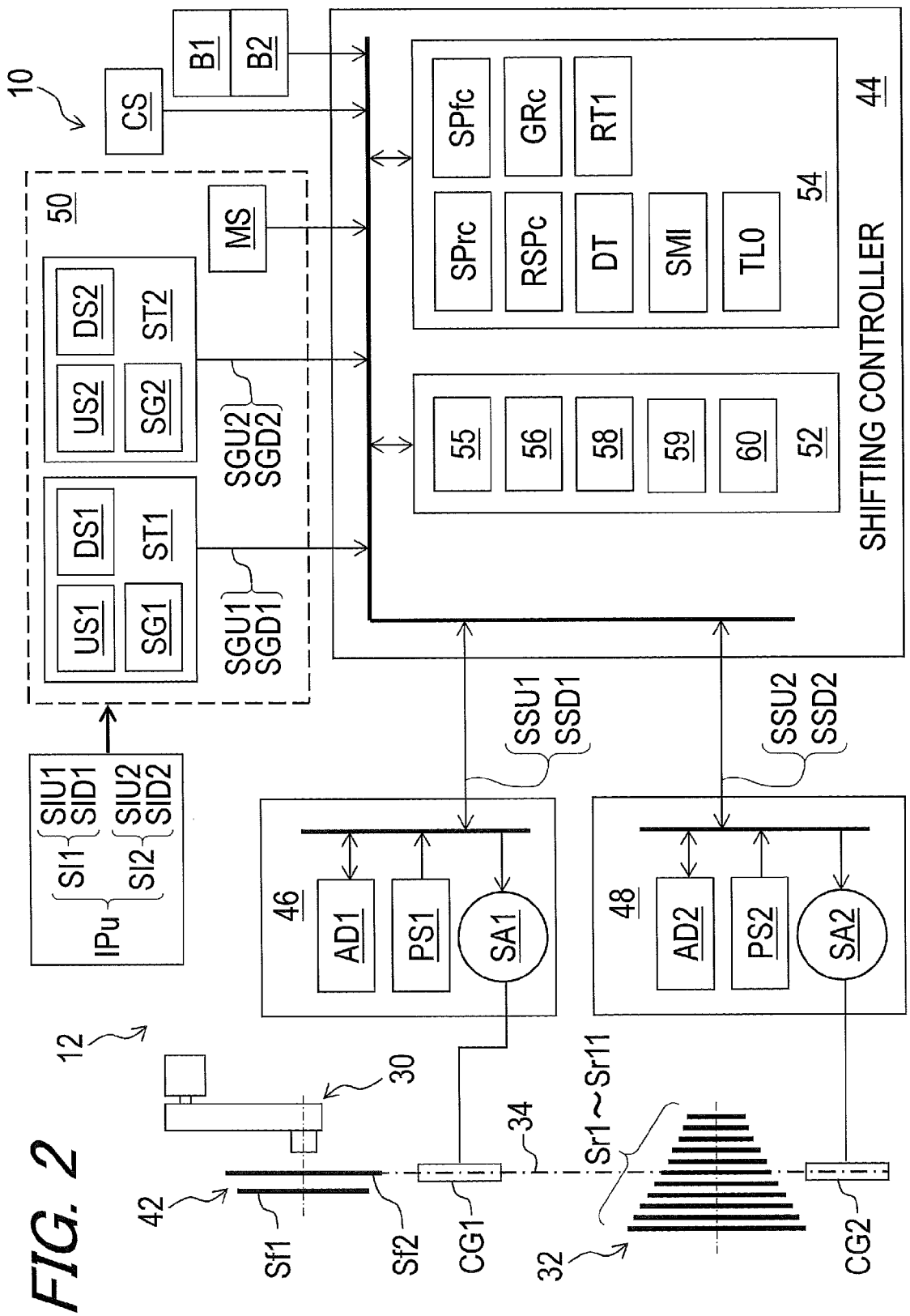
FIG. 2 is a block diagram of the bicycle shifting apparatus.

Referring initially to FIGS. 1 and 2, a bicycle 10 includes a bicycle shifting apparatus 12 in accordance with a first embodiment. As seen in FIG. 1, the bicycle 10 includes a bicycle frame 14, a handlebar 16, a saddle 18, a front wheel 20, a rear wheel 22, a front brake 24, a rear brake 26, and a drive train 28. The drive train 28 converts the rider's pedaling force into a driving force. Structures of the bicycle frame 14, the handlebar 16, the saddle 18, the front wheel 20, the rear wheel 22, the front brake 24, and the rear brake 26 have been well known in the bicycle field. Thus, they will not be described/illustrated in detail here for the sake of brevity.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle 18 of the bicycle 10 with facing the handlebar 16. Accordingly, these terms, as utilized to describe the bicycle shifting apparatus 12, should be interpreted relative to the bicycle equipped with the bicycle shifting apparatus 12 as used in an upright riding position on a horizontal surface.

The drive train 28 includes a bicycle crank 30, a rear sprocket 32, and a bicycle chain 34. The bicycle crank 30 is rotatably mounted on the bicycle frame 14. The bicycle crank 30 includes a crank axle 36, a right crank arm 38, a left crank arm 40, and a front sprocket 42. The right crank arm 38 and the left crank arm 40 are coupled to respective ends of the crank axle 36. The front sprocket 42 is coupled to the crank axle 36 via the right crank arm 38. The bicycle chain 34 is arranged on the front sprocket 42 and the rear sprocket 32 so as to extend therebetween.

As seen in FIG. 2, the front sprocket 42 includes a first front sprocket wheel Sf1 and a second front sprocket wheel Sf2. A total number of teeth of the first front sprocket wheel Sf1 is smaller than a total number of teeth of the second front sprocket wheel Sf2. The first front sprocket wheel Sf1 corresponds to low gear. The second front sprocket wheel Sf2 corresponds to top gear. In this embodiment, each of the first and second front sprocket wheels Sf1 to Sf2 has a total number of teeth shown in FIG. 3. The total number of teeth of each of the first and second front sprocket wheels Sf1 to Sf2 is not limited to this embodiment. The front sprocket 42 can include more than three sprocket wheels.

The rear sprocket 32 includes first to eleventh rear sprocket wheels Sr1 to Sr11. A total number of teeth of the first rear sprocket wheel Sr1 is smaller than a total number of teeth of the eleventh rear sprocket wheel Sr11. The first rear sprocket wheel Sr1 corresponds to low gear. The eleventh rear sprocket wheel Sr11 corresponds to top gear.

Figure 3:
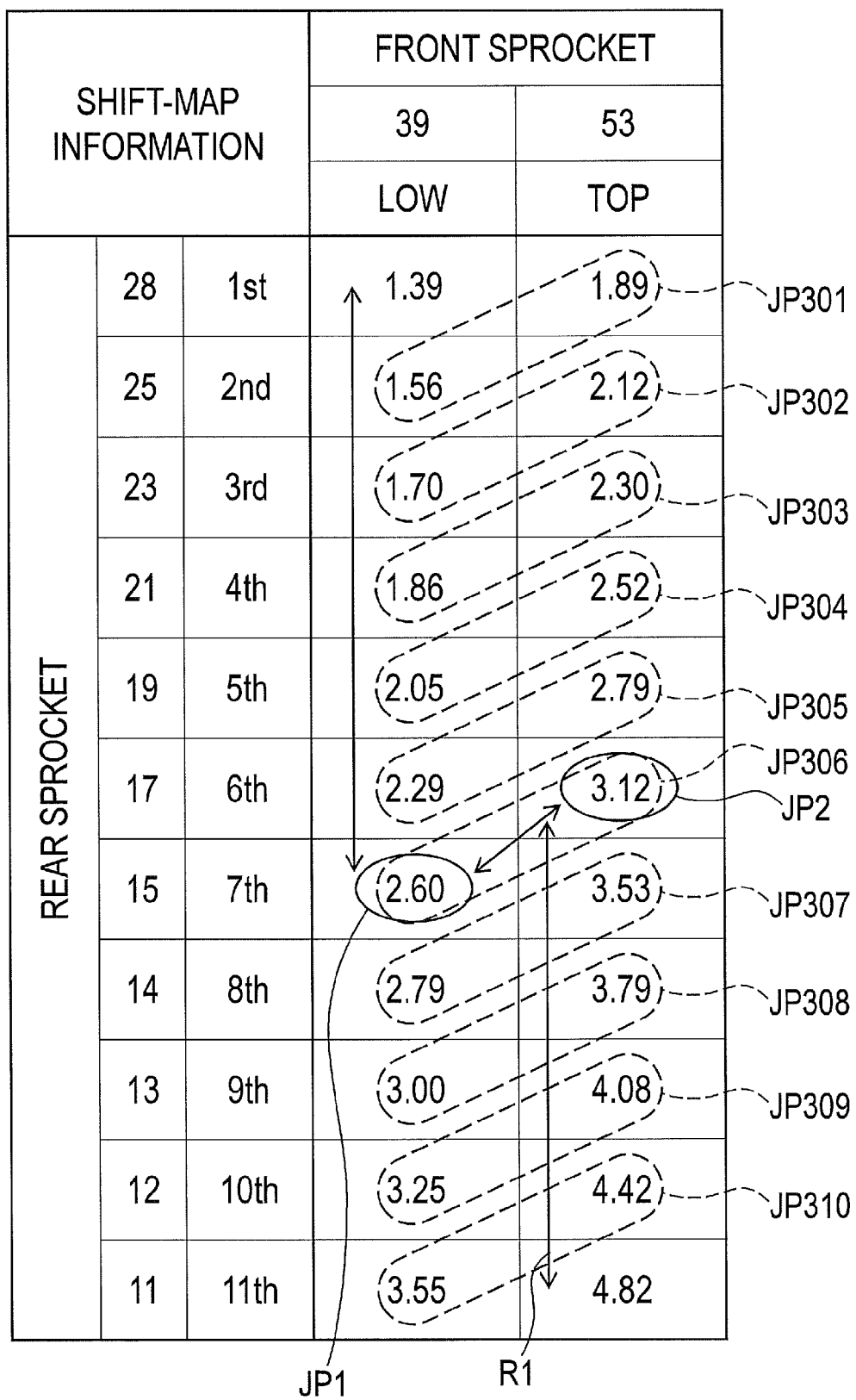
FIG. 3 shows a shift-map information of the bicycle shifting apparatus illustrated in FIG. 2.

In this embodiment, each of the first to eleventh rear sprocket wheels Sr1 to Sr11 has a total number of teeth shown in FIG. 3. The total number of teeth of each of the first and second front sprocket wheels Sf1 to Sf2 is not limited to this embodiment. The rear sprocket 32 can include more than twelve rear sprocket wheels.

As seen in FIG. 2, the bicycle shifting apparatus 12 comprises a shifting controller 44. The bicycle shifting apparatus 12 further comprises a front shifting device 46 and a rear shifting device 48. Each of the front shifting device 46 and the rear shifting device 48 is an electrically-operated shifting device. In this embodiment, as seen in FIG. 1, the front shifting device 46 includes an electric front derailleur, and the rear shifting device 48 includes an electric rear derailleur. However, the front shifting device 46 and the rear shifting device 48 can be other type of shifting device such as a belt driving structure. In such an embodiment, the bicycle chain 34 can be other coupling members such as a belt.

As seen in FIG. 2, the shifting controller 44 is configured to control the front shifting device 46 and the rear shifting device 48 to change a gear ratio defined based on a front shift position of the front shifting device 46 and a rear shift position of the rear shifting device 48. The front shifting device 46 has a low gear position and a top gear position as the front shift position. The low gear position of the front shifting device 46 corresponds to the first front sprocket wheel Sf1. The top gear position of the front shifting device 46 corresponds to the second front sprocket wheel Sf2.

The rear shifting device 48 has a low gear position and a top gear position as the rear shift position. The low gear position of the rear shifting device 48 corresponds to the first rear sprocket wheel Sr1 and can also be referred to as a first gear position of the rear shifting device 48. The top gear position of the rear shifting device 48 corresponds to the eleventh rear sprocket wheel Sr11 and can also be referred to as an eleventh gear position of the rear shifting device 48. The rear shifting device 48 further has second to tenth gear positions as the rear shift position. The second to tenth gear positions respectively correspond to the second to tenth rear sprocket wheels Sr2 to Sr10.

As seen in FIG. 3, the gear ratio of the bicycle shifting apparatus 12 is defined by the front sprocket 42 and the rear sprocket 32. Namely, the gear ratio of the bicycle shifting apparatus 12 is defined by the front shift position and the rear shift position. In this embodiment, the bicycle shifting apparatus 12 has twenty two gear ratios (i.e., speed stages). A total number of gear ratios (speed stages) is not limited to this embodiment.

As seen in FIG. 2, the bicycle 10 includes an operating device 50 to operate the front shifting device 46 and the rear shifting device 48 via the shifting controller 44. The operating device 50 is configured to receive a user input IPu and is configured to generate an input signal based on the user input IPu. The operating device 50 may include a switch or touch sensor as user operating member to receive the user input IPU. Thus, examples of the user input IPu include pushing a switch, operating a member, and touching a touch sensor.

In this embodiment, the user input IPu includes a front shift input SI1 and a rear shift input SI2. The shifting controller 44 is configured to control the front shifting device 46 in response to the front shift input SI1. The shifting controller 44 is configured to control the rear shifting device 48 in response to the rear shift input SI12.

Figure 4:
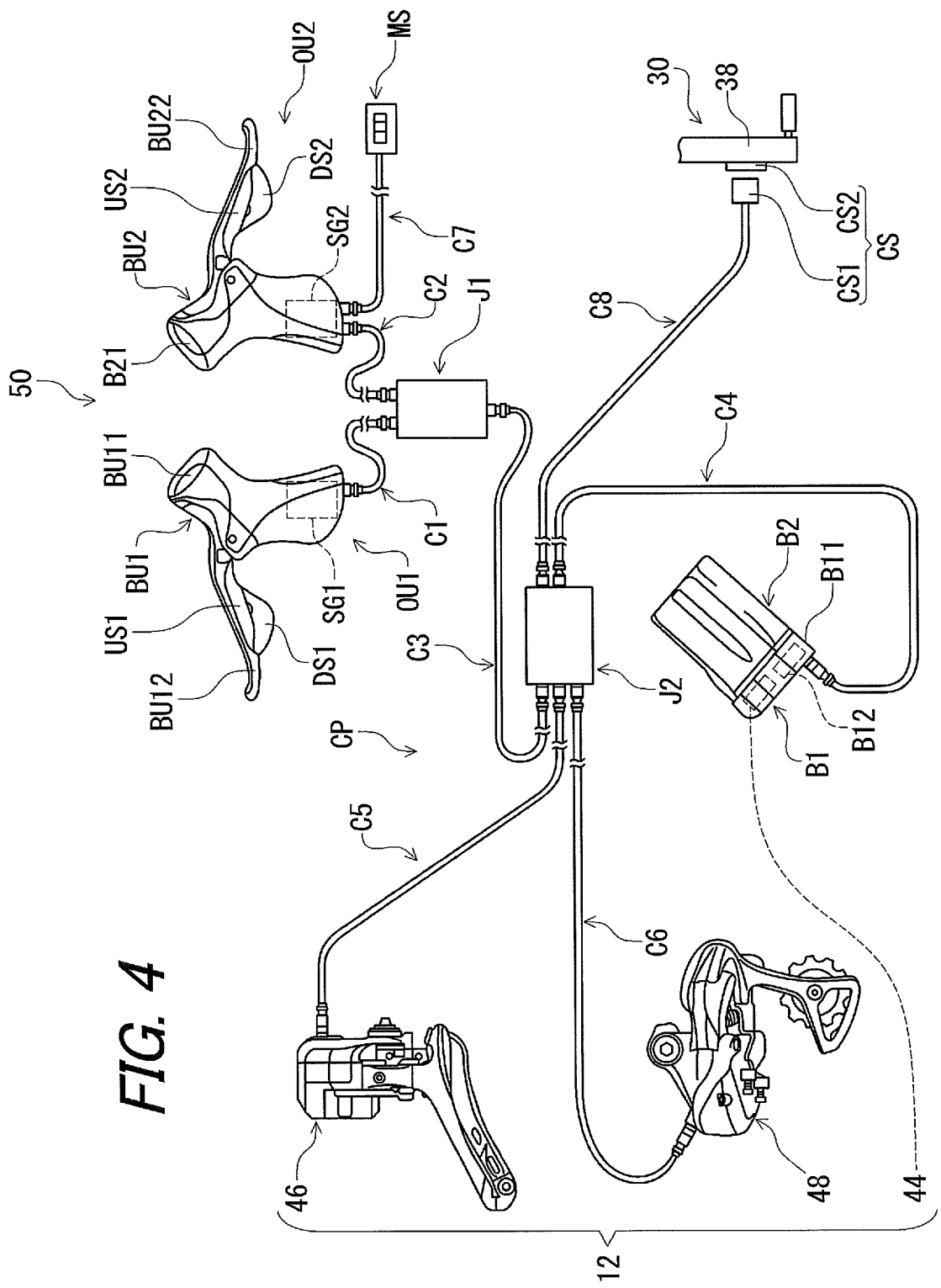
FIG. 4 is a schematic diagram showing one exemplary configuration of an electric communication path of the bicycle.

The front shift input SI1 includes a front upshift input SIU1 and a front downshift input SID1. The rear shift input SI12 includes a rear upshift input SIU2 and a rear downshift input SID2. The operating device 50 is operatively connected to the shifting controller 44. In this embodiment, the operating device 50 is electrically connected to the shifting controller 44 via an electric communication path CP (FIG. 4). However, the operating device 50 can be wirelessly connected to the shifting controller 44. In such a case, one of the operating device 50 and the shifting controller 44 may include a pairing switch to enter a pairing mode in which the operating device 50 and the shifting controller 44 are wirelessly coupled each other for wireless communication.

As seen in FIG. 1, the operating device 50 is mounted on the handlebar 16 in this embodiment. However, the location of the operating device 50 is not limited to this embodiment. The operating device 50 can be arranged at a position which is accessible by the rider.

In the present application, upshifting of the front shifting device 46 occurs when the bicycle chain 34 is shifted by the front shifting device 46 from a smaller sprocket to a neighboring larger sprocket. Downshifting of the front shifting device 46 occurs when the bicycle chain 34 is shifted by the front shifting device 46 from a larger sprocket to a neighboring smaller sprocket. Upshifting of the rear shifting device 48 occurs when the bicycle chain 34 is shifted by the rear shifting device 48 from a larger sprocket to a neighboring smaller sprocket. Downshifting of the rear shifting device 48 occurs when the bicycle chain 34 is shifted by the rear shifting device 48 from a small sprocket to a neighboring larger sprocket. Upshifting of the bicycle shifting apparatus 12 occurs when the gear ratio defined by the front shift position and the rear shift position increases. Downshifting of the bicycle shifting apparatus 12 occurs when the gear ratio defined by the front shift position and the rear shift position decreases.

As seen in FIG. 2, the operating device 50 includes a first shifter ST1 and a second shifter ST2. Each of the first shifter ST1 and the second shifter ST2 is configured to receive the user input IPu. Each of the first shifter ST1 and the second shifter ST2 is operatively connected to the shifting controller 44. In this embodiment, each of the first shifter ST1 and the second shifter ST2 is electrically connected to the bicycle shifting apparatus 12 via the electric communication path CP (FIG. 4). However, at least one of the first shifter ST1 and the second shifter ST2 can be wirelessly connected to the bicycle shifting apparatus 12.

In this embodiment, the first shifter ST1 and the second shifter ST2 are mounted on the handlebar 16. The first shifter ST1 is separately provided from the second shifter ST2. However, the locations of the first shifter ST1 and the second shifter ST2 are not limited to this embodiment. The first shifter ST1 and the second shifter ST2 can be arranged at a position which is accessible by the rider. Furthermore, the first shifter ST1 can be integrally provided with the second shifter ST2 as a single unit.

As seen in FIG. 2, the first shifter ST1 includes a first upshift switch US1, a first downshift switch DS1, and a first signal generator SG1. The first signal generator SG1 is electrically connected to the first upshift switch US1 and the first downshift switch DS1. Each of the first upshift switch US1 and the first downshift switch DS1 includes an electric switch. The first upshift switch US1 is configured to receive the front upshift input SIU1 as the user input IPu. The first downshift switch DS1 is configured to receive the front downshift input SID1 as the user input IPu.

The front upshift input SIU1 includes operating the first upshift switch US1. The front downshift input SID1 includes operating the first downshift switch DS1. The first signal generator SG1 is configured to generate a first upshift input signal SGU1 in response to the front upshift input SIU1 received by the first upshift switch US1. The first signal generator SG1 is configured to generate a first downshift input signal SGD1 in response to the front downshift input SID1 received by the first downshift switch DS1. The first upshift input signal SGU1 and the first downshift input signal SGD1 are transmitted to the bicycle shifting apparatus 12 via the electric communication path CP.

Similarly, the second shifter ST2 includes a second upshift switch US2, a second downshift switch DS2, and a second signal generator SG2. The second signal generator SG2 is electrically connected to the second upshift switch US2 and the second downshift switch DS2. Each of the second upshift switch US2 and the second downshift switch DS2 includes an electric switch. The second upshift switch US2 is configured to receive the rear upshift input SIU2 as the user input IPu. The second downshift switch DS2 is configured to receive the rear downshift input SID2 as the user input IPu.

The rear upshift input SIU2 includes operating the second upshift switch US2. The rear downshift input SID2 includes operating the second downshift switch DS2. The second signal generator SG2 is configured to generate a rear upshift input signal SGU2 in response to the rear upshift input SIU2 received by the second upshift switch US2. The second signal generator SG2 is configured to generate a rear downshift input signal SGD2 in response to the rear downshift input SID2 received by the second downshift switch DS2. The rear upshift input signal SGU2 and the rear downshift input signal SGD2 are transmitted to the bicycle shifting apparatus 1222 via the electric communication path CP (FIG. 4).

As seen in FIG. 4, the operating device 50 includes a first brake operating unit BU1 and a second brake operating unit BU2. The first brake operating unit BU1 is operatively coupled to the rear brake 26 via a connecting element CE1 (FIG. 1) such as a mechanical control cable or a hydraulic hose. The second brake operating unit BU2 is operatively coupled to the front brake 24 via a connecting element CE2 (FIG. 1) such as a mechanical control cable or a hydraulic hose.

The first brake operating unit BU1 includes a first bracket BU11 and a first brake lever BU12 pivotally coupled to the first bracket BU11. The first bracket BU11 is secured to the handlebar 16. The second brake operating unit BU2 includes a second bracket BU21 and a second brake lever BU22 pivotally coupled to the second bracket BU21. The second bracket BU21 is secured to the handlebar 16.

Structures of the first brake operating unit BU1 and the second brake operating unit BU2 have been well known in the bicycle field. Thus, they will not be described and/or illustrated in detail here for the sake of brevity.

In this embodiment, the first shifter ST1 is integrated in the first brake operating unit BU1, and the second shifter ST2 is integrated in the second brake operating unit BU2. However, the first shifter ST1 can be separately provided from the first brake operating unit BU1, and the second shifter ST2 can be separately provided from the second brake operating unit BU2.

The operating device 50 includes a mode selector MS configured to receive a user mode input to select a mode of the bicycle shifting apparatus 12. The mode selector MS is electrically connected to the bicycle shifting apparatus 12 via the electric communication path CP. The mode selector MS includes a three-position switch including a first mode position, a second mode position, and a third mode position respectively corresponding to a first mode, a second mode, and a third mode. These modes will be described later. The user mode input includes operating the three-position switch among the first mode position, the second mode position, and the third mode position. The mode selector MS allows the user to select the mode of the bicycle shifting apparatus 12 among the first mode, the second mode, and the third mode. The second signal controller SG2 detects the mode selected in the mode selector MS and outputs a mode command signal based on the user mode input.

As seen in FIG. 1, the bicycle 10 includes a battery holder B1 and a battery B2. The battery holder B1 is mounted to the bicycle frame 14 and is configured to detachably receive the battery B2. The battery B2 is electrically connected to the battery holder B1 in a state where the battery B2 is mounted to the battery holder B1. Examples of the battery B2 include a primary battery (e.g., a dry-cell battery) and a secondary battery (e.g., a rechargeable battery such as a rechargeable lithium-ion battery).

The bicycle 10 includes a rotational speed sensor CS configured to sense the rotational speed of the bicycle crank 30. For example, the rotational speed sensor CS includes a magnetic sensor CS1 and a cadence magnet CS2. The magnetic sensor CS1 is attached to the bicycle frame 14. The cadence magnet CS2 is attached to the right crank arm 38 of the bicycle crank 30. The magnetic sensor CS1 is configured to detect that the cadence magnet CS2 exists within a detection area of the magnetic sensor CS1. The magnetic sensor CS1 is provided at a position where the cadence magnet CS2 passes by the rotational speed sensor CS during pedaling. The magnetic sensor CS1 is electrically connected to the shifting controller 44. The rotational speed sensor CS is configured to periodically output a rotational speed of the bicycle crank 30 as rotations per minutes (RPM) to the shifting controller 44.

The rotational speed of the bicycle crank 30 can be obtained by other sensors such as a speed sensor configured to sense a rotational speed of the rear wheel 22. In such an embodiment, the shifting controller 44 calculates the rotational speed of the bicycle crank 30 based on the rotational speed sensed by the speed sensor, the current front shift position, the current rear shift position and a size of the rear wheel 22.

As seen in FIG. 4, the bicycle 10 includes the electric communication path CP to establish communicate among the operating device 50, the bicycle shifting apparatus 12, and the battery holder B1 using power line communication technology.

Power line communication (PLC) carries data on a conductor that is also used simultaneously for electric power transmission or electric power distribution to electric components. In this embodiment, the electric power is supplied from the battery B2 to the operating device 50 and the bicycle shifting apparatus 12 via the battery holder B1 and the electric communication path CP. Furthermore, the bicycle shifting apparatus 12 receives command signals from the operating device 50 via the electric communication path CP using the PLC.

The electric communication path CP includes a first junction J1, a second junction J2, and first to eighth cables C1 to C8. Each of the first to eighth cables C1 to C8 includes electric connectors at both ends thereof. The first shifter ST1 is electrically connected to the first junction J1 via the first cable C1. The second shifter ST2 is electrically connected to the first junction J1 via the second cable C2. The first junction J1 is electrically connected to the second electric wiring junction via the third cable C3. The second junction J2 is electrically connected to the battery holder B1 via the fourth cable C4. The second junction J2 is electrically connected to the front shifting device 46 via the fifth cable C5. The second junction J2 is electrically connected to the rear shifting device 48 via the sixth cable C6. The mode selector MS is electrically connected to the second shifter ST2 via the seventh cable C7. The rotational speed sensor CS is electrically connected to the second junction J2 via the eighth cable C8.

Each of the first to eighth cables C1 to C8 includes a ground line and a voltage line that are detachably connected to a serial bus that is formed by communication interfaces and the first and second junctions J1 and J2. Electric power is supplied from the battery B2 to the operating device 50 and the bicycle shifting apparatus 12 via the voltage line. In this embodiment, the bicycle shifting apparatus 12, the operating device 50, and the battery holder B1 can all communicate with each other through the voltage line using the power line communication technology.

In this embodiment, the shifting controller 44 is provided in the battery holder B1. The battery holder B1 includes a holder body B11 and a voltage controller B12. The voltage controller B12 is provided in the holder body B11 and includes a circuit configured to control a voltage output from the battery holder B1. In this embodiment, the shifting controller 44 is provided in the holder body B11 and is integrally provided with the voltage controller B12 as a master unit. However, the location of the shifting controller 44 is not limited to this embodiment. The shifting controller 44 can be provided at other locations such as the front shifting device 46, the rear shifting device 48, the operating device 50, the battery B2, the first junction J1, and the second junction J2.

The PLC uses unique identifying information such as a unique identifier that is assigned to each of the bicycle components. Each of the shifting controller 44, the front shifting device 46, the rear shifting device 48, and the battery holder B1 includes a memory in which the unique identifying information is stored. Based on the unique identifying information, each of the shifting controller 44, the front shifting device 46, the rear shifting device 48, and the battery holder B1 can recognize, based on the unique identifying information, information signals which are necessary for itself among information signals transmitted via the electric communication path CP. For example, the shifting controller 44 can recognize information signals transmitted from the front shifting device 46, the rear shifting device 48, and the battery holder B1 via the electric communication path CP. Instead of using the PLC technology, however, separate signal wires can be provided for transmitting data in addition to the ground wire and the voltage wire if needed and/or desired.

Since the PLC has been known in the bicycle field, they will not be described and/or illustrated in detail here for the sake of brevity. For example, a PLC controller including a filter and a voltage regulator is omitted from FIG. 2. The configuration of the electric communication path CP is not limited to the above configuration illustrated in FIG. 4.

As seen in FIG. 2, the front shifting device 46 includes a front chain guide CG1, a front shift actuator SA1, a front position sensor PS1, and a front actuator driver AD1. The front chain guide CG1 guides the bicycle chain 34 in a transverse direction of the bicycle 10 between the low gear position and the top gear position of the front sprocket 42. The position of the front chain guide CG1 corresponds to the front shift position. The front shift actuator SA1 is mechanically coupled to the front chain guide CG1. The front shift actuator SA1 is configured to move the front chain guide CG1 to shift the bicycle chain 34 relative to the front sprocket 42. In this embodiment, the front shift actuator SA1 includes a direct current motor. The front shift actuator SA1 includes a rotational shaft (not shown) to output a rotational force. The rotational shaft is coupled to the front chain guide CG1 via a gear reducer (not shown). Other examples of the front shift actuator SA1 include a stepper motor.

The front position sensor PS1 is configured to sense a position of the front shift actuator SA1 as the front shift position of the front shifting device 46. In this embodiment, the front position sensor PS1 is a contact rotational position sensor such as a potentiometer. The front position sensor PS1 is configured to sense an absolute rotational position of the rotational shaft of the front shift actuator SA1 as the front shift position of the front shifting device 46. Other examples of the front position sensor PS1 include a non-contact rotational position sensor such as an optical sensor (e.g., a rotary encoder) and a magnetic sensor CS1 (e.g., a hall sensor).

The front position sensor PS1 is electrically connected to the front actuator driver AD1. The front actuator driver AD1 is configured to control the front shift actuator SA1 based on the front shift position sensed by the front position sensor PS1. Specifically, the front actuator driver AD1 is electrically connected to the front shift actuator SA1. The front actuator driver AD1 is configured to control a rotational direction and a rotational speed of the rotational shaft based on the front shift position and a command signal transmitted from the shift controller. Furthermore, the front actuator driver AD1 is configured to stop rotation of the rotational shaft to position the front chain guide CG1 at one of the low gear position and the top gear position based on the front shift position and the command signal transmitted from the shift controller. For example, the front actuator driver AD1 includes an electric circuit configured to perform the above functions of the front actuator driver AD1.

As seen in FIG. 2, the rear shifting device 48 includes a rear chain guide CG2, a rear shift actuator SA2, a rear position sensor PS2, and a rear actuator driver AD2. The rear chain guide CG2 guides the bicycle chain 34 in the transverse direction of the bicycle 10 among the low gear position to the top gear position of the rear sprocket 32. The position of the rear chain guide CG2 corresponds to the rear shift position. The rear shift actuator SA2 is mechanically coupled to the rear chain guide CG2. The rear shift actuator SA2 is configured to move the rear chain guide CG2 to shift the bicycle chain 34 relative to the rear sprocket 32. In this embodiment, the rear shift actuator SA2 includes a direct current motor. The rear shift actuator SA2 includes a rotational shaft (not shown) to output a rotational force. The rotational shaft is coupled to the rear chain guide CG2 via a gear reducer (not shown). Other examples of the rear shift actuator SA2 include a stepper motor.

The rear position sensor PS2 is configured to sense a position of the rear shift actuator SA2 as the rear shift position of the rear shifting device 48. In this embodiment, the rear position sensor PS2 is a contact rotational position sensor such as a potentiometer. The rear position sensor PS2 is configured to sense an absolute rotational position of the rotational shaft of the rear shift actuator SA2 as the rear shift position of the rear shifting device 48. Other examples of the rear position sensor PS2 includes a non-contact rotational position sensor such as an optical sensor (e.g., a rotary encoder) and a magnetic sensor CS1 (e.g., a hall sensor).

The rear position sensor PS2 is electrically connected to the rear actuator driver AD2. The rear actuator driver AD2 is configured to control the rear shift actuator SA2 based on the rear shift position sensed by the rear position sensor PS2. Specifically, the rear actuator driver AD2 is electrically connected to the rear shift actuator SA2. The rear actuator driver AD2 is configured to control a rotational direction and a rotational speed of the rotational shaft based on the rear shift position and a command signal transmitted from the shift controller. Furthermore, the rear actuator driver AD2 is configured to stop rotation of the rotational shaft to position the rear chain guide CG2 at one of the low gear position and the top gear position based on the rear shift position and the command signal transmitted from the shift controller. For example, the rear actuator driver AD2 includes an electric circuit configured to perform the above functions of the rear actuator driver AD2.

As seen in FIG. 2, the shifting controller 44 is constituted as a microcomputer and includes a processor 52 and a storage device 54. The processor 52 includes a central processing unit (CPU) and a memory controller. The storage device 54 includes a read only memory (ROM) and a random access memory (RAM). The ROM includes a non-transitory computer-readable storage medium. The RAM includes a transitory computer-readable storage medium. The storage device 54 includes storage areas each having an address in the ROM and the RAM. The processor 52 controls the storage device 54 to store data in the storage areas of the storage device 54 and reads data from the storage areas of the storage device 54.

At least one program is stored in the storage device 54 (e.g., the ROM). The at least one program is read into the processor 52, and thereby functions of the shifting controller 44 are performed. The processor 52 and the storage device 54 are mounted on a substrate (not shown). The bicycle shifting apparatus 12 has the first mode, the second mode, and the third mode. The storage device 54 (e.g., the ROM) stores a program to perform the first mode, the second mode, and the third mode.

In the first mode, the front shifting device 46 is operated using the first shifter ST1, and the rear shifting device 48 is operated using the second shifter ST2. The front shifting device 46 and the rear shifting device 48 independently operate from each other. The front shifting device 46 and the rear shifting device 48 operate in accordance with a specific sequence when the front shifting device 46 and the rear shifting device 48 receive shifting signals from the first shifter ST1 and the second shifter ST2 within a predetermined time lag TL0.

In the second mode, the front shifting device 46 and the rear shifting device 48 are operated using only the second shifter ST2 without the first shifter ST1. The front shifting device 46 and the rear shifting device 48 operate in accordance with shift-map information (SIM) stored in the storage device 54. The shift-map information will be described later.

In the third mode, the front shifting device 46 is operated using the first shifter ST1, and the rear shifting device 48 is operated using the second shifter ST2. The front shifting device 46 and the rear shifting device 48 independently operate from each other. Unlike the first mode, the front shifting device 46 and the rear shifting device 48 operate in response to the front downshift input SID1 when the front shifting device 46 and the rear shifting device 48 are at a predetermined front shift position and a predetermined rear shift position.

In the first mode, the shifting controller 44 is configured to control the front shifting device 46 to upshift in response to only the first upshift input signal SGU1. The shifting controller 44 is configured to control the front shifting device 46 to downshift in response to only the first downshift input signal SGD1. The shifting controller 44 is configured to control the rear shifting device 48 to downshift in response to only the rear upshift input signal SGU2. The shifting controller 44 is configured to control the rear shifting device 48 to downshift in response to only the second downshift input signal SGD2.

Specifically, the shifting controller 44 is configured to control the front shifting device 46 to change the front shift position in response to the front shift input SI1. The shifting controller 44 is configured to control the rear shifting device 48 to change the rear shift position with a delay time period DT in conjunction with the front shifting device 46 in response to the rear shift input SI2 when the shifting controller 44 receives the front shift input SI1 and the rear shift input SI2 within the predetermined time lag TL0. The shifting controller 44 is configured to change the delay time period DT based on at least one of the gear ratio, the rear shift position, and a current rotational speed of the bicycle crank 30.

Figure 6:
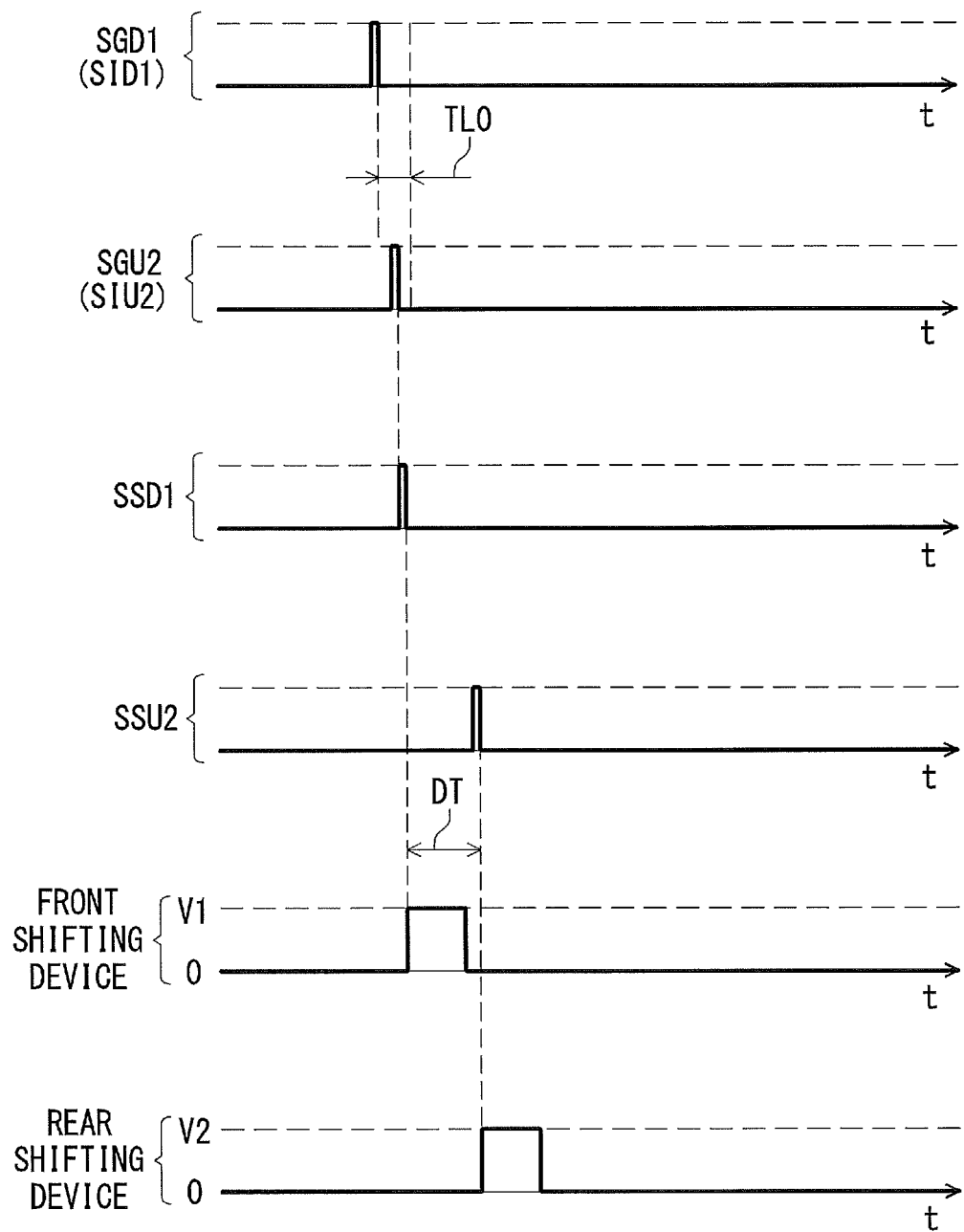
FIGS. 6 and 7 are timing charts of the bicycle shifting apparatus illustrated in FIG. 2 (first mode).
Figure 7:
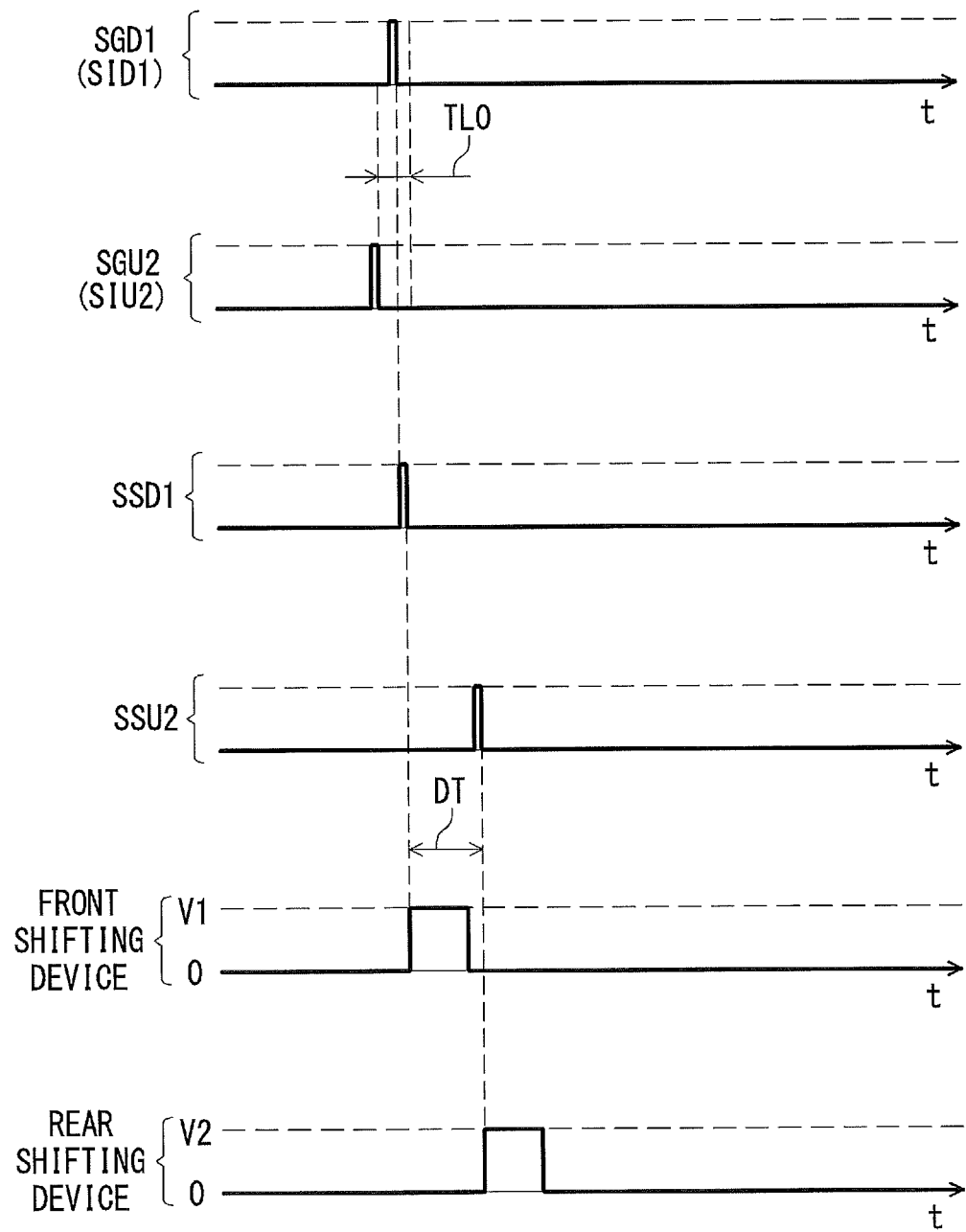

In the illustrated embodiment, as seen in FIGS. 6 and 7, the shifting controller 44 is configured to control the front shifting device 46 to downshift in response to the front downshift input SID1. At this time, the shifting controller 44 is configured to control the rear shifting device 48 to upshift with the delay time period DT in conjunction with the front shifting device 46 in response to the rear upshift input SIU2 when the shifting controller 44 receives the front downshift input SID1 and the rear upshift input SIU2 within the predetermined time lag TL0.

In the second mode, the shifting controller 44 is configured to control the front shifting device 46 and the rear shifting device 48 based on the shift-map information in response to a single input command. In this embodiment, the user input IPu includes the single input command. Each of the rear upshift input SIU2 and the rear downshift input SID2 is defined as the single input command. For example, the rear upshift input SIU2 corresponds to upshifting of the bicycle shifting apparatus 12, and the rear downshift input SID2 corresponds to downshifting of the bicycle shifting apparatus 12. In the second mode, the shifting controller 44 is unresponsive to the front upshift input SIU1 and the front downshift input SID1. However, each of the front upshift input SIU1 and the front downshift input SID1 can be defined as the single input command instead of the rear upshift input SIU2 and the rear downshift input SID2.

As seen in FIG. 2, the storage device 54 is configured to store the shift-map information (SMI). As seen in FIG. 5, the shift-map information includes combinations of the front shift position (SPf) of the front shifting device 46, the rear shift position (SPr) of the rear shifting device 48, and a shifting action to be performed at the front shift position (SPf) and the rear shift position (SPr) in response to the single input command defined as the user input IPu. The shifting action "UP" indicates upshifting of the front shifting device 46 or the rear shifting device 48. The shifting action "DOWN" indicates downshifting of the front shifting device 46 or the rear shifting device 48. The shifting action "KEEP" indicates keeping a current shift position of the front shifting device 46 or the rear shifting device 48.

In this embodiment, as seen in FIG. 3, the shift-map information includes a single route R1 defined by thirteen combinations of the front shift position and the rear shift position. Namely, the bicycle shifting apparatus 12 has thirteen speed stages in the second mode. The shifting controller 44 controls the front shifting device 46 and the rear shifting device 48 based on the shift-map information when the bicycle shifting apparatus 12 upshifts or downshifts. However, the shift-map information can include an upshifting route and a downshifting route different from the upshifting route.

As seen in FIG. 2, the shifting controller 44 includes an action selector 55. In the second mode, the action selector 55 selects, as a selected shifting action, one of available shifting actions (e.g., "UP", "DOWN", and "KEEP") defined in the shift-map information based on the current front shift position, the current rear shift position, and the user input. The action selector 55 compares the current front shift position, the current rear shift position, and the user input with the combinations defined in the shift-map information to determine the selected shifting action. In the first mode and the third mode, the action selector 55 selects one of the available shifting actions (e.g., upshifting and downshifting) as the selected shifting action based on the user input.

The shifting controller 44 includes a shift signal generator 56. The shift signal generator 56 generates the shifting signals to control the front shifting device 46 and the rear shifting device 48. Specifically, the shift signal generator 56 generates the first shifting signal and the second shifting signal based on the selected shifting action selected by the action selector 55. In this embodiment, the shift signal generator 56 generates the front upshifting signal and the front downshifting signal to control the front shifting device 46 based on the selected shifting action selected by the action selector 55. The shift signal generator 56 generates the rear upshifting signal and the rear downshifting signal to control the rear shifting device 48 based on the selected shifting action selected by the action selector 55.

Figure 8:
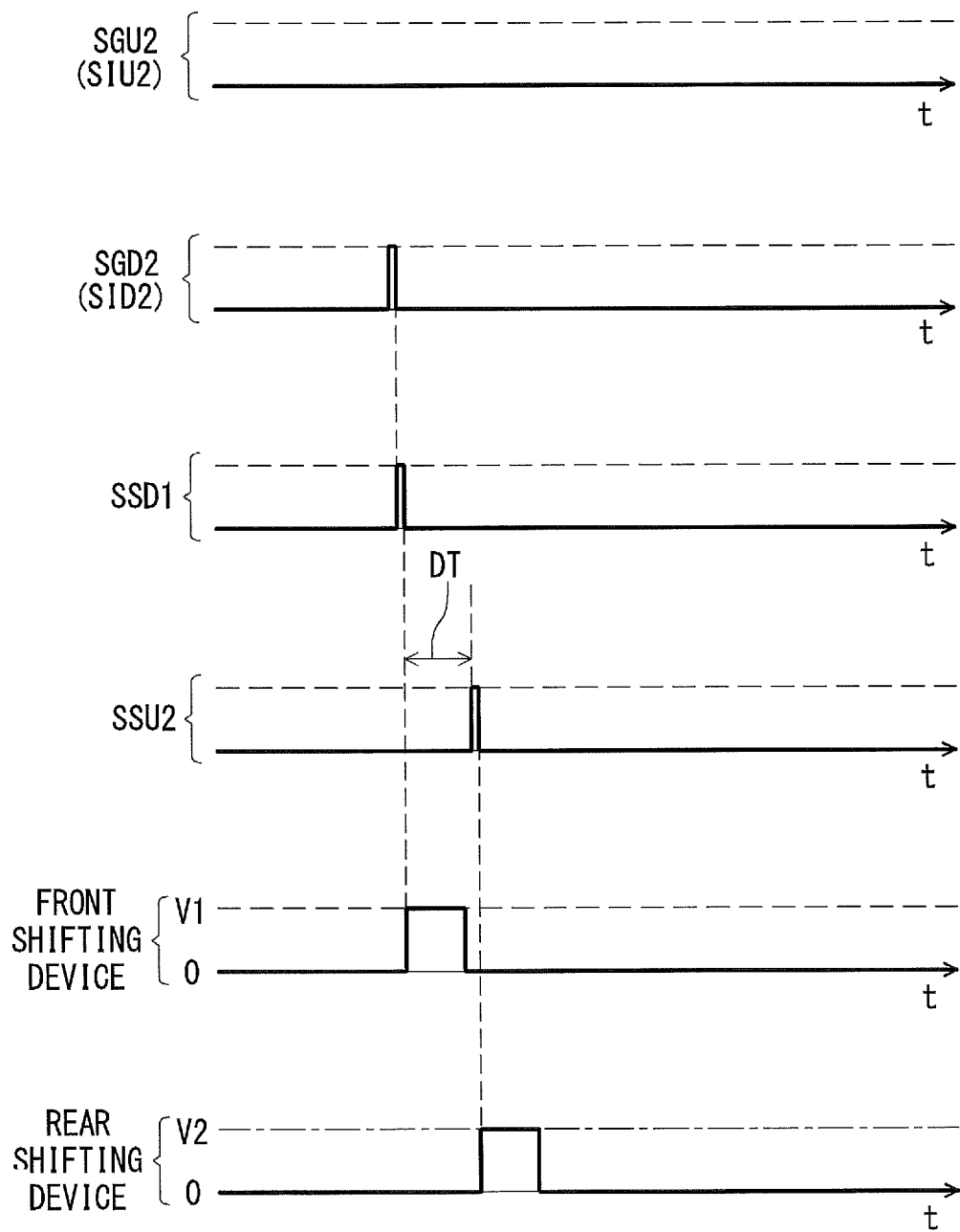
FIG. 8 is a timing chart of the bicycle shifting apparatus illustrated in FIG. 2 (second mode).

As seen in FIG. 8, the shifting controller 44 is configured to control one of the front shifting device 46 and the rear shifting device 48 to change one of the front shift position and the rear shift position in response to the user input IPu. The shifting controller 44 is configured to control the other of the front shifting device 46 and the rear shifting device 48 to change the other of the front shift position and the rear shift position with a delay time period DT in conjunction with the one of the front shifting device 46 and the rear shifting device 48 in response to the user input IPu. The delay time period DT will be described in detail later.

In this embodiment, as seen in FIG. 3, the shift-map information includes a first conjunction point JP1 and a second conjunction point JP2. FIG. 8 shows a timing chart of the bicycle shifting apparatus 12 at the second conjunction point J2 in the second mode. In the second mode, at the second conjunction point JP2, the shifting controller 44 is configured to control one of the front shifting device 46 and the rear shifting device 48 to change one of the front shift position and the rear shift position in response to the single input command based on at least one first combination defined in the shift-map information. Furthermore, at the second conjunction point JP2, the shifting controller 44 is configured to control the other of the front shifting device 46 and the rear shifting device 48 to change the other of the front shift position and the rear shift position with the delay time period DT in conjunction with the one of the front shifting device 46 and the rear shifting device 48 in response to the single input command based on the at least one first combination defined in the shift-map information. In this embodiment, the second conjunction point JP2 corresponds to the at least one first combination.

In this embodiment, at the second conjunction point JP2, the shifting controller 44 controls the front shifting device 46 to downshift in response to the rear downshift input SID2 based on the shift-map information. Furthermore, at the second conjunction point JP2, the shifting controller 44 controls the rear shifting device 48 to upshift with the delay time period DT in conjunction with the front shifting device 46 in response to the rear downshift input SID2 based on the shift-map information.

At the second conjunction point JP2, the shifting controller 44 is configured to output a first shifting signal to the front shifting device 46 to change the front shift position in response to the user input IPu. The front shifting device 46 is configured to change the front shift position to downshift in response to the first shifting signal. In this embodiment, at the second conjunction point JP2, the shifting controller 44 outputs a front downshifting signal SSD1 as the first shifting signal to the front shifting device 46 to downshift the front shifting device 46 in response to the rear downshift input SID2. The front shifting device 46 changes the front shift position to downshift in response to the front downshifting signal SSD1. The front shifting device 46 moves the front chain guide CG1 at a driving speed V1. In this embodiment, the first shifting signal can also be referred to as the front downshifting signal SSD1. However, the first shifting signal can be other shifting signals such as the front upshifting signal SSU1, the rear upshifting signal SSU2, and the rear downshifting signal SSD2.

Furthermore, at the second conjunction point JP2, the shifting controller 44 is configured to output a second shifting signal to the rear shifting device 48 to change the rear shift position in response to the user input IPu after a lapse of the delay time period DT from a timing at which the shifting controller 44 outputs the first shifting signal. The rear shifting device 48 is configured to change the rear shift position to upshift in response to the second shifting signal.

In this embodiment, as seen in FIG. 6, at the second conjunction point JP2, the shifting controller 44 outputs a rear upshifting signal SSU2 as the second shifting signal to the rear shifting device 48 to upshift the rear shifting device 48 in response to the rear upshift input SIU2 after the lapse of the delay time period DT from the timing at which the shifting controller 44 outputs the front downshifting signal SSD1. The rear shifting device 48 changes the rear shift position to upshift in response to the rear upshifting signal SSU2. The rear shifting device 48 moves the rear chain guide CG2 at a driving speed V2. In this embodiment, the second shifting signal can also be referred to as the rear upshifting signal SSU2. However, the second shifting signal can be other shifting signals such as the rear downshifting signal SSD2.

As seen in FIG. 2, the shifting controller 44 includes a first timer 58 configured to measure the lapse of the delay time period. The first timer 58 measures a time period elapsed from the timing at which the shifting controller 44 outputs the front downshifting signal SSD1. In this embodiment, the first timer 58 measures a time period elapsed from a timing at which the shift signal generator 56 generates the front downshifting signal SSD1 in response to the front downshift input signal SGD1.

As seen in FIG. 2, the shifting controller 44 includes a second timer 59 configured to measure a time period elapsed from a timing at which the shifting controller 44 receives one of the front shift input SI1 and the rear shift input SI2 in the first mode. In the illustrated embodiment, in the first mode, the second timer 59 measures a time period elapsed from a timing at which the shifting controller 44 receives one of the front downshift input SID1 and the rear upshift input SIU2.

As seen in FIG. 3, in the second mode, at the second conjunction point JP2, the shifting controller 44 controls the front shifting device 46 to keep the current front shift position and the rear shifting device 48 to upshift in response to the rear upshift input SIU2.

At the first conjunction point JP1, the shifting controller 44 controls one of the front shifting device 46 and the rear shifting device 48 to change one of the front shift position and the rear shift position in response to the single input command based on in the shift-map information. Furthermore, at the first conjunction point JP1, the shifting controller 44 is configured to control the other of the front shifting device 46 and the rear shifting device 48 to change the other of the front shift position and the rear shift position without the delay time period DT in conjunction with the one of the front shifting device 46 and the rear shifting device 48 in response to the single input command based on the shift-map information. However, at the first conjunction point JP1, the shifting controller 44 can be configured to control the other of the front shifting device 46 and the rear shifting device 48 to change the other of the front shift position and the rear shift position with an another delay time period in conjunction with the one of the front shifting device 46 and the rear shifting device 48 in response to the single input command based on the shift-map information.

In this embodiment, at the first conjunction point JP1, the shifting controller 44 controls the front shifting device 46 to upshift in response to the rear upshift input SIU2 based on the shift-map information. Furthermore, at the first conjunction point JP1, the shifting controller 44 controls the rear shifting device 48 to downshift without the delay time period DT in conjunction with the front shifting device 46 in response to the rear upshift input SIU2 based on the shift-map information. However, at the first conjunction point JP1, the shifting controller 44 can be configured to control the rear shifting device 48 to downshift without an another delay time period in conjunction with the front shifting device 46 in response to the rear upshift input SIU2 based on the shift-map information.

On the other hand, at the first conjunction point JP1, the shifting controller 44 controls the front shifting device 46 to keep the current front shift position in response to the rear downshift input SID2 based on the shift-map information. Furthermore, at the first conjunction point JP1, the shifting controller 44 controls the rear shifting device 48 to downshift in response to the rear downshift input SID2.

At points other than the first and second conjunction points JP1 and JP2 in the shift-map information, the shifting controller 44 is configured to control the front shifting device 46 and the rear shifting device 48 to change only one of the front shift position and the rear shift position in response to the single input command based on at least one second combination defined in the shift-map information. The at least one second combination is different from the at least one first combination.

For example, when the front shift position is at the low gear position and the rear shift position is each of the first to sixth gear positions, the shifting controller 44 controls the front shifting device 46 and the rear shifting device 48 to change only the rear shift position in response to the rear upshift input SIU2 based on in the shift-map information. When the front shift position is at the low gear position and the rear shift position is each of the second to sixth gear positions, the shifting controller 44 controls the front shifting device 46 and the rear shifting device 48 to change only the rear shift position in response to the rear downshift input SID2 or the rear upshift input SIU2 based on in the shift-map information. When the front shift position is at the low gear position and the rear shift position is the first gear position, the shifting controller 44 controls the front shifting device 46 and the rear shifting device 48 to keep the current rear shift position in response to the rear downshift input SID2 based on in the shift-map information.

When the front shift position is at the top gear position and the rear shift position is each of the seventh to eleventh gear positions, the shifting controller 44 controls the front shifting device 46 and the rear shifting device 48 to change only the rear shift position in response to the rear downshift input SID2 based on in the shift-map information. When the front shift position is at the top gear position and the rear shift position is each of the seventh to tenth gear positions, the shifting controller 44 controls the front shifting device 46 and the rear shifting device 48 to change only the rear shift position in response to the rear upshift input SIU2 or the rear down shift input SID2 based on in the shift-map information. When the front shift position is at the top gear position and the rear shift position is the eleventh gear position, the shifting controller 44 controls the front shifting device 46 and the rear shifting device 48 to keep the current rear shift position in response to the rear upshift input SIU2 based on in the shift-map information.

In the third mode, the shifting controller 44 is configured to control the front shifting device 46 to change the front shift position in response to the front shift input SI1. The shifting controller 44 is configured to control the rear shifting device 48 to change the rear shift position with the delay time period DT in conjunction with the front shifting device 46 in response to the front shift input SI1.

Figure 9:
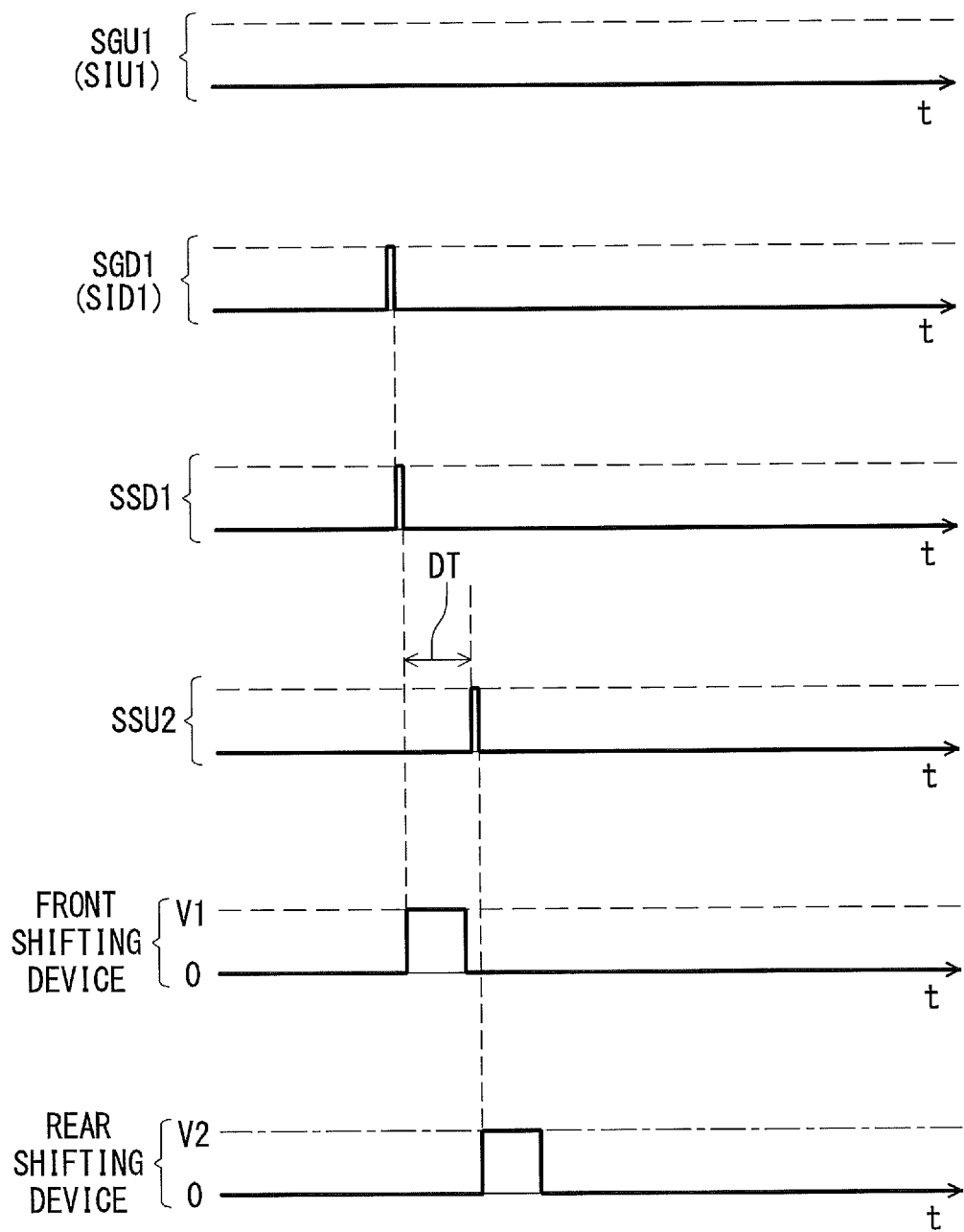
FIG. 9 is a timing chart of the bicycle shifting apparatus illustrated in FIG. 2 (third mode).

In the illustrated embodiment, as seen in FIG. 9, the shifting controller 44 is configured to control the front shifting device 46 to downshift in response to the front downshift input SID1. The shifting controller 44 is configured to control the rear shifting device 48 to upshift with the delay time period DT in conjunction with the front shifting device 46 in response to the front downshift input SID1.

The shifting controller 44 is configured to change the delay time period DT based on at least one of the gear ratio, the rear shift position, and a current rotational speed of the bicycle crank 30. In this embodiment, the gear ratio is a set gear ratio selected by the user in non-use of the bicycle shifting apparatus 12 using an application program installed in a personal computer. The personal computer is electrically connected to the bicycle shifting apparatus 12 when the user selects the gear ratio. The rear shift position is a set rear shift position selected by the user in non-use of the bicycle shifting apparatus 12 using the application program installed in the personal computer.

The current rotational speed is defined as a rotational speed of the bicycle crank 30 at a timing at which the shifting controller 44 receives the user input IPu. The shifting controller 44 is configured to recognize a current gear ratio, a current front shift position, and a current rear shift position via the front shifting device 46 and the rear shifting device 48. The current gear ratio is defined as a gear ratio at a timing at which the shifting controller 44 receives the user input IPu. The current front shift position is defined as a front shift position at a timing at which the shifting controller 44 receives the user input IPu. The current rear shift position is defined as a rear shift position at a timing at which the shifting controller 44 receives the user input IPu.

However, the current gear ratio, the current front shift position, the current rear shift position, and the current rotational speed can be defined based on other timings. Examples of such a timing include a timing at which the front shifting device 46 starts to change the front shift position, and a timing at which the rear shifting device 48 starts to change the rear shift position. At least one of the current gear ratio, the current front shift position, the current rear shift position, and the current rotational speed can be defined based on a timing different from that of the remaining of the current gear ratio, the current front shift position, the current rear shift position, and the current rotational speed.

The storage device 54 stores the current gear ratio (GRc), the current front shift position (SPfc), the current rear shift position (SPrc), and the current rotational speed (RSPc) of the bicycle crank 30. The front position sensor PS1 senses the front shift position of the front shifting device 46. The shifting controller 44 receives the front shift position sensed by the front position sensor PS1. The processor 52 controls the storage device 54 to store the front shift position sensed by the front position sensor PS11 as the current front shift position. The rear position sensor PS2 senses the rear shift position of the rear shifting device 48. The shifting controller 44 receives the rear shift position sensed by the rear position sensor PS2. The processor 52 controls the storage device 54 to store the rear shift position sensed by the rear position sensor PS2 as the current rear shift position. Namely, the shifting controller 44 is configured to detect the current front shift position and the current rear shift position using the front position sensor PS1 and the rear position sensor PS2.

The processor 52 calculates the current gear ratio based on the current front shift position and the current rear shift position. The processor 52 controls the storage device 54 to store the current gear ratio calculated by the processor 52.

As seen in FIG. 10, the storage device 54 is configured to store at least one reference time period as the delay time period DT. The at least one reference time period is defined based on at least one of the gear ratio, the rear shift position, and the rotational speed of the bicycle crank 30. In this embodiment, the storage device 54 stores a plurality of reference time periods T1, T2, and T3 as the delay time period DT. The plurality of reference time periods T1, T2, and T3 are defined based on the rear shift position without the gear ratio and the rotational speed of the bicycle crank 30.

As seen in FIG. 2, the shifting controller 44 includes a time selector 60 configured to select, as the delay time period DT, one of the plurality of reference time periods based on the at least one of the current gear ratio, the current rear shift position, and the current rotational speed. In this embodiment, the time selector 60 is configured to select, as the delay time period DT, one of the plurality of reference time periods T1, T2, and T3 based on the current rear shift position in the first mode. Since the current gear ratio is calculated based on the current front shift position and the current rear shift position, the time selector 60 can be configured to select, as the delay time period DT, one of the plurality of reference time periods T1, T2, and T3 based on the current gear ratio.

In this embodiment, the rear shifting device 48 has a plurality of shift position ranges. At least one of the plurality of shift position ranges includes a plurality of shift positions. The at least one reference time period is configured to be set based on the plurality of shift position ranges SPR1, SPR2, and SPR3. The at least one reference time period corresponding to each of the plurality of shift position ranges SPR1, SPR2, and SPR3 is different from each other. The at least one reference time period includes a plurality of reference time periods T1, T2, and T3 respectively corresponding to the plurality of shift position ranges SPR1, SPR2, and SPR3. The plurality of reference time periods T1, T2, and T3 are different from each other. The storage device 54 temporarily stores at least one of the reference time periods T1, 12, and T3 as the delay time period DT. Specifically, as seen in FIG. 10, the rear shifting device 48 has a first shift position range SPR1, a second shift position range SPR2, and a third shift position range SPR3. The first shift position range SPR1 includes the low shift position and the second to fourth rear shift positions. The second shift position range SPR2 includes fifth to eighth rear shift positions. The third shift position range SPR3 includes the ninth, tenth, and top shift positions.

The plurality of reference time periods T1, T2, and T3 respectively correspond to the plurality of shift position ranges SPR1, SPR2, and SPR3 and are different from each other. Specifically, the reference time periods includes the minimum time period T1, a middle time period 12, and the maximum time period T3. The minimum time period T1 corresponds to the first shift position range SPR1. The middle time period T2 corresponds to the second shift position range SPR2. The maximum time period T3 corresponds to the third shift position range SPR3. The minimum time period T1 is shorter than the middle time period T2. The maximum time period T3 is longer than the middle time period T2. The storage device 54 stores a reference table RT1 includes combinations of the rear shift position, the shift position range, and the reference time period.

The shifting controller 44 is configured to set the minimum time period T1 as the delay time period based on the low gear position. The shifting controller 44 is configured to set the maximum time period T3 as the delay time period based on the top gear position. The maximum time period T3 is longer than the minimum time period T1.

In this embodiment, the shifting controller 44 sets the minimum time period T1 as the delay time period DT based on each of the low gear position and the second to fourth gear positions. The shifting controller 44 sets the middle time period T2 as the delay time period DT based on each of the fifth to eighth gear positions. The shifting controller 44 sets the maximum time period T3 as the delay time period DT based on each of the ninth and tenth gear positions and the top gear position.

For example, the first and second conjunction points JP1 and JP2 of the shift-map information is selected by the user via an application program installed in a personal computer. The personal computer is electrically connected to the bicycle shifting apparatus 12 when the user selects the second conjunction point JP2 of the shift-map information among points defined by the front shift position and the second shift position. As seen in FIG. 3, the first and second conjunction points JP1 and JP2 can be selected among pairs of points JP3a to JP3j. The pairs of points JP301 to JP310 respectively correspond to the first to tenth gear positions of the rear shift position.

As seen in FIGS. 3 and 9, when one of the pair of points JP301 to JP304 is selected by the user, the shifting controller 44 is configured to set the minimum time period T1 corresponding to the selected pair of points as the delay time period DT. The shifting controller 44 is configured to set the sets the middle time period T2 as the delay time period DT when one of the pair of points JP305 to JP308 is selected by the user. The shifting controller 44 is configured to set the sets the maximum time period T3 as the delay time period DT when one of the pair of points JP309 and JP310 is selected by the user. The storage device 54 stores one of the minimum time period T1, the middle time period T2, and the maximum time period T3 which corresponds to the selected pair of points.

The method of controlling the front shifting device 46 and the rear shifting device 48 will be described below referring to FIGS. 11 to 20.

As seen in FIGS. 11 to 14, in the first mode, the method comprises controlling, by the shifting controller 44, the front shifting device 46 to change the front shift position in response to the front shift input SI1. The method comprises controlling, by the shifting controller 44, the rear shifting device 48 to change the rear shift position with the delay time period DT in conjunction with the front shifting device 46 in response to the rear shift input SI12 when the shifting controller 44 receives the front shift input SI1 and the rear shift input SI2 within the predetermined time lag TL0. The method comprises changing the delay time period DT based on at least one of the gear ratio, the rear shift position, and the current rotational speed of the bicycle crank 30.

Figure 11:
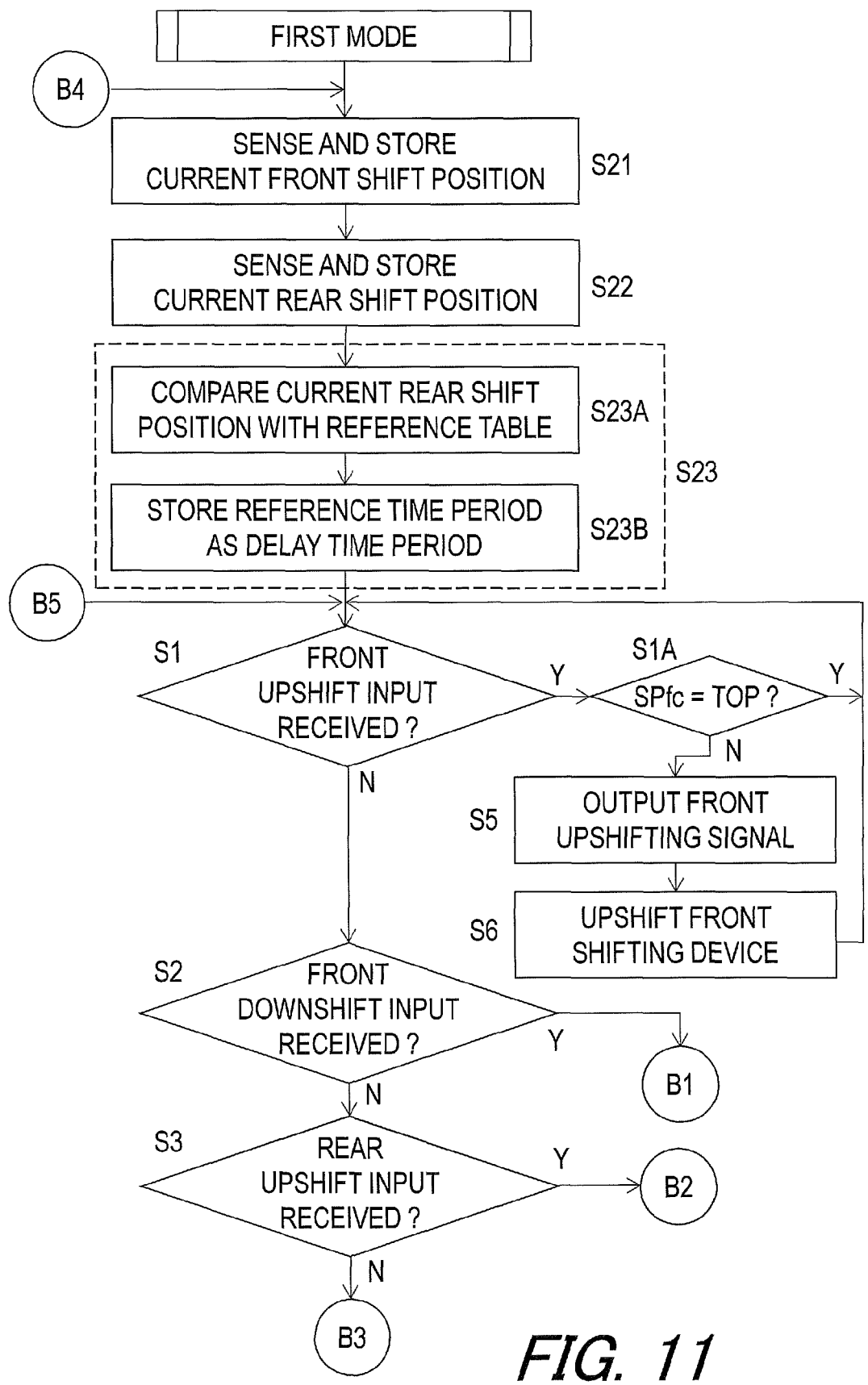
FIGS. 11 to 14 are flow charts of operation of the bicycle shifting apparatus illustrated in FIG. 2 (first mode).

As seen in FIG. 11, the current front shift position of the front shifting device 46 is sensed by the front position sensor PS1 and is stored in the storage device 54 of the shifting controller 44 (step S21). The current rear shift position of the rear shifting device 48 is sensed by the rear position sensor PS2 and is stored in the storage device 54 of the shifting controller 44 (step S22). The delay time period DT is selected by the time selector 60 from the reference time periods of the reference table RT1 (FIG. 10) stored in the storage device 54 based on the current rear shift position (step S23). Specifically, the current rear shift position is compared with the reference table RT1 by the time selector 60 (step S23A). The reference time period corresponding to the current rear shift position is stored in the storage device 54 by the processor 52 (step S23B). For example, when the current rear shift position is the sixth gear position, the reference time period T2 is stored in the storage device 54 by the processor 52 as the delay time period DT.

The shifting controller 44 determines that one of the front upshift input SIU1, the front downshift input SID1, the rear upshift input SIU2, and the rear downshift input SID2 is received by the operating device 50 (steps S1 to S4).

As seen in FIG. 11, when the shifting controller 44 concludes that the front upshift input SIU1 is received by the operating device 50, the shifting controller 44 determines that the current front shift position (SPfc) is the top gear position (steps S1 and S1A). The process returns to the step S1 when the shifting controller 44 concludes that the current front shift position is the top gear position (step S1 and S1A). The front upshifting signal SSU1 is output from the shifting controller 44 to the front shifting device 46 when the shifting controller 44 concludes that the current front shift position is not the top gear position (steps S1A and S5). The front shifting device 46 upshifts in response to the front upshifting signal SSU1 (step S6), and then the process returns to the step S1.

Figure 12:
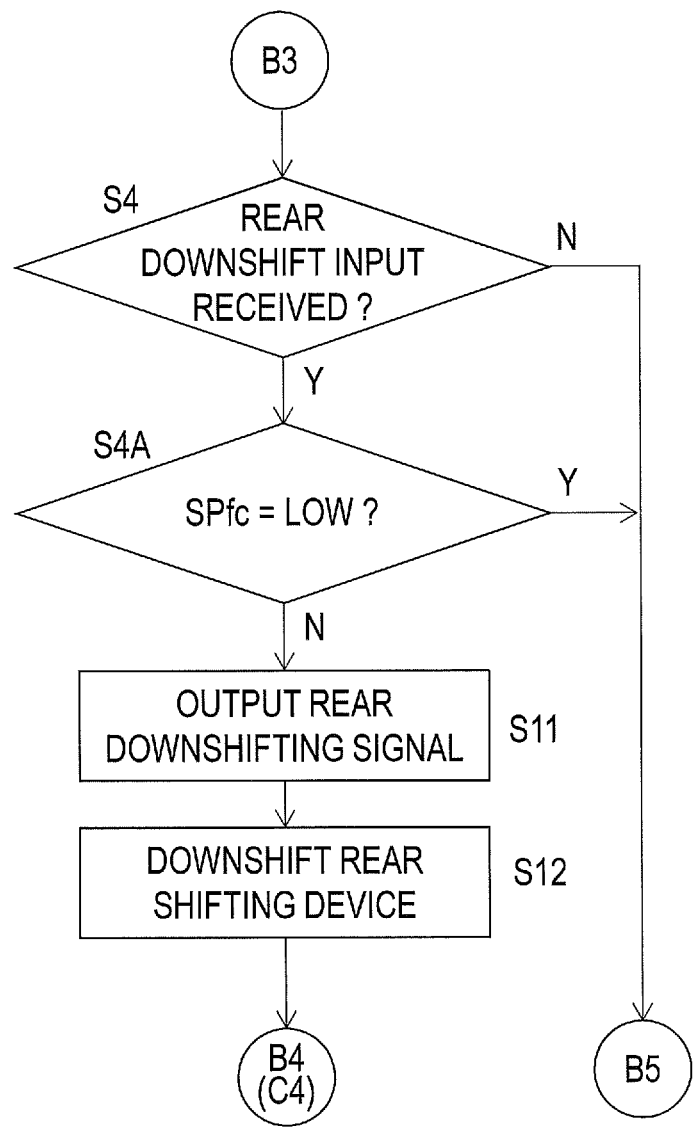

As seen in FIGS. 11 and 12, when the shifting controller 44 concludes that the rear downshift input SID2 is received by the operating device 50, the shifting controller 44 determines that the current rear shift position (SPrc) is the low gear position (steps S4 and S4A). The process returns to the step S1 when the shifting controller 44 concludes that the current rear shift position is the low gear position (steps S4 and S4A). The rear downshifting signal SSD2 is output from the shifting controller 44 to the rear shifting device 48 when the shifting controller 44 concludes that the current rear shift position is not the low gear position (steps S4A and S11).

The rear shifting device 48 downshifts in response to the rear downshifting signal SSD2 (step S12), and then the process returns to the step S1.

Figure 13:
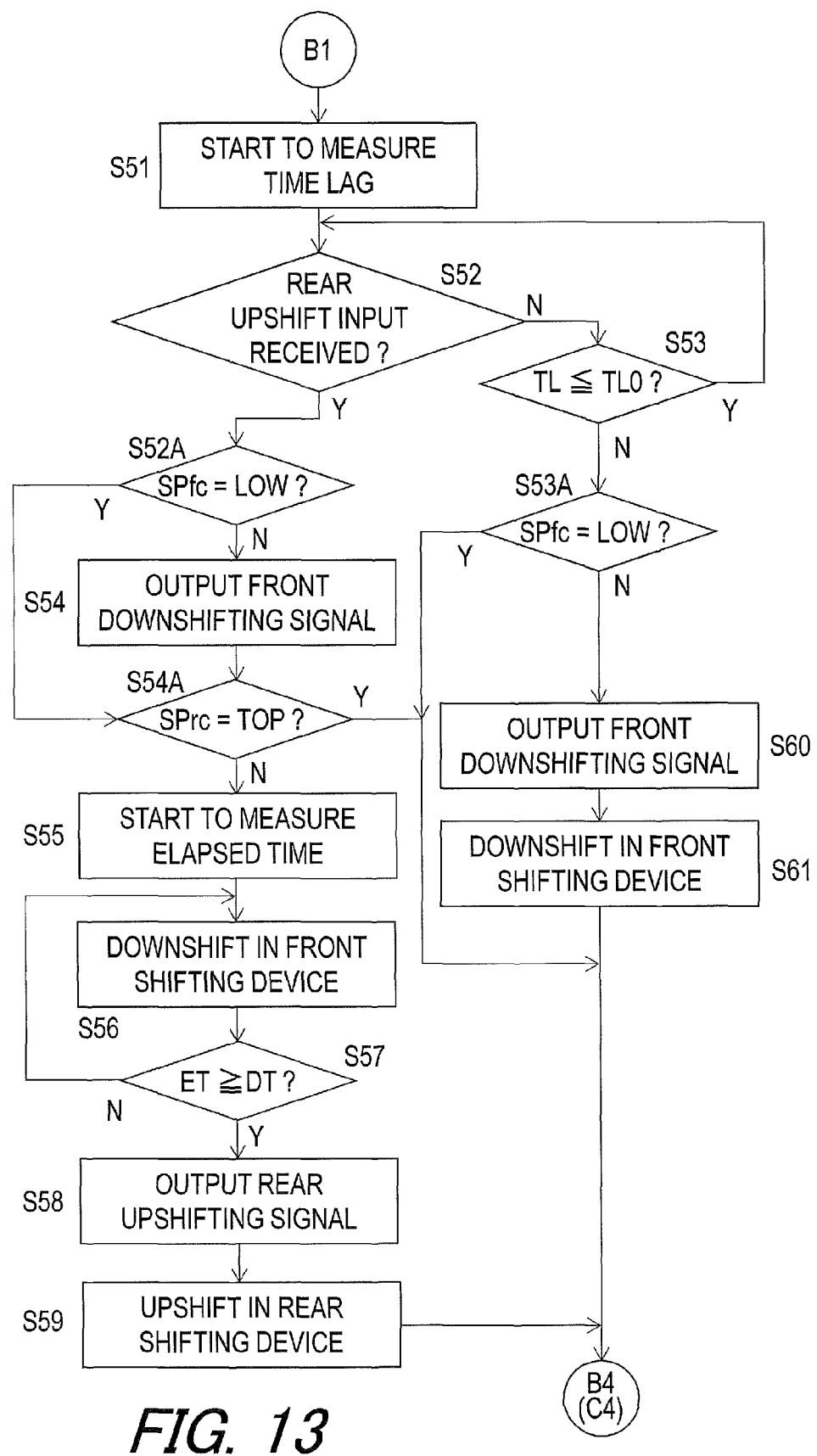

As seen in FIGS. 11 and 13, the shifting controller 44 determines that the front downshift input SID1 and the rear upshift input SIU2 are received by the operating device 50 within the predetermined time lag TL0 (steps S2, S3, and S51 to S53).

Specifically, when the shifting controller 44 concludes that the front downshift input SID1 is received by the operating device 50, the second timer 59 starts to measure a time lag TL (steps S2 and S51). The shifting controller 44 determines that the rear upshift input SIU2 is received by the shifting controller 44 (step S52). When the shifting controller 44 concludes that the rear upshift input SIU2 is not received within the predetermined time lag TL0, the shifting controller 44 determines that the current front shift position is the low gear position (step S53 and S53A). The process returns to the step S21 when the shifting controller 44 concludes that the current front shift position is the low gear position (step S53A). The front downshifting signal SSD1 is output from the shifting controller 44 to the front shifting device 46 when the shifting controller 44 concludes that the current front shift position is not the low gear position (steps S53A and S60). The front shifting device 46 downshifts by one speed stage in response to the front downshifting signal SSD1 (step S61).

When the shifting controller 44 concludes that the rear upshift input SIU2 is received within the predetermined time lag TL0, the front downshifting signal SSD1 is output from the shifting controller 44 to the front shifting device 46 (step S54). The shifting controller 44 determines that the current rear shift position is the top gear position (step S54A). The process returns to the step S21 when the shifting controller 44 concludes that the current rear shift position is the top gear position (step S54A). The first timer 58 starts to measure an elapsed time ET from at a timing at which the front downshifting signal SSD1 is output from the shifting controller 44 when the shifting controller 44 concludes that the current rear shift position is not the top gear position (steps S54A and S55). The front shifting device 46 downshifts by one speed stage in response to the front downshifting signal SSD1 (step S56).

The shifting controller 44 determines that the elapsed time ET is equal to or longer than the delay time period DT (step S57). The rear upshifting signal SSU2 is output from the shifting controller 44 when the elapsed time ET is equal to or longer than the delay time period DT (step S58). The rear shifting device 48 upshifts by one speed stage in response to the rear upshifting signal SSU2 (step S59). Thus, the rear shifting device 48 upshifts with the delay time period DT in conjunction with the front shifting device 46 in response to the rear downshift input SID2. The process returns to the step S21 of FIG. 11.

Figure 14:
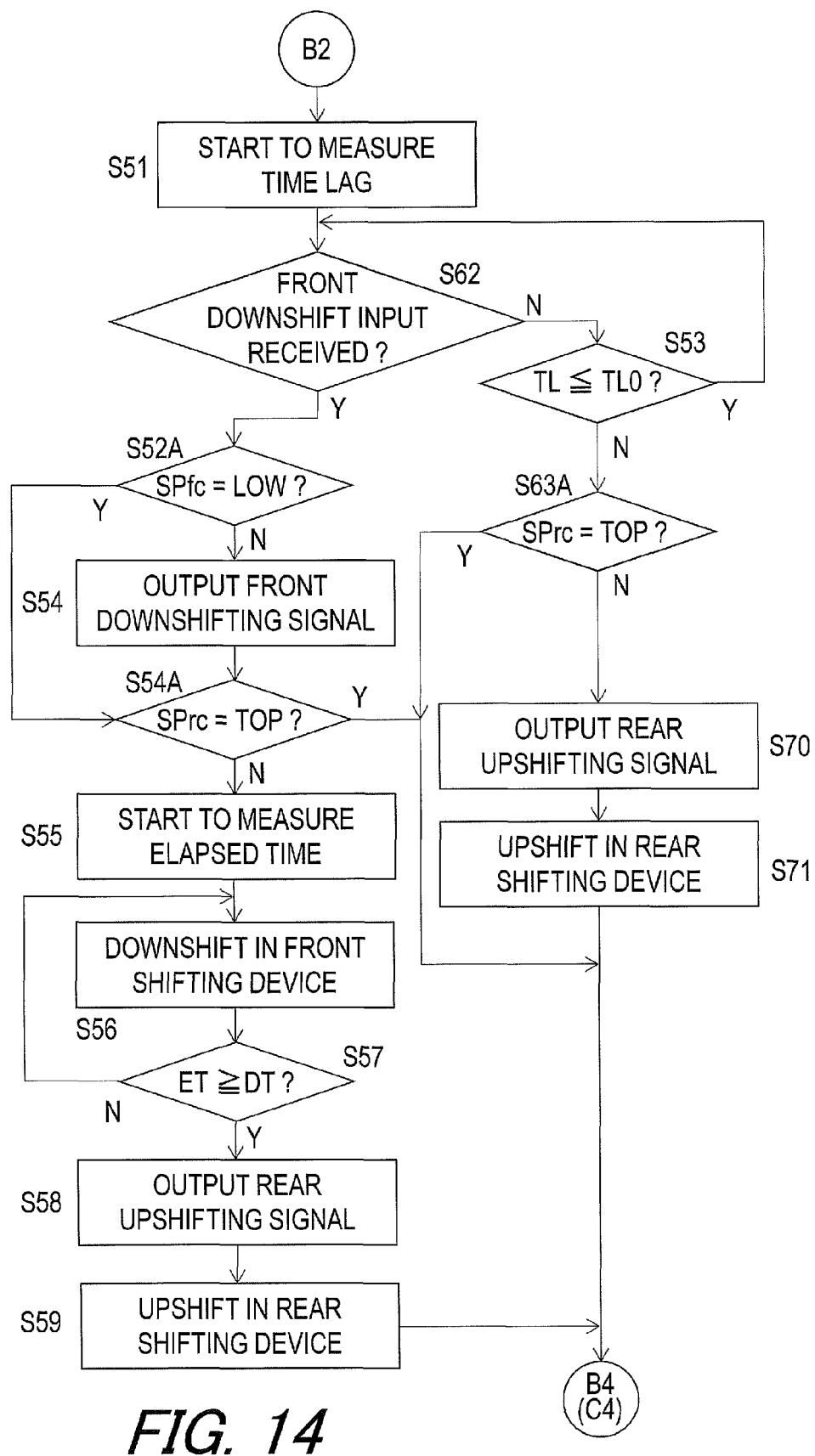

Similarly, as seen in FIGS. 11 and 14, the shifting controller 44 determines that the front downshift input SID1 and the rear upshift input SIU2 are received by the operating device 50 within the predetermined time lag TL0 (steps S2, S3, and S51, S62, and S53).

Specifically, when the shifting controller 44 concludes that the rear upshift input SIU2 is received by the operating device 50, the second timer 59 starts to measure a time lag TL (steps S3 and S51). The shifting controller 44 determines that the front downshift input SID1 is received by the shifting controller 44 (step S62). When the shifting controller 44 concludes that the front downshift input SID1 is not received within the predetermined time lag TL0, the shifting controller 44 determines that the current rear shift position is the top gear position (step S53 and S63A). The process returns to the step S21 when the shifting controller 44 concludes that the current rear shift position is the top gear position (step S63A). The rear upshifting signal SSU2 is output from the shifting controller 44 to the rear shifting device 48 when the shifting controller 44 concludes that the current rear shift position is not the top gear position (steps S63A and S70). The rear shifting device 48 upshifts by one speed stage in response to the rear upshifting signal SSU2 (step S71).

Since the steps S52A to S59 are the same as those of FIG. 13, they will not be described in detail here for the sake of brevity.

As seen in FIGS. 15 to 18, in the second mode, the method of controlling the front shifting device 46 and the rear shifting device 48 comprises controlling, by the shifting controller 44, one of the front shifting device 46 and the rear shifting device 48 to change one of the front shift position of the front shifting device 46 and the rear shift position of the rear shifting device 48 in response to the user input IPu. The method comprises controlling, by the shifting controller 44, the other of the front shifting device 46 and the rear shifting device 48 to change the other of the front shift position and the rear shift position with the delay time period DT in conjunction with the one of the front shifting device 46 and the rear shifting device 48 in response to the user input IPu. The method comprises changing the delay time period DT based on at least one of the gear ratio, the rear shift position, and the current rotational speed of the bicycle crank 30.

Figure 15:
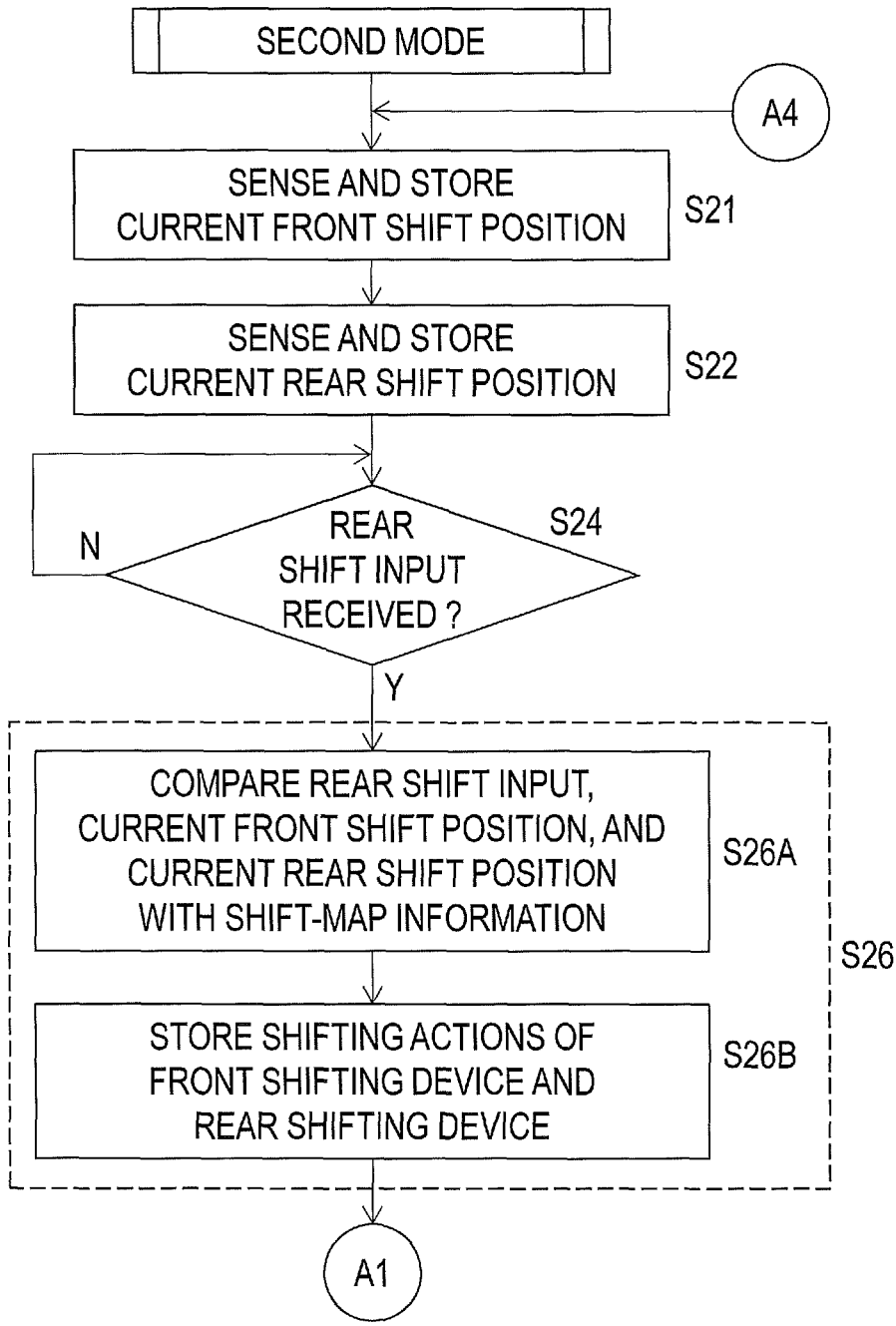
FIGS. 15 to 18 are flow charts of operation of the bicycle shifting apparatus illustrated in FIG. 2 (second mode).

As seen in FIG. 15, in the second mode, the current front shift position of the front shifting device 46 is sensed by the front position sensor PS1 and is stored in the storage device 54 of the shifting controller 44 (step S21). The current rear shift position of the rear shifting device 48 is sensed by the rear position sensor PS2 and is stored in the storage device 54 of the shifting controller 44 (step S22).

The shifting controller 44 determines that the rear shift input SI12 is received (step S24). In this embodiment, the shifting controller 44 determines that the rear upshift input SIU2 or the rear downshift input SID2 is received. When the rear shift input SI2 is not received by the shifting controller 44, the process returns to step S21.

When the rear shift input SI12 is received by the shifting controller 44, the shifting actions of the front shifting device 46 and the rear shifting device 48 are selected by the shifting controller 44 (step S26). Specifically, the rear downshift input, the current front shift position, and the current rear shift position are compared with the shift-map information (step S26A). A shifting action corresponding to the rear downshift input and the current front shifting position is stored as the front shifting action in the storage device 54 by the processor 52 (step S26B). A shifting action corresponding to the rear downshift input and the current rear shifting position is stored as the rear shifting action in the storage device 54 by the processor 52 (step S26B).

For example, as seen in FIG. 5, when the current front shift position is the top gear position and the current rear shift position is the sixth gear shift position, the shifting actions "DOWN" and "UP" are stored in the storage device 54 as the front shifting action of the front shifting device 46 and the rear shifting action of the rear shifting device 48 in response to the rear downshift input SID2.

Figure 16:
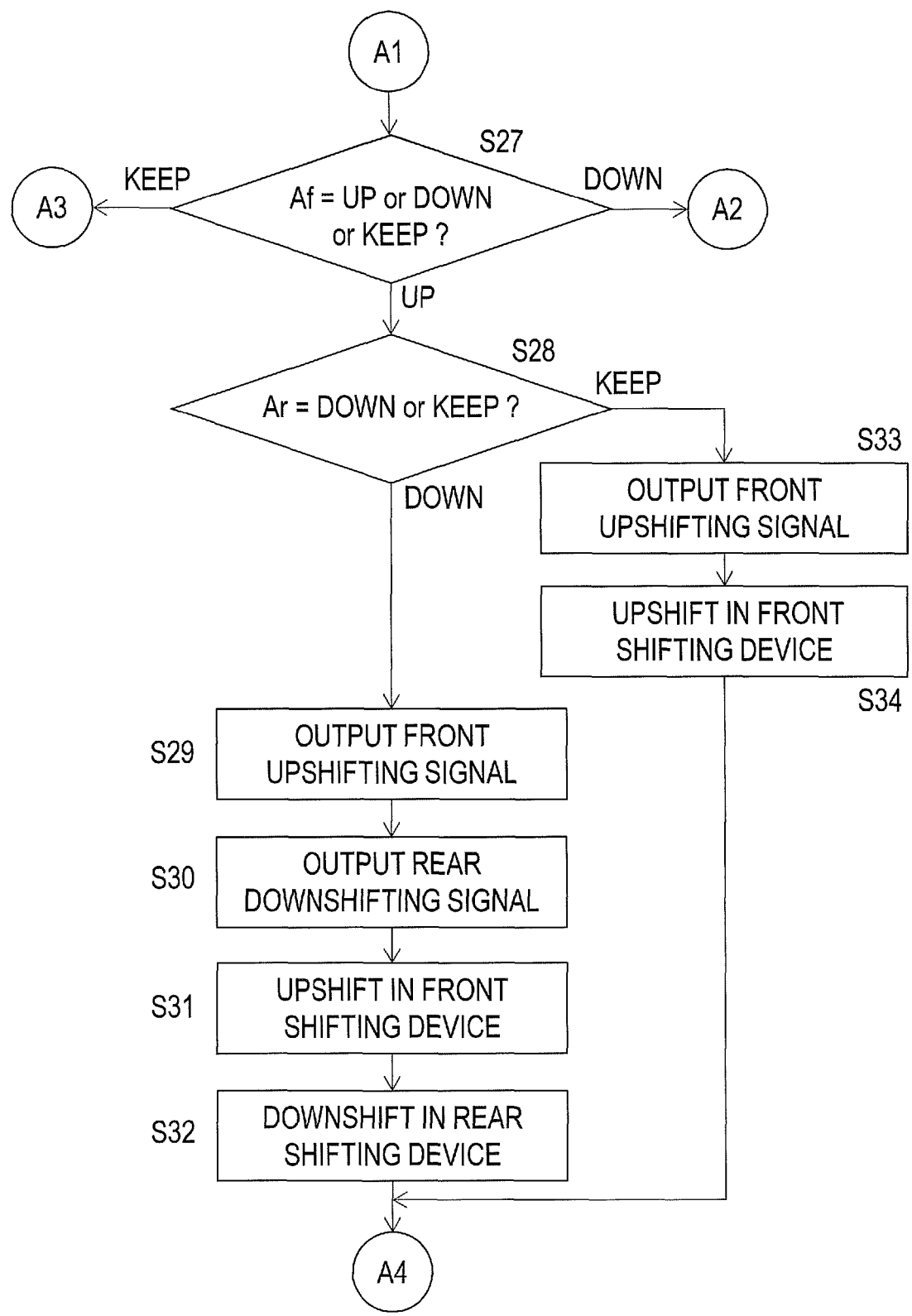

As seen in FIG. 16, when the selected front shifting action Af is "UP" and the selected rear shifting action Ar is "DOWN", the front upshifting signal SSU1 and the rear downshifting signal SSD2 are respectively output from the shifting controller 44 to the front shifting device 46 and the rear shifting device 48 (steps S27 to S30). The front shifting device 46 upshifts by one speed stage in response to the front upshifting signal SSU1 (step S31). The rear shifting device 48 downshifts by one speed stage in response to the rear downshifting signal SSD2 (step S32).

When the selected front shifting action Af is "UP" and the selected rear shifting action Ar is "KEEP", the front upshifting signal SSU1 is output from the shifting controller 44 to the front shifting device 46 (steps S27, S28, and S33). The front shifting device 46 upshifts by one speed stage in response to the front upshifting signal SSU1 (step S34). At this time, neither the rear upshifting signal SSU2 nor the rear downshifting signal SSD2 is output from the shifting controller 44 to the rear shifting device 48. The process returns to the step S21.

Figure 17:
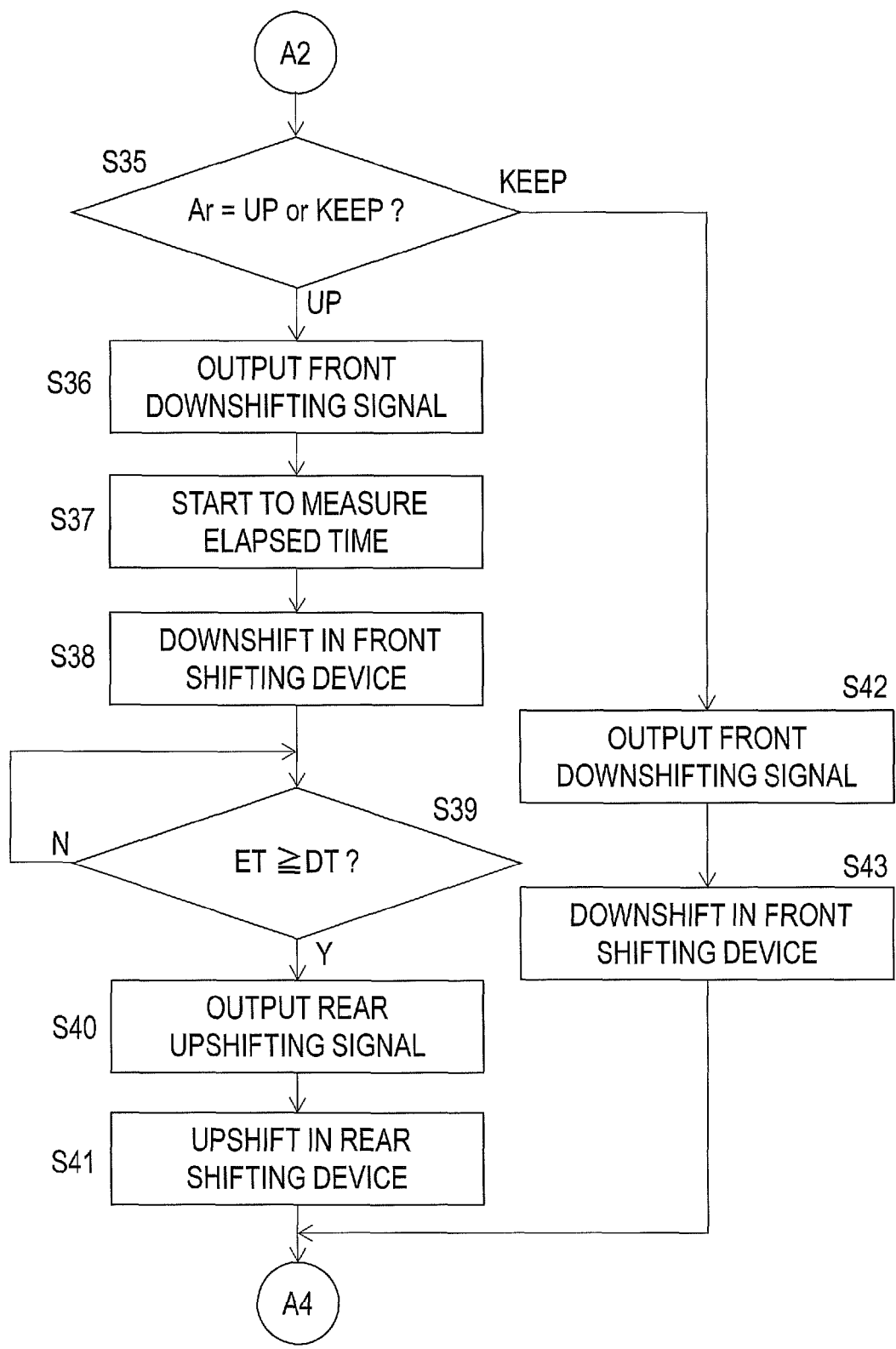

As seen in FIGS. 16 and 17, when the selected front shifting action Af is "DOWN" and the selected rear shifting action Ar is "UP", the front downshifting signal SSD1 is output from the shifting controller 44 to the front shifting device 46 (steps S27, S35, and S36). The first timer 58 start to measure an elapsed time ET from at a timing at which the front downshifting signal SSD1 is output from the shifting controller 44 (step S37). The front shifting device 46 downshifts by one speed stage in response to the front downshifting signal SSD1 (step S38). The shifting controller 44 determines that the elapsed time ET is equal to or longer than the delay time period DT (step S39). The rear upshifting signal SSU2 is output from the shifting controller 44 when the elapsed time ET is equal to or longer than the delay time period DT (step S40). The rear shifting device 48 upshifts by one speed stage in response to the rear upshifting signal SSU2 (step S41). Thus, the rear shifting device 48 upshifts with the delay time period DT in conjunction with the front shifting device 46 in response to the rear downshift input SID2.

When the selected front shifting action is "DOWN" and the selected rear shifting action is "KEEP", the front downshifting signal SSD1 is output from the shifting controller 44 to the front shifting device 46 (steps S27, S35, and S42). The front shifting device 46 downshifts by one speed stage in response to the front downshifting signal SSD1 (step S43). At this time, neither the rear upshifting signal SSU2 nor the rear downshifting signal SSD2 is output from the shifting controller 44 to the rear shifting device 48. The process returns to the step S21.

Figure 18:
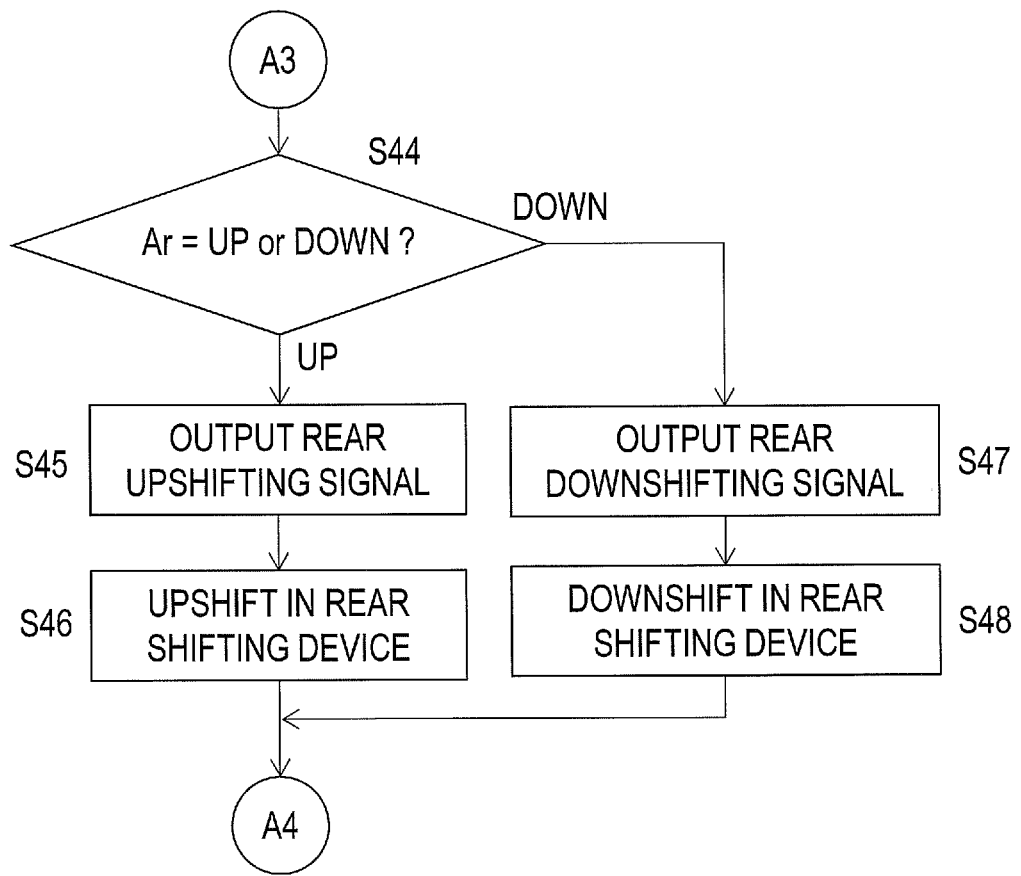

As seen in FIGS. 16 and 18, when the selected front shifting action Af is "KEEP" and the selected rear shifting action Ar is "UP", the rear upshifting signal SSU2 is output from the shifting controller 44 to the rear shifting device 48 (steps S27, S44, and S45). The rear shifting device 48 upshifts by one speed stage in response to the rear upshifting signal SSU2 (step S46). At this time, neither the front upshifting signal SSU1 nor the front downshifting signal SSD2 is output from the shifting controller 44 to the front shifting device 46. The process returns to the step S21.

When the selected front shifting action Af is "KEEP" and the selected rear shifting action Ar is "DOWN", the rear downshifting signal SSD2 is output from the shifting controller 44 to the rear shifting device 48 (steps S27, S44, and S47). The rear shifting device 48 downshifts by one speed stage in response to the rear downshifting signal SSD2 (step S48). At this time, neither the front upshifting signal SSU1 nor the front downshifting signal SSD1 is output from the shifting controller 44 to the front shifting device 46. The process returns to the step S21.

Figure 19:
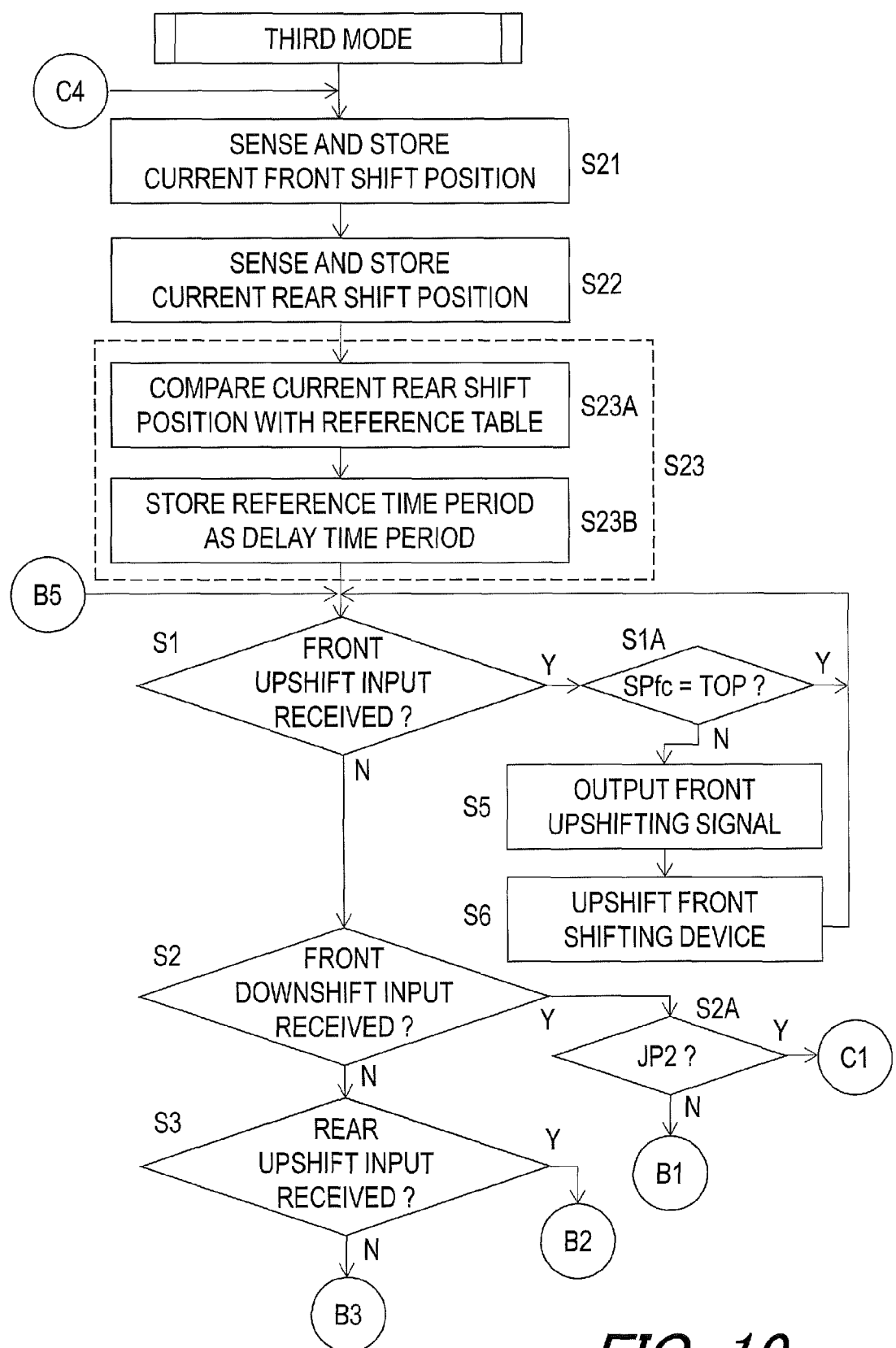
FIGS. 19 and 20 are flow charts of operation of the bicycle shifting apparatus illustrated in FIG. 2 (third mode).
Figure 20:
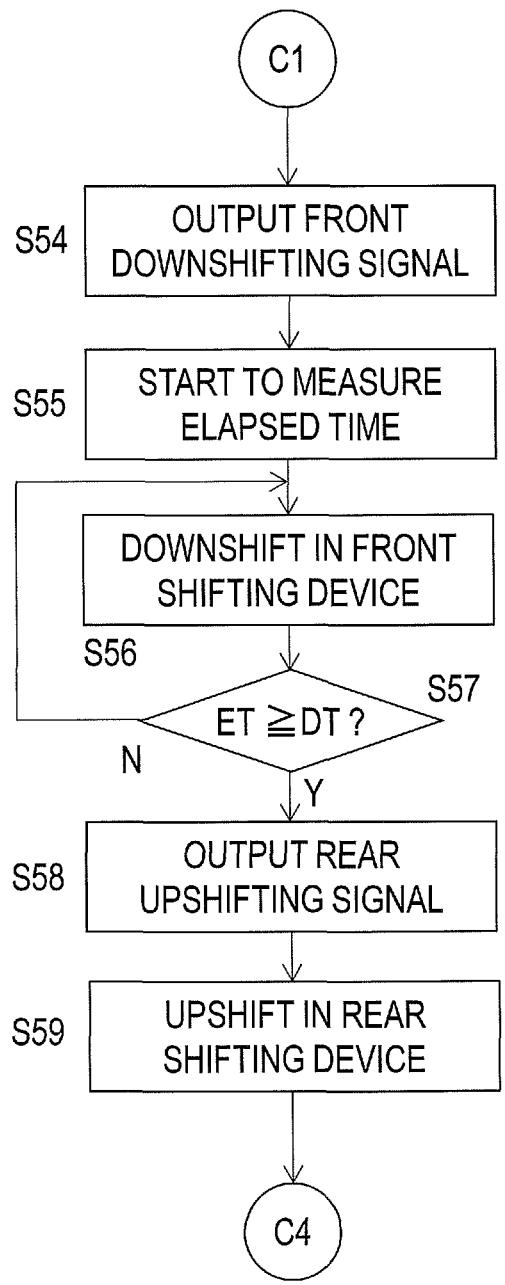

As seen in FIGS. 19 and 20, steps of the third mode are partly the same as those of the first mode shown in FIGS. 11 to 14. The steps of FIGS. 12 to 14 are used in the third mode as well as the first mode. Unlike the first mode, the front shifting device 46 downshifts and the rear shifting device 48 upshifts in response to the front user input UI1 only when the front shifting device 46 and the rear shifting device 48 are at the second conjunction points JP2 of FIG. 3.

Specifically, as seen in FIGS. 19 and 20, the shifting controller 44 determines that the front shifting device 46 and the rear shifting device 48 are at the second conjunction point JP2 when the front downshift input SID1 is received by the operating device 50 (step S2A). The process enters the step S51 of FIG. 13 when the front shifting device 46 and the rear shifting device 48 are not at the second conjunction point JP2. The steps S54 to S59 are executed when the front shifting device 46 and the rear shifting device 48 are at the second conjunction point JP2 (step S2A). Thus, the front shifting device 46 downshifts and the rear shifting device 48 upshifts in response to the front user input UI1 only when the front shifting device 46 and the rear shifting device 48 are at the second conjunction points JP2 (FIG. 3).

The bicycle shifting apparatus 12 has the following features.

(1) With the bicycle shifting apparatus 12, the delay time period DT prevents the front shifting device 46 and the rear shifting device 48 from simultaneously changing the front shift position and the second shift position. Thus, it is possible to suppress disengagement of a coupling member such as the bicycle chain 34 or a belt from at least one of the front shifting device 46 and the rear shifting device 48. Furthermore, the shifting controller 44 is configured to change the delay time period DT based on at least one of the gear ratio, the rear shift position, and the current rotational speed of the bicycle crank 30. Accordingly, it is possible to adjust the delay time period DT in accordance with a state of the bicycle 10.

(2) The storage device 54 is configured to store the at least one reference time period T1, T2, and/or T3 as the delay time period DT. The at least one reference time period T1, T2, and/or T3 are defined based on at least one of the gear ratio, the rear shift position, and the rotational speed. Accordingly, it is possible to shorten a processing time to obtain the delay time period DT by using the at least one reference time period stored in the storage device 54.

(3) The rear shifting device 48 has the plurality of shift position ranges SPR1, SPR2, and SPR3. At least one of the plurality of shift position ranges SPR1, SPR2, and SPR3 includes the plurality of shift positions. The at least one reference time period is configured to be set based on the plurality of shift position ranges SPR1, SPR2, and SPR3. The at least one reference time period corresponding to each of the plurality of shift position ranges SPR1, SPR2, and SPR3 is different from each other. Accordingly, it is possible to simplify the configuration of the bicycle shifting apparatus 12.

(4) The shifting controller 44 is configured to output the first shifting signal to the front shifting device 46 to change the front shift position in response to the user input IPu. The shifting controller 44 is configured to output the second shifting signal to the rear shifting device 48 to change the rear shift position in response to the user input IPu after a lapse of the delay time period DT from the timing at which the shifting controller 44 outputs the first shifting signal. Accordingly, it is possible to simplify configuration of the rear shifting device 48 with realizing configuration to delay shifting of the rear shifting device 48 from shifting of the front shifting device 46.

(5) The front shifting device 46 is configured to change the front shift position to downshift in response to the first shifting signal. The rear shifting device 48 is configured to change the rear shift position to upshift in response to the second shifting signal. Accordingly, downshifting of the front shifting device 46 is performed before upshifting of the rear shifting device 48. This reduces a rider's load of pedaling compared with a case where upshifting of the rear shifting device 48 is performed before downshifting of the front shifting device 46.

(6) The storage device 54 is configured to store the shift-map information. The shift-map information includes combinations of the front shift position of the front shifting device 46, the rear shift position of the rear shifting device 48, and a shifting action to be performed at the front shift position and the rear shift position in response to a single input command defined as the user input IPu. The shifting controller 44 is configured to control the front shifting device 46 and the rear shifting device 48 based on the shift-map information in response to the single input command. Accordingly, it is possible to easily operate the front shifting device 46 and the rear shifting device 48 by using the single input command with realizing configuration in which one of shifting operations of the front shifting device 46 and the rear shifting device 48 is delayed from the other of the shifting operations of the front shifting device 46 and the rear shifting device 48.

(7) The shifting controller 44 is configured to control one of the front shifting device 46 and the rear shifting device 48 to change one of the front shift position and the rear shift position in response to the single input command based on at least one first combination defined in the shift-map information. The shifting controller 44 is configured to control the other of the front shifting device 46 and the rear shifting device 48 to change the other of the front shift position and the rear shift position with the delay time period DT in conjunction with the one of the front shifting device 46 and the rear shifting device 48 in response to the single input command based on the at least one first combination defined in the shift-map information. Accordingly, it is possible to improve flexibility of controlling the front shifting device 46 and the rear shifting device 48 by setting the at least one first combination in the shift-map information.

(8) The shifting controller 44 is configured to control the front shifting device 46 and the rear shifting device 48 to change only one of the front shift position and the rear shift position in response to the single input command based on at least one second combination defined in the shift-map information. The at least one second combination is different from the at least one first combination. Accordingly, it is possible to improve flexibility of controlling the front shifting device 46 and the rear shifting device 48 by setting the at least one first combination and the at least one second combination in the shift-map information.

(9) The user input IPu includes the front shift input SI1 and the rear shift input SI2. The shifting controller 44 controls the front shifting device 46 to change the front shift position in response to a front shift input SI1. The shifting controller 44 controls the rear shifting device 48 to change the rear shift position with the delay time period DT in conjunction with the front shifting device 46 in response to the rear shift input SI2 when the shifting controller 44 receives the front shift input SI1 and the rear shift input S12 within the predetermined time lag TL0. Accordingly, it is possible to delay one of shifting operations of the front shifting device 46 and the rear shifting device 48 from the other of the shifting operations of the front shifting device 46 and the rear shifting device 48 even if the shifting controller 44 simultaneously receives the front shift input SI1 and the rear shift input SI2.

(10) The shifting controller 44 is configured to control the rear shifting device 48 to change the rear shift position with the delay time period DT in conjunction with the front shifting device 46 in response to the rear shift input SI2 when the shifting controller 44 receives the front shift input SI1 and the rear shift input SI2 within the predetermined time lag TL0. The shifting controller 44 is configured to change the delay time period DT based on at least one of the gear ratio, the rear shift position, and the current rotational speed of the bicycle crank 30. The delay time period DT prevents the front shifting device 46 and the rear shifting device 48 from simultaneously changing the front shift position and the second shift position. Thus, it is possible to suppress disengagement of a coupling member such as the bicycle chain 34 or a belt from at least one of the front shifting device 46 and the rear shifting device 48. Furthermore, the shifting controller 44 is configured to change the delay time period DT based on at least one of the gear ratio, the rear shift position, and the current rotational speed of the bicycle crank 30. Accordingly, it is possible to adjust the delay time period DT in accordance with a state of the bicycle 10.

Second Embodiment

A bicycle 210 including a bicycle shifting apparatus 212 in accordance with a second embodiment will be described below referring to FIGS. 21 to 26. The bicycle shifting apparatus 212 has the same structures and/or configurations as those of the bicycle shifting apparatus 12 except for the shifting controller and the rear shifting device. Thus, elements having substantially the same function as those in the first embodiment will be numbered the same here, and will not be described and/or illustrated again in detail here for the sake of brevity.

Figure 21:
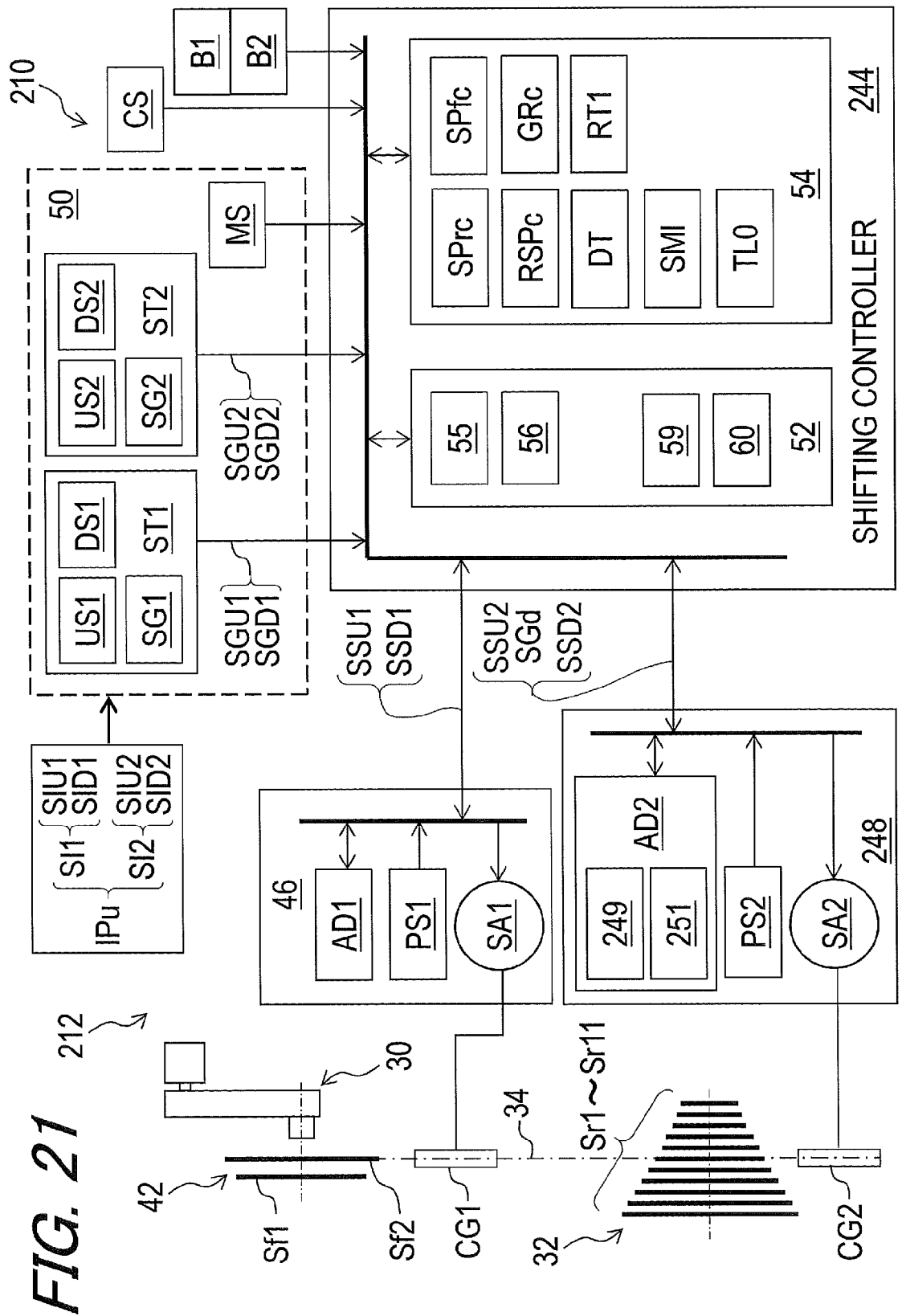
FIG. 21 is a block diagram of a bicycle including a bicycle shifting apparatus in accordance with a second embodiment.

As seen in FIG. 21, the bicycle shifting apparatus 212 comprises a shifting controller 244 and a rear shifting device 248. The shifting controller 244 and the rear shifting device 248 have substantially the same structures as those of the shifting controller 244 and the rear shifting device 248 of the bicycle shifting apparatus 12 in the first embodiment. The shifting controller 244 is configured to control one of the front shifting device 46 and the rear shifting device 248 to change one of the front shift position and the rear shift position in response to the user input IPu. The shifting controller 244 is configured to control the other of the front shifting device 46 and the rear shifting device 248 to change the other of the front shift position and the rear shift position with the delay time period DT in conjunction with the one of the front shifting device 46 and the rear shifting device 248 in response to the user input IPu.

Figure 22:
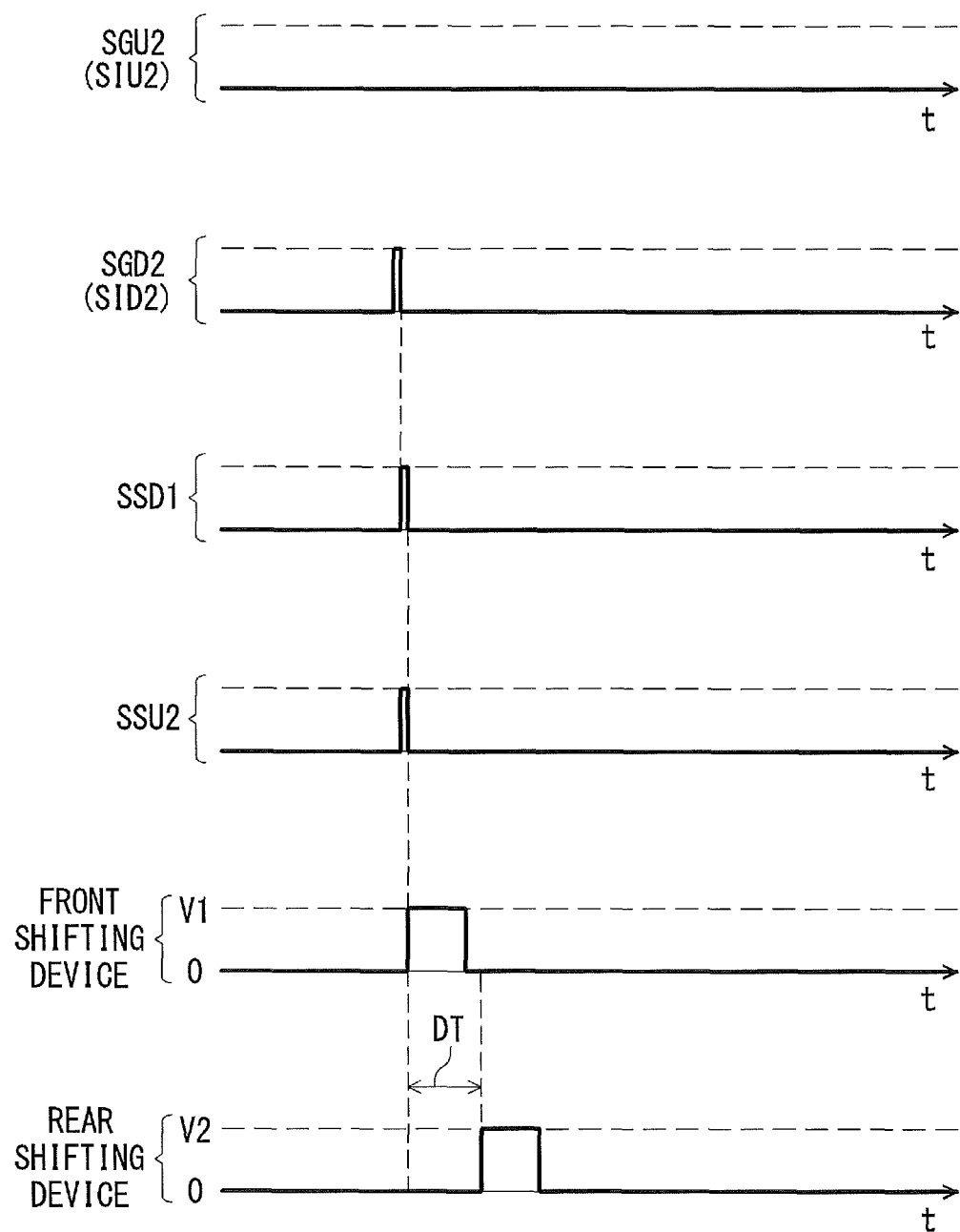
FIG. 22 is a timing chart of the bicycle shifting apparatus illustrated in FIG. 21 (second mode).

Unlike the shifting controller 244 and the rear shifting device 248, however, the rear shifting device 248 sets the delay time period DT. As seen in FIGS. 21 and 22, in the second mode, the shifting controller 244 is configured to output the first shifting signal to the front shifting device 46 to change the front shift position in response to the user input IPu. The shifting controller 244 is configured to output the second shifting signal to the rear shifting device 248 to change the rear shift position in response to the user input IPu. The second shifting signal includes a delay-time signal SGd indicating the delay time period DT.

In this embodiment, the rear shifting device 248 is configured to change the rear shift position after a lapse of the delay time period DT indicated by the delay-time signal SGd from a timing at which the rear shifting device 248 receives the second shifting signal. The first shifting signal corresponds to the front downshifting signal SSD1. The second shifting signal corresponds to the rear upshifting signal SSU2. The rear upshifting signal SSU2 includes the delay-time signal SGd.

As seen in FIG. 21, the rear shifting device 248 includes a delay-time detector 249 and a third timer 251. The delay-time detector 249 is configured to detect the delay time period from the delay-time signal SGd included in the rear upshifting signal SSU2. The third timer 251 is configured to measure a time period elapsed from the timing at which the rear shifting device 248 receives the rear upshifting signal SSU2. In this embodiment, the first timer 58 is omitted from the shifting controller 244.

The shifting controller 244 is configured to output the first shifting signal to the front shifting device 46 to downshift in response to the rear downshift input SID2. The shifting controller 244 is configured to output the second shifting signal to the rear shifting device 248 to upshift in response to the rear downshift input SID2. In this embodiment, the front shifting device 46 is configured to change the front shift position to downshift in response to the first shifting signal. The rear shifting device 248 is configured to change the rear shift position to upshift after a lapse of the delay time period DT indicated by the delay-time signal SGd from a timing at which the rear shifting device 248 receives the second shifting signal.

Figure 23:
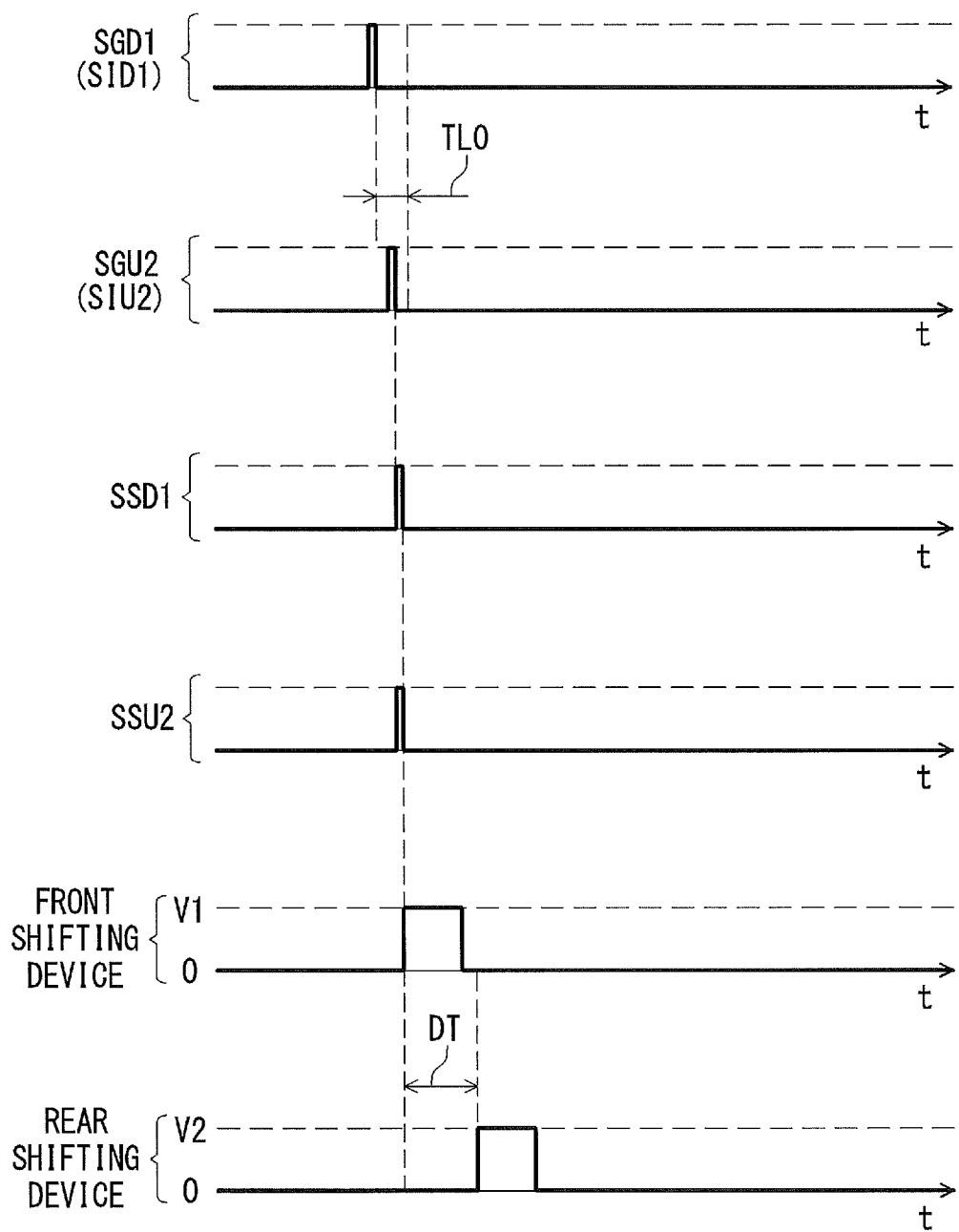
FIGS. 23 and 24 are timing charts of the bicycle shifting apparatus illustrated in FIG. 21 (first mode).
Figure 24:
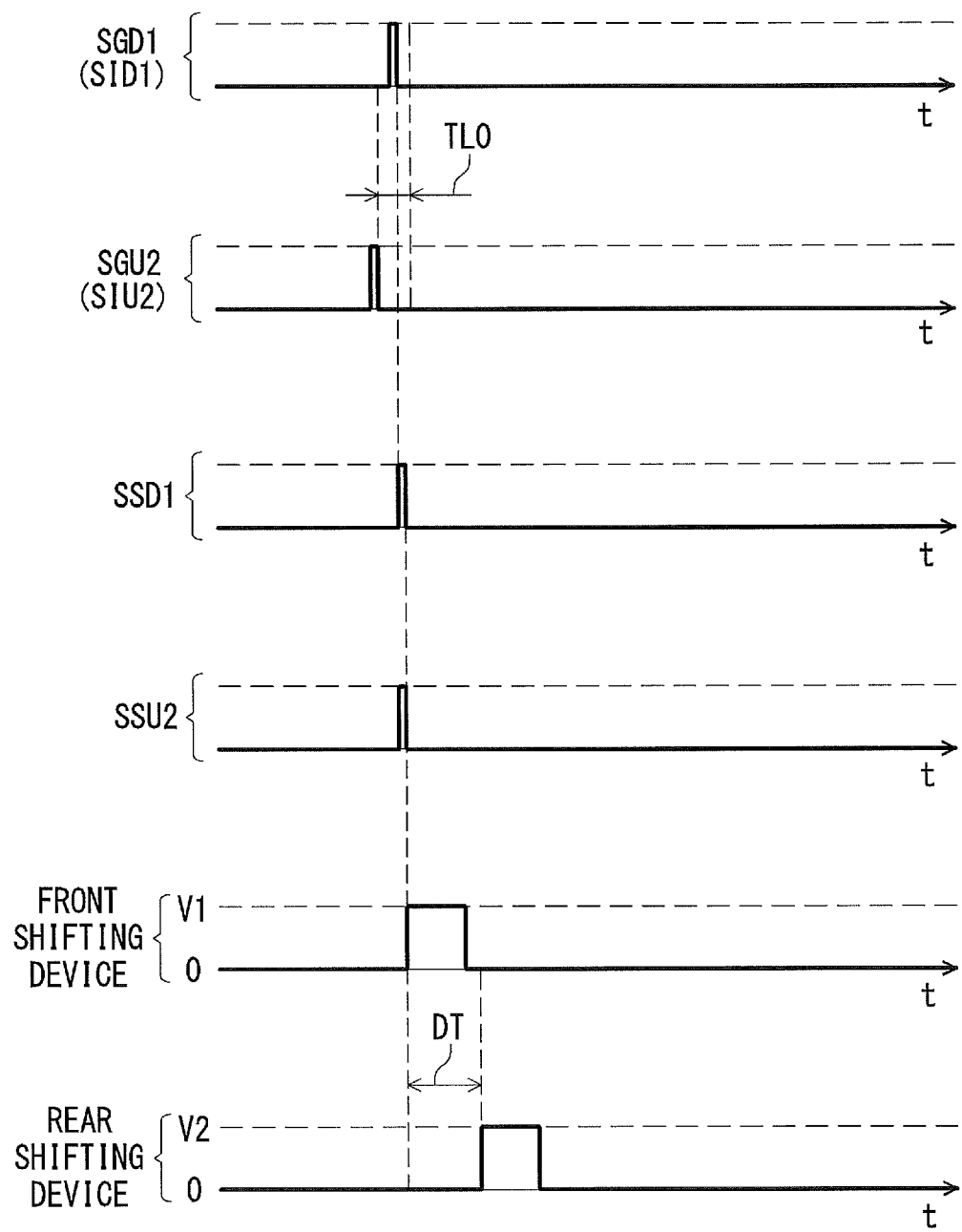

As seen in FIGS. 23 and 24, in the first mode, the shifting controller 244 is configured to control the front shifting device 46 to change the front shift position in response to the front shift input SI1. The shifting controller 244 is configured to control the rear shifting device 248 to change the rear shift position with the delay time period DT in conjunction with the front shifting device 46 in response to the rear shift input SI2 when the shifting controller 244 receives the front shift input SI1 and the rear shift input SI2 within the predetermined time lag TL0. In this embodiment, in the first mode, the shifting controller 244 is configured to control the front shifting device 46 to change the front shift position in response to the front downshift input SID1. The shifting controller 244 is configured to control the rear shifting device 248 to change the rear shift position with the delay time period DT in conjunction with the front shifting device 46 in response to the rear upshift input SIU2 when the shifting controller 244 receives the front downshift input SID1 and the rear upshift input SIU2 within the predetermined time lag TL0.

Specifically, in the first mode, the shifting controller 244 is configured to output the first shifting signal to the front shifting device 46 to change the front shift position in response to the user input IPu. The shifting controller 244 is configured to output the second shifting signal to the rear shifting device 248 to change the rear shift position in response to the user input IPu when the shifting controller 244 receives the front downshift input SID1 and the rear upshift input SIU2 within the predetermined time lag TL0. The rear shifting device 248 is configured to change the rear shift position to upshift after a lapse of the delay time period DT indicated by the delay-time signal SGd from a timing at which the rear shifting device 248 receives the second shifting signal.

Figure 25:
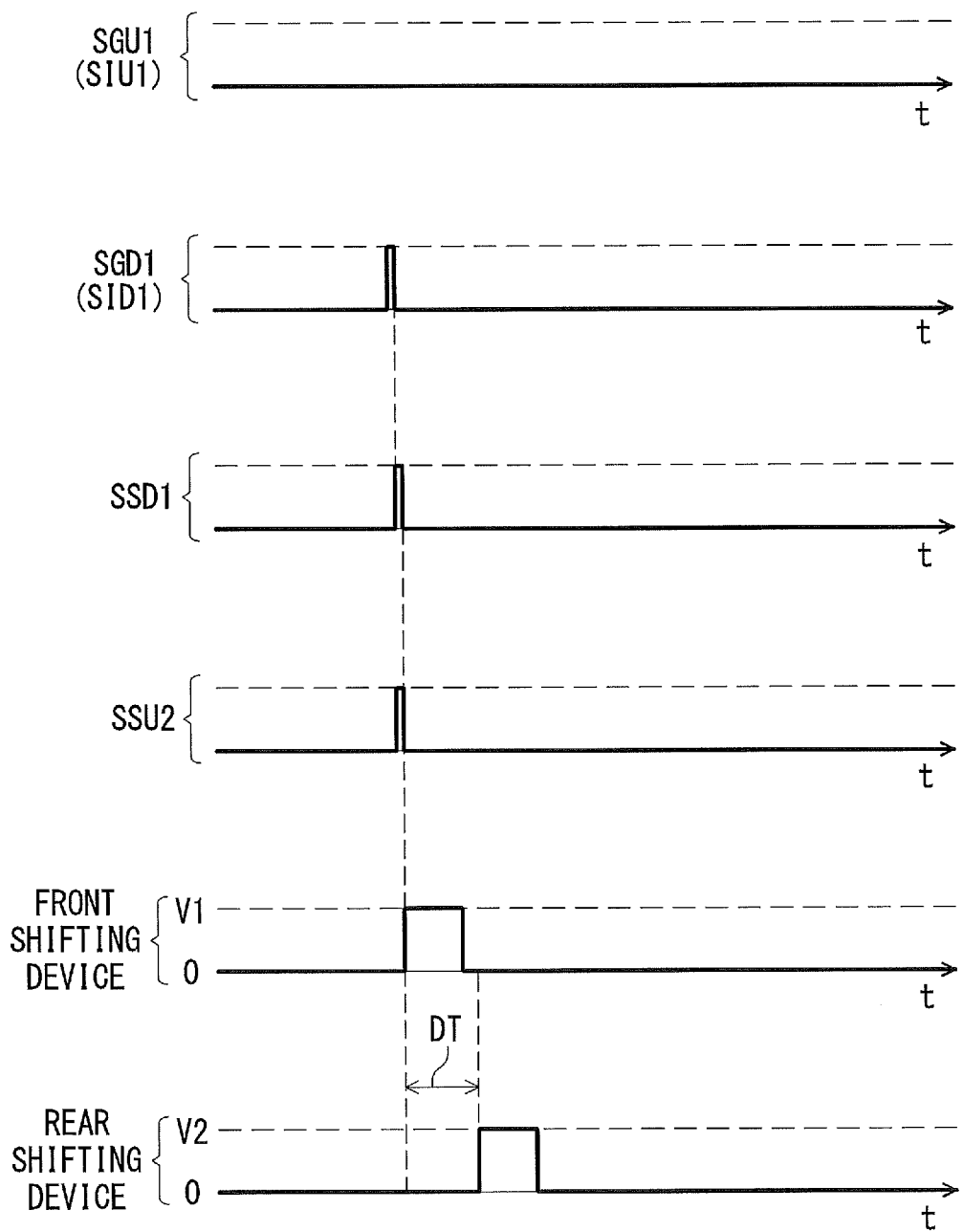
FIG. 25 is a timing chart of the bicycle shifting apparatus illustrated in FIG. 21 (third mode).

As seen in FIG. 25, in the third mode, the shifting controller 244 is configured to control the front shifting device 46 to change the front shift position in response to the front shift input SI1. The shifting controller 244 is configured to control the rear shifting device 48 to change the rear shift position with the delay time period DT in conjunction with the front shifting device 46 in response to the front shift input SI1. Specifically, the shifting controller 244 is configured to control the front shifting device 46 to change the front shift position in response to the front downshift input SID1. The shifting controller 244 is configured to control the rear shifting device 48 to change the rear shift position with the delay time period DT in conjunction with the front shifting device 46 in response to the front downshift input SID1.

In this embodiment, the front shifting device 46 is configured to change the front shift position to downshift in response to the front downshifting signal SSD1. The rear shifting device 248 is configured to change the rear shift position to upshift after a lapse of the delay time period DT indicated by the delay-time signal SGd from a timing at which the rear shifting device 248 receives the rear upshifting signal SSU2.

Figure 26:
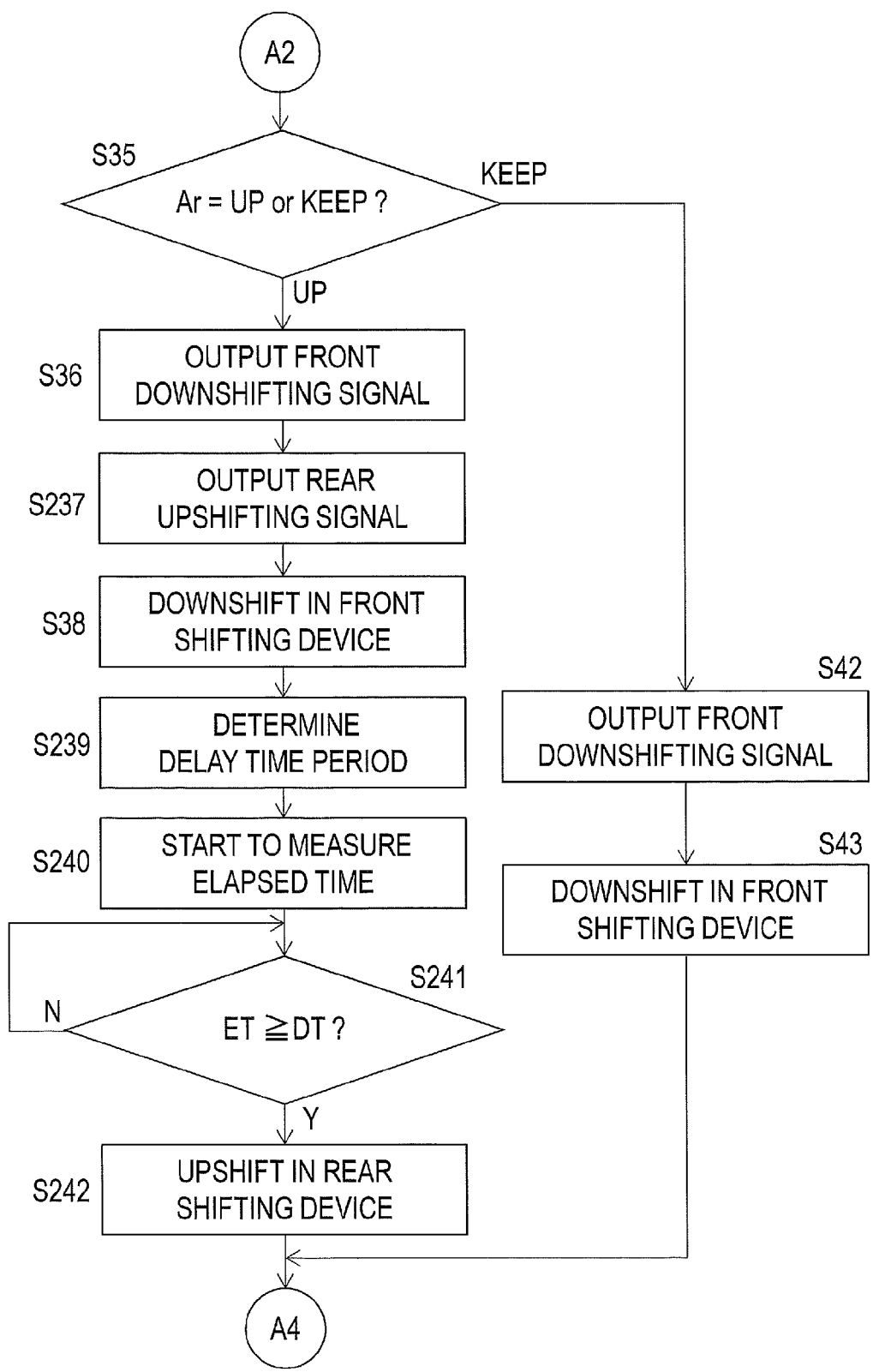
FIG. 26 is a part of a flow chart of operation of the bicycle shifting apparatus illustrated in FIG. 21 (second mode).

As seen in FIGS. 15 and 26, in the second mode, when the selected front shifting action Af is "DOWN" and the selected rear shifting action Ar is "UP", the front downshifting signal SSD1 is output from the shifting controller 244 to the front shifting device 46 (steps S27, S35, and S36). Unlike the second mode of the first embodiment, the rear upshifting signal SSU2 is output simultaneously with the front downshifting signal SSD1 from the shifting controller 244 to the rear shifting device 248 (step S237). The front shifting device 46 downshifts by one speed stage in response to the front downshifting signal SSD1 (step S238). The delay time period DT is determined by the rear actuator driver AD2 based on the delay-time signal SGd included in the rear upshifting signal SSU2 (step S239) by the delay-time detector 249. The third timer 251 starts to measure an elapsed time ET from at a timing at which the delay time period DT is determined by the rear actuator driver AD2 (step S240). The rear actuator driver AD2 determines that the elapsed time ET is equal to or longer than the delay time period DT (step S241). The rear shifting device 248 upshifts by one speed stage in response to the rear upshifting signal SSU2 when the elapsed time ET is equal to or longer than the delay time period DT (step S242). Thus, the rear shifting device 248 upshifts with the delay time period DT in conjunction with the front shifting device 46 in response to the rear downshift input SID2.

Since the above modifications of the second mode from the first embodiment can be applied to the flow charts of the first mode and the third mode shown in FIGS. 11 to 14, 19, and 20, they will not be describe and/or illustrated in detail here for the sake of brevity.

The bicycle shifting apparatus 212 has the following features in addition to the features of the bicycle shifting apparatus 12 in accordance with the first embodiment.

(1) The shifting controller 244 is configured to output the first shifting signal to the front shifting device 46 to change the front shift position in response to the user input IPu. The shifting controller 244 is configured to output a second shifting signal to the rear shifting device 248 to change the rear shift position in response to the user input IPu. The second shifting signal includes a delay-time signal SGd indicating the delay time period DT. Accordingly, it is possible to simplify configuration of the front shifting device 46 with realizing configuration to delay shifting of the rear shifting device 248 from shifting of the front shifting device 46.

(2) The rear shifting device 248 is configured to change the rear shift position after a lapse of the delay time period DT indicated by the delay-time signal SGd from a timing at which the rear shifting device 248 receives the second shifting signal. Accordingly, it is possible to further simplify configuration of the front shifting device 46 with realizing configuration to delay shifting of the rear shifting device 248 from shifting of the front shifting device 46.

(3) The front shifting device 46 is configured to change the front shift position to downshift in response to the first shifting signal. The rear shifting device 248 is configured to change the rear shift position to upshift after a lapse of the delay time period DT indicated by the delay-time signal SGd from a timing at which the rear shifting device 248 receives the second shifting signal. Accordingly, downshifting of the front shifting device 46 is performed before upshifting of the rear shifting device 248. This reduces a rider's load of pedaling compared to a case where upshifting of the rear shifting device 248 is performed before downshifting of the front shifting device 46.

Third Embodiment

A bicycle 310 including a bicycle shifting apparatus 312 in accordance with a third embodiment will be described below referring to FIGS. 27 and 28. The bicycle shifting apparatus 312 has the same structures and/or configurations as those of the bicycle shifting apparatus 12 except for the shifting controller. Thus, elements having substantially the same function as those in the above embodiments will be numbered the same here, and will not be described and/or illustrated again in detail here for the sake of brevity.

Figure 27:
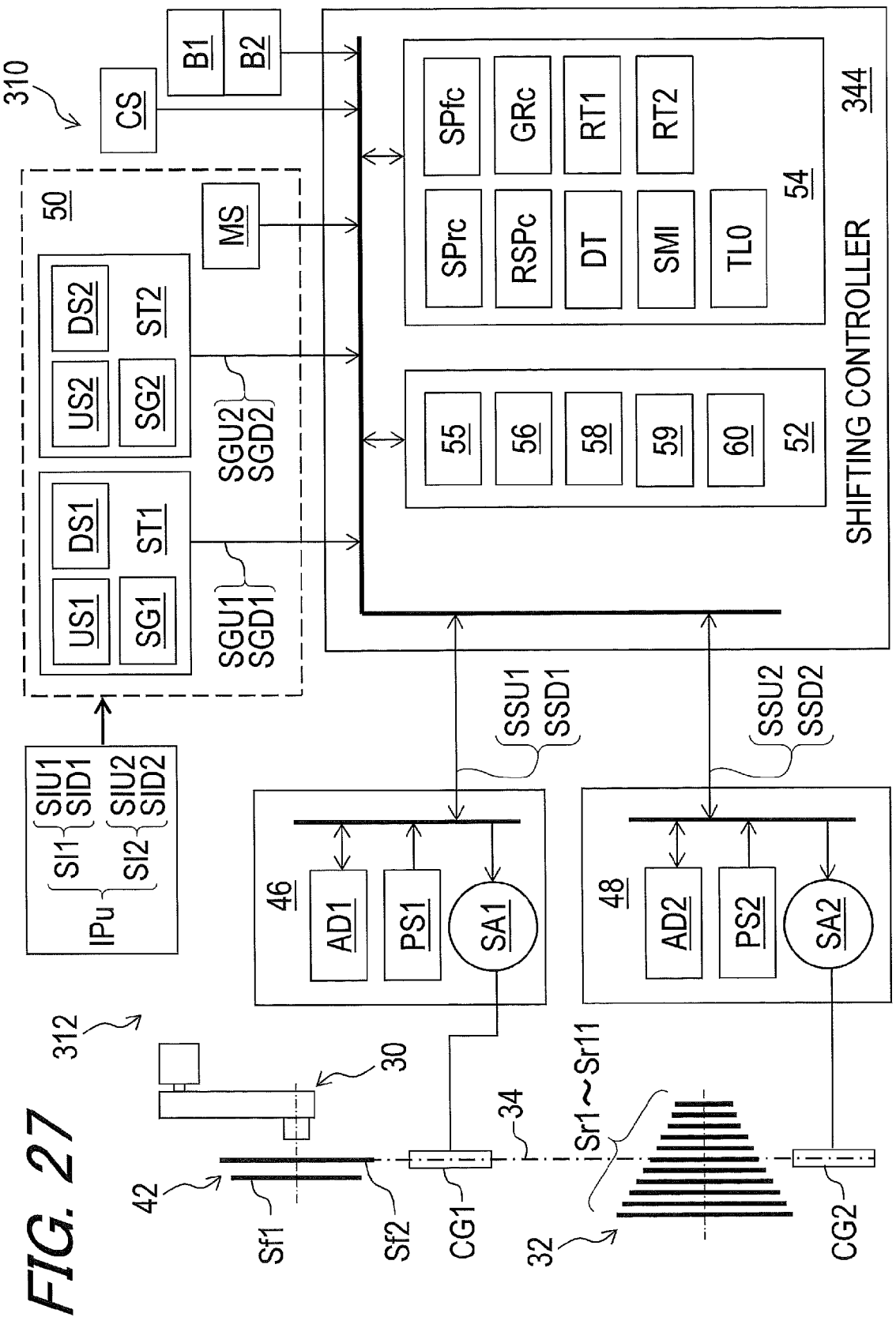
FIG. 27 is a block diagram of a bicycle including a bicycle shifting apparatus in accordance with a third embodiment.

As seen in FIG. 27, the bicycle shifting apparatus 312 comprises a shifting controller 344. The shifting controller 344 has substantially the same structure as that of the shifting controller 44 in the first embodiment. Unlike the shifting controller 44, the storage device 54 is configured to store a plurality of reference tables each including the at least one reference time period. The plurality of reference tables are at least partly different from each other. In this embodiment, the storage device 54 stores a plurality of reference tables RT1 and RT2 as the at least one reference time period. As seen in FIG. 9, the reference table RT1 includes the plurality of reference time periods T1, T2, and T3. As seen in FIG. 28, the reference table RT2 includes a plurality of reference time periods T11, T12, and T13. The reference time periods T11, T12, and T13 are different from each other. In this embodiment, each of the reference time periods T11, T12, and T13 are different from each of the reference time periods T1, T2, and T3. However, at least one of the reference time periods T11, T12, and T13 can be equal to one of the reference time periods T1, T2, and T3.

In this embodiment, one of the reference tables RT1 and RT2 is selected by the user via the application program installed in the personal computer. When the user selects one of the reference tables RT1 and RT2, the personal computer is electrically connected to the bicycle shifting apparatus 312. One of the reference tables RT1 and RT2 can be selected by the user via other selecting device such as a selector switch. One of the reference tables RT1 and RT2 can be automatically selected in accordance with a state of the bicycle 10.

As well as the first embodiment, the first and second conjunction points JP1 and JP2 of the shift-map information is selected by the user via the application program installed in the personal computer. The personal computer is electrically connected to the bicycle shifting apparatus 12 when the user selects the second conjunction point JP2 of the shift-map information among points defined by the front shift position and the second shift position. As seen in FIG. 3, the first and second conjunction points JP1 and JP2 can be selected among pairs of points JP3a to JP3j. The pairs of points JP301 to JP310 respectively correspond to the first to tenth gear positions of the rear shift position. The shifting controller 344 sets the reference time period based on the selected reference table and the selected pair of points. The storage device 54 stores the reference time period which corresponding to the selected table and the selected pair of points.

The bicycle shifting apparatus 312 has the following features in addition to the features of the bicycle shifting apparatus 12 in accordance with the first embodiment.

Furthermore, the storage device 54 is configured to store a plurality of reference tables each including the plurality of reference time periods. The plurality of reference tables are at least partly different from each other. Accordingly, it is possible to change the plurality of reference time periods.

Fourth Embodiment

A bicycle 410 including a bicycle shifting apparatus 412 in accordance with a fourth embodiment will be described below referring to FIGS. 29 and 30. The bicycle shifting apparatus 412 has the same structures and/or configurations as those of the bicycle shifting apparatus 12 except for the shifting controller. Thus, elements having substantially the same function as those in the above embodiments will be numbered the same here, and will not be described and/or illustrated again in detail here for the sake of brevity.

Figure 29:
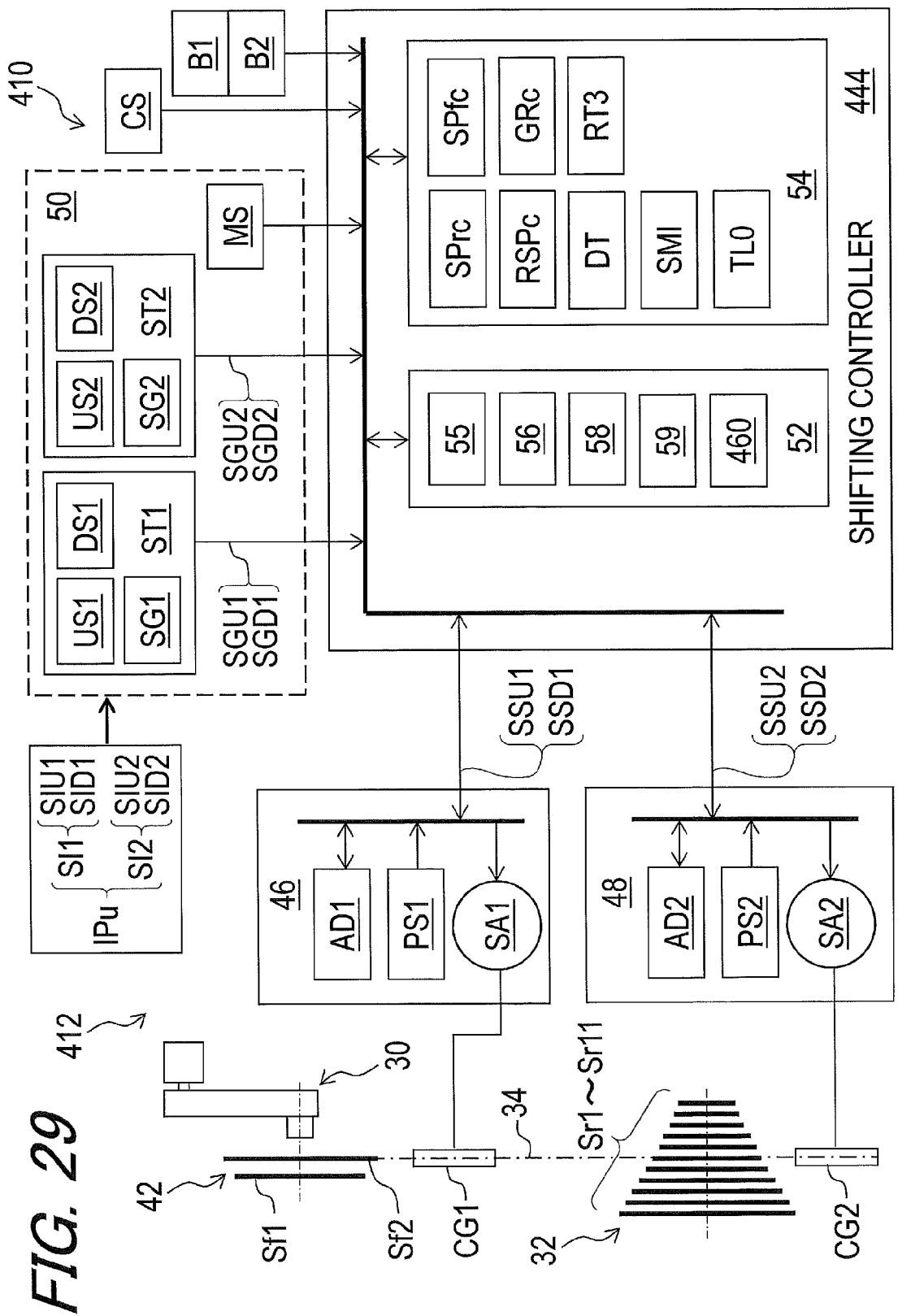
FIG. 29 is a block diagram of a bicycle including a bicycle shifting apparatus in accordance with a fourth embodiment.

As seen in FIGS. 29 and 30, the bicycle shifting apparatus 412 comprises a shifting controller 444. The shifting controller 444 has substantially the same structure as that of the shifting controller 44 in the first embodiment. Unlike the shifting controller 44 in the first embodiment, the storage device 54 is configured to store at least one reference time period T401 to T411 as the delay time period DT. The at least one reference time period is defined based on at least one of the gear ratio, the rear shift position, and the rotational speed of the bicycle crank 30. The at least one reference time period is configured to be set based on the plurality of shift positions SPr1 to SPr11. The at least one reference time period corresponding to each of the plurality of shift positions SPr1 to SPr11 is different from each other. In this embodiment, as seen in FIG. 30, the at least one reference time period includes a plurality of reference time periods T401 to T411 respectively corresponding to the plurality of shift positions SPr1 to SPr11. The plurality of reference time periods T401 to T411 are different from each other. The storage device 54 temporarily stores at least one of the reference time periods T401 to T411 as the delay time period DT. As seen in FIGS. 28 and 29, the storage device 54 stores a reference table RT3 including combinations of the plurality of shift positions SPr1 to SPr11 and the plurality of reference time periods T401 to T411.

The shifting controller 444 includes a time-period selector 460 configured to select, as the delay time period DT, one of the plurality of reference time periods T401 to T411 based on the at least one of the gear ratio, the rear shift position, and the current rotational speed. In this embodiment, the time-period selector 460 is configured to select, as the delay time period DT, one of the plurality of reference time periods T401 to T411 based on the rear shift position.

The bicycle shifting apparatus 412 has the following features in addition to the features of the bicycle shifting apparatus 12 in accordance with the first embodiment.

Furthermore, the rear shifting device 48 has the plurality of shift positions as the rear shift position. The at least one reference time period T1, T2, and/or T3 respectively correspond to the plurality of shift positions and are different from each other. Accordingly, it is possible to improve flexibility of changing the delay time period DT.

Fifth Embodiment

A bicycle 510 including a bicycle shifting apparatus 512 in accordance with a fifth embodiment will be described below referring to FIGS. 31 to 34. The bicycle shifting apparatus 512 has the same structures and/or configurations as those of the bicycle shifting apparatus 12 except for the shifting controller. Thus, elements having substantially the same function as those in the above embodiments will be numbered the same here, and will not be described and/or illustrated again in detail here for the sake of brevity.

Figure 31:
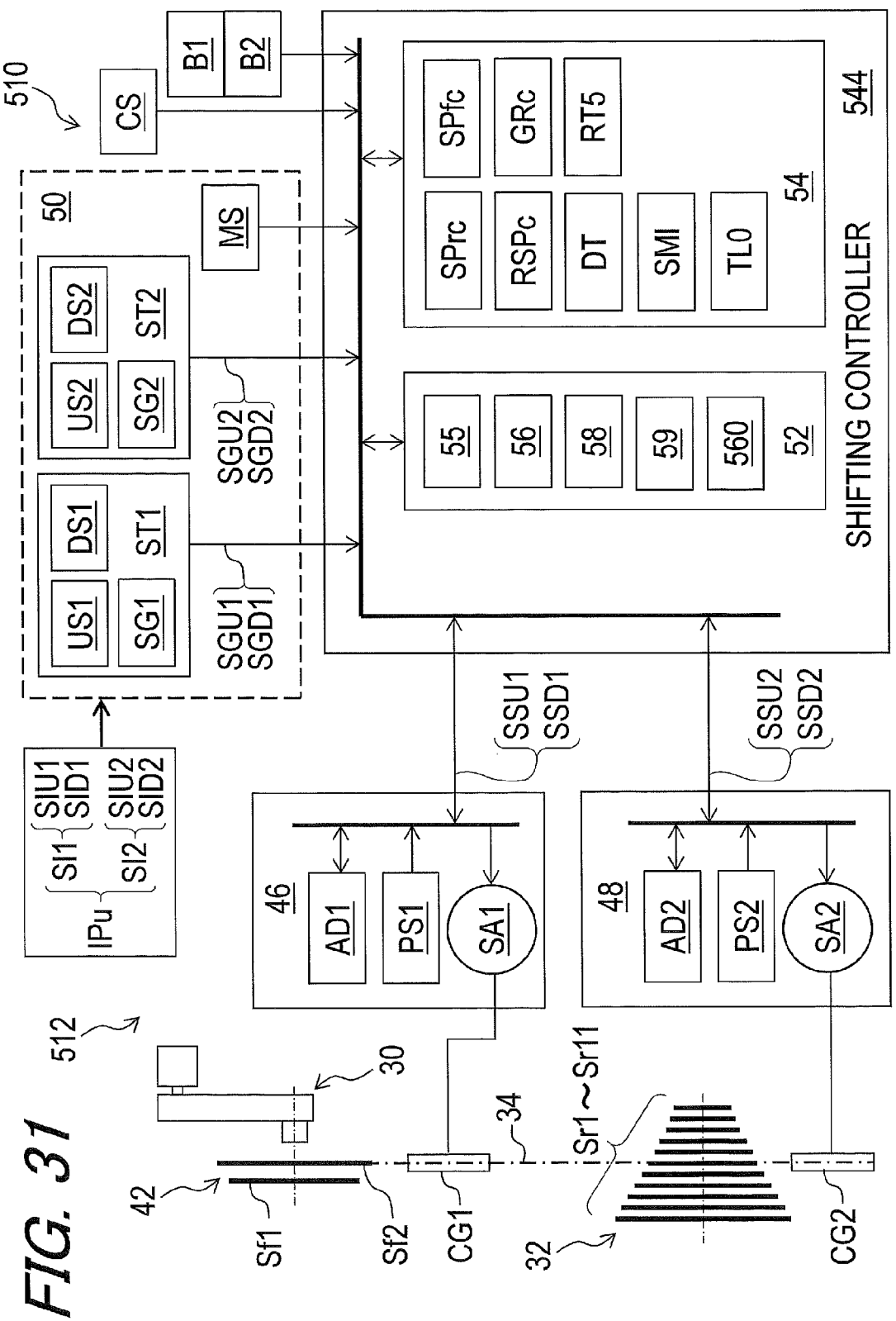
FIG. 31 is a block diagram of a bicycle including a bicycle shifting apparatus in accordance with a fifth embodiment.

As seen in FIGS. 31 and 32, the bicycle shifting apparatus 512 comprises a shifting controller 544. The shifting controller 544 has substantially the same structure as that of the shifting controller 44 in the first embodiment. Unlike the shifting controller 44 in the first embodiment, the shifting controller 544 is configured to set the delay time period DT to be different in accordance with the rear shift position and the current rotational speed. The shifting controller 544 includes a time-period selector 560 configured to select, as the delay time period DT, one of the at least one reference time period based on the current rotational speed. The time-period selector 560 is configured to select a maximum time period T5max as the delay time period DT when the current rotational speed RSPc of the bicycle crank 30 is equal to a first rotational speed RSP1. The time-period selector 560 is configured to select a minimum time period T5 min as the delay time period DT when the current rotational speed RSPc of the bicycle crank 30 is equal to a second rotational speed RSP2. The first rotational speed RSP1 is smaller than the second rotational speed RSP2. The maximum time period T5max is longer than the minimum time period T5 min.

In this embodiment, the time-period selector 560 selects the maximum time period T5max as the delay time period DT when the current rotational speed RSPc is equal to or smaller than a first rotational speed RSP1. The time-period selector 560 selects the minimum time period T5 min as the delay time period DT when the current rotational speed RSPc is equal to or larger than the second rotational speed RSP2. The time-period selector 560 selects a middle time period T5mid as the delay time period DT when the current rotational speed RSPc is equal to or larger than the first rotational speed RSP1 and is smaller than the second rotational speed RSP2. The middle time period T5mid is shorter than the maximum time period T5max and is longer than the minimum time period T5min.

In this embodiment, the storage device 54 stores a reference table RT5 including the shift position ranges SPR51, SPR52, and SPR53. The first shift position range SPR51 includes the low shift position and the second to fourth rear shift positions. The second shift position range SPR52 includes fifth to eighth rear shift positions. The third shift position range SPR53 includes the ninth, tenth, and top shift positions.

The storage device 54 stores a plurality of reference time periods T511, T512, T513, T521, T522, T523, T531, T532, and T533. The maximum time period T5max includes the reference time periods T511, T512, and T513. The middle time period T5mid includes the reference time periods T531, T532, and T533. The minimum time period T5 min includes the reference time periods T521, T522, and T523. The reference time periods T511, T512, and T513 respectively correspond to the plurality of shift position ranges SPR1, SPR2, and SPR3 and are different from each other. The reference time periods T521, T522, and T523 respectively correspond to the plurality of shift position ranges SPR1, SPR2, and SPR3 and are different from each other. The reference time periods T531, T532, and T533 respectively correspond to the plurality of shift position ranges SPR1, SPR2, and SPR3 and are different from each other.

In this embodiment, the reference time period T511 is longer than the reference time period T521. The reference time period T531 is shorter than the reference time period T511 and is longer than the reference time period T521. The reference time period T512 is longer than the reference time period T522. The reference time period T532 is shorter than the reference time period T512 and is longer than the reference time period T522. The reference time period T513 is longer than the reference time period T523. The reference time period T533 is shorter than the reference time period T513 and is longer than the reference time period T523. The reference time periods T511, T512, and T513 can also be referred to as the maximum time period T5max. The reference time periods T521, T522, and T523 can also be referred to as the minimum time period T5 min.

Figure 33:
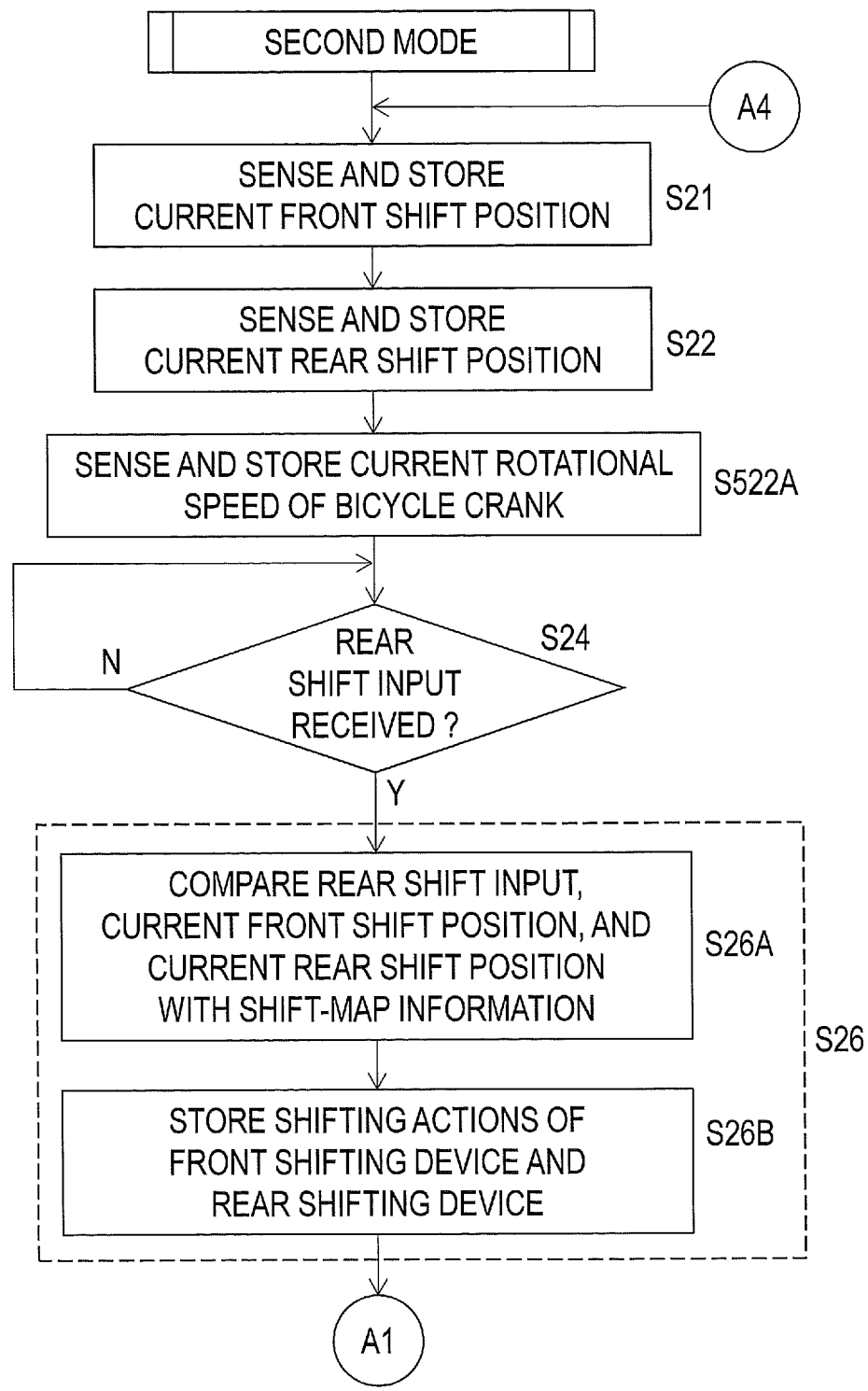
FIG. 33 is a flow chart of operation of the bicycle shifting apparatus illustrated in FIG. 31 (second mode).

As seen in FIG. 33, in the second mode, the current front shift position of the front shifting device 46 is sensed by the front position sensor PS1 and is stored in the storage device 54 of the shifting controller 544 (step S21). The current rear shift position of the rear shifting device 48 is sensed by the rear position sensor PS2 and is stored in the storage device 54 of the shifting controller 544 (step S22). Unlike the bicycle shifting apparatus 12, the current rotational speed of the bicycle crank 30 is sensed by the rotational speed sensor CS, and the current rotational speed sensed by the rotational speed sensor CS is stored in the storage device 54 (step S522A).

The delay time period DT is selected by the time selector 60 from the reference time periods of the reference table RT1 stored in the storage device 54 based on the current rear shift position (step S523). Specifically, the current rear shift position and the current rotational speed are compared with the reference table RT1 by the time selector 60 (step S523A). The reference time period corresponding to the current rear shift position is stored in the storage device 54 by the processor 52 (step S523B). For example, when the current rear shift position is the sixth gear position and the current rotational speed RSPc is smaller than the first rotational speed RSP1, the reference time period T512 is stored in the storage device 54 by the processor 52 as the delay time period DT.

The steps after the step S24 are the same as those of FIGS. 12 to 14 in the first embodiment. Thus, they will not be described and/or illustrated in detail here for the sake of brevity.

Since the above modifications of the second mode from the first embodiment can be applied to the flow charts of the first mode and the third mode shown in FIGS. 11 to 14, 19, and 20, they will not be describe and/or illustrated in detail here for the sake of brevity.

The bicycle shifting apparatus 512 has the following features in addition to the features of the bicycle shifting apparatus 12 in accordance with the first embodiment.

(1) The shifting controller 544 is configured to set the delay time period DT to be different in accordance with the current rear shift position and the current rotational speed. Accordingly, it is possible to adjust the delay time period DT to a preferable value in accordance with a running state of the bicycle 10.

(2) The time-period selector 560 is configured to select the maximum time period T5max as the delay time period DT when the current rotational speed RSPc of the bicycle crank 30 is equal to the first rotational speed RSP1. The time-period selector 560 is configured to select the minimum time period T5 min as the delay time period DT when the current rotational speed RSPc of the bicycle crank 30 is equal to the second rotational speed RSP2. The first rotational speed RSP1 is smaller than the second rotational speed RSP2. The maximum time period T5max is longer than the minimum time period T5 min. Accordingly, it is possible to shorten a total time period for shifting operations of the front shifting device 46 and the rear shifting device 48 compared with a case where the delay time period DT for the first rotational speed RSP1 is equal to the delay time period DT for the second rotational speed RSP2.

Sixth Embodiment

A bicycle 610 including a bicycle shifting apparatus 612 in accordance with a sixth embodiment will be described below referring to FIGS. 34 and 35. The bicycle shifting apparatus 612 has the same structures and/or configurations as those of the bicycle shifting apparatus 12 except for the shifting controller. Thus, elements having substantially the same function as those in the above embodiments will be numbered the same here, and will not be described and/or illustrated again in detail here for the sake of brevity.

Figure 34:
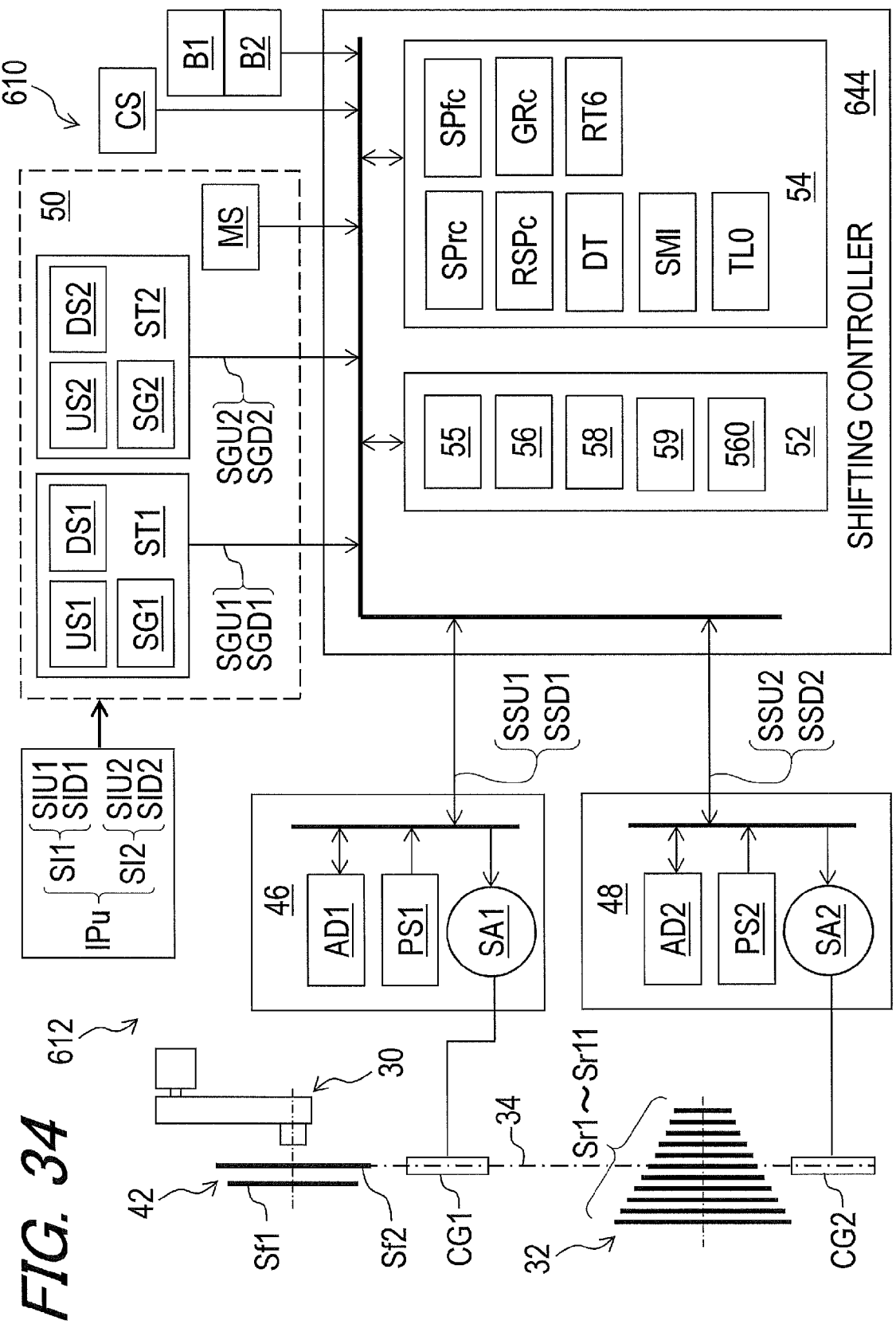
FIG. 34 is a block diagram of a bicycle including a bicycle shifting apparatus in accordance with a sixth embodiment.

As seen in FIGS. 34 and 35, the bicycle shifting apparatus 612 comprises a shifting controller 644. The shifting controller 644 has substantially the same structure as that of the shifting controller 644 in the sixth embodiment. Unlike the shifting controller 44 in the first embodiment, the shifting controller 644 is configured to change the delay time period DT based on the gear ratio and the current rotational speed of the bicycle crank 30.

As seen in FIG. 35, the storage device 54 stores a reference table RT6 including the shift position ranges SPR51, SPR52, and SPR53. The first shift position range SPR51 includes the low shift position and the second to fourth rear shift positions. The second shift position range SPR52 includes fifth to eighth rear shift positions. The third shift position range SPR53 includes the ninth, tenth, and top shift positions. In this embodiment, the shift position ranges SPR51, SPR52, and SPR53 are defined based on the gear ratios instead of the rear shift positions. The shifting controller 644 calculates the gear ratio based on the current front shift position and the current rear shift position. The time-period selector 560 selects the delay time period from among the reference time periods T51, T52, and T53 based on the reference table RT6, the gear ratio, and the current rotational speed of the bicycle crank 30.

With the bicycle shifting apparatus 612, it is possible to obtain substantially the same effects as those of the bicycle shifting apparatus 512 in accordance with the fifth embodiment.

Seventh Embodiment

A bicycle 710 including a bicycle shifting apparatus 712 in accordance with a seventh embodiment will be described below referring to FIG. 36. The bicycle shifting apparatus 712 has the same structures and/or configurations as those of the bicycle shifting apparatus 12 except for the front shifting device and the rear shifting device. Thus, elements having substantially the same function as those in the above embodiments will be numbered the same here, and will not be described and/or illustrated again in detail here for the sake of brevity.

Figure 36:
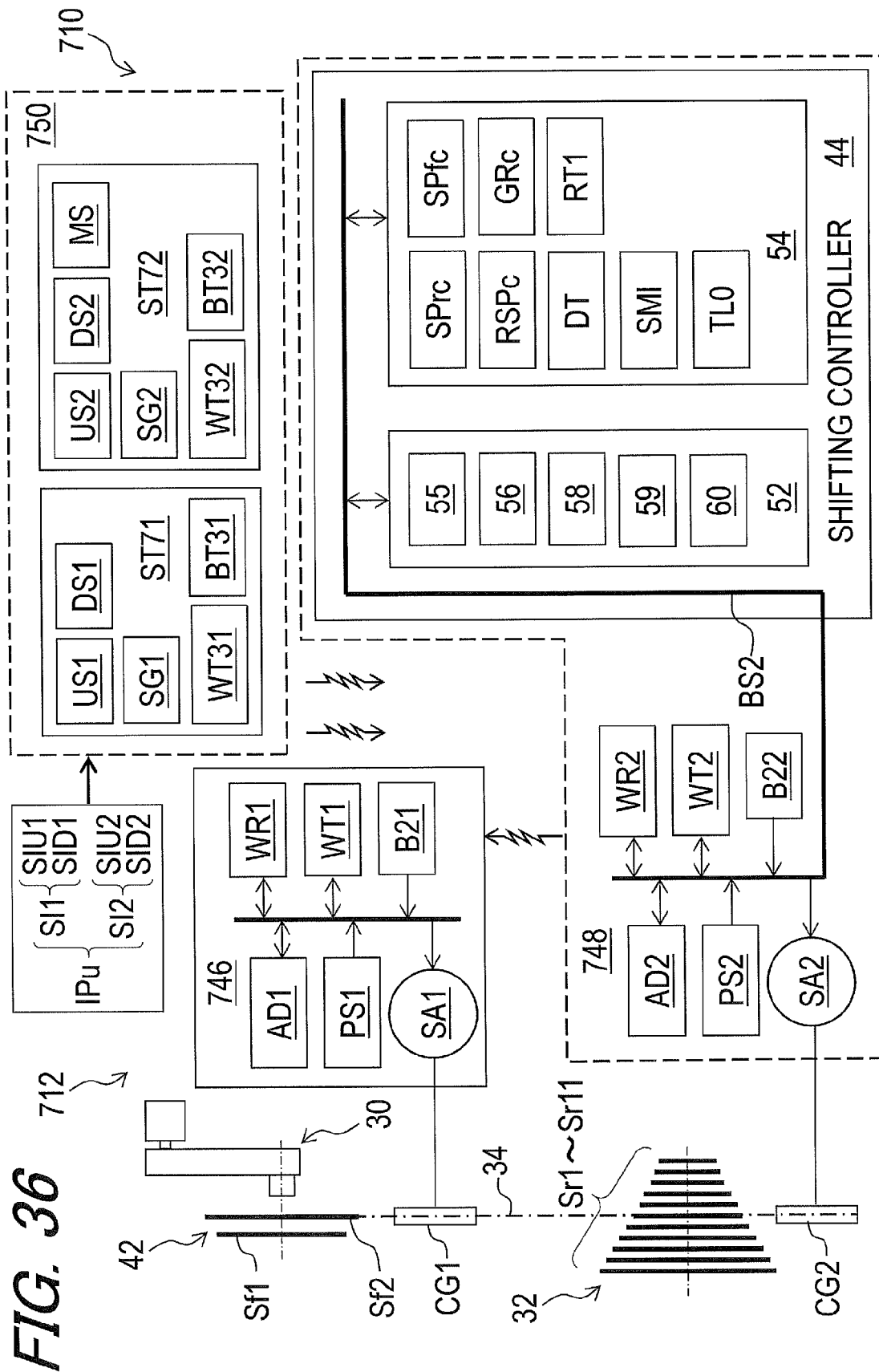
FIG. 36 is a block diagram of a bicycle including a bicycle shifting apparatus in accordance with a seventh embodiment.

As seen in FIG. 36, the bicycle shifting apparatus 712 comprises a front shifting device 746 and a rear shifting device 748. The front shifting device 746 has substantially the same structure as that of the front shifting device 46. The rear shifting device 748 has substantially the same structure as that of the rear shifting device 48.

Unlike the bicycle shifting apparatus 12 in the first embodiment, the shifting controller 44 is provided in the rear shifting device 748. The front shifting device 746 includes a front wireless receiver WR1 and a front wireless transmitter WT1. The rear shifting device 748 includes a rear wireless receiver WR2 and a rear wireless transmitter WT2. The rear wireless receiver WR2 wirelessly receives shifting input signals (e.g., the front upshift input signal SGU1, the front downshift input signal SGD1, the rear upshift input signal SGU2, and the rear downshift input signal SGD2). The rear wireless transmitter WT2 wirelessly transmits the front upshifting signal SSU1 and the front downshifting signal SSD1. The front wireless receiver WR1 wirelessly receives the front upshifting signal SSU1 and the front downshifting signal SSD1 from the rear wireless transmitter WT2. The front wireless transmitter WT1 wirelessly transmits the front shift position to the rear wireless receiver WR2.

The bicycle 710 includes an operating device 750. The operating device 750 includes a first shifter ST71 and a second shifter ST72. The first shifter ST71 has substantially the same structure as that of the first shifter ST1 in the first embodiment. The second shifter ST72 has substantially the same structure as that of the second shifter ST2 in the first embodiment.

Unlike the operating device 50 in the first embodiment, the first shifter ST71 includes a first wireless transmitter WT31 configured to wirelessly transmit the front upshift input signal SGU1 and the front downshift input signal SGD1 to the rear shifting device 748. The second shifter ST72 includes a second wireless transmitter WT32 configured to wirelessly transmit the rear upshift input signal SGU2 and the rear downshift input signal SGD2 to the rear shifting device 748. The first wireless transmitter WT31 is electrically connected to the first signal generator SG1. The second wireless transmitter WT32 is electrically connected to the second signal generator SG2. In this embodiment, the mode selector MS is provided in the second shifter ST72. The mode selector MS is electrically connected to the second signal generator SG2.

The first shifter ST71 includes a first battery BT31 configured to supply electric power to the first signal generator SG1 and the first wireless transmitter WT31. The second shifter ST72 includes a second battery BT32 configured to supply electric power to the second signal generator SG2 and the second wireless transmitter WT32. Examples of the first battery BT31 and the second battery BT32 include a primary battery (e.g., a dry-cell battery) and a secondary battery (e.g., a rechargeable battery such as a rechargeable lithium-ion battery).

The front shifting device 746 includes a front battery BT21 configured to supply electric power to the front wireless receiver WR1, the front wireless transmitter WT1, the front shift actuator SA1, the front actuator driver AD1, and the front position sensor PS1. The rear shifting device 748 includes a rear battery BT22 configured to supply electric power to the shifting controller 44, the rear wireless receiver WR2, the rear wireless transmitter WT2, the rear shift actuator SA2, the rear actuator driver AD2, and the rear position sensor PS2. The shifting controller 44 is electrically connected to the rear wireless receiver WR2, the rear wireless transmitter WT2, the rear shift actuator SA2, the rear actuator driver AD2, the rear position sensor PS2, and the rear battery BT22 via a bus BS2. The shifting controller 44 controls the front shifting device 746 via the rear wireless transmitter WT2 and the rear wireless receiver WR2.

The method of controlling the front shifting device 746 and the rear shifting device 748 is substantially the same as that of the first embodiment. Thus, it will not be described and/or illustrated in detail here for the sake of brevity.

With the bicycle shifting apparatus 712, it is possible to obtain substantially the same effects as those of the bicycle shifting apparatus 12 in accordance with the first embodiment.

Eighth Embodiment

A bicycle 810 including a bicycle shifting apparatus 812 in accordance with an eighth embodiment will be described below referring to FIGS. 37 to 39. The bicycle shifting apparatus 812 has the same structures and/or configurations as those of the bicycle shifting apparatus 212 except for the rear shifting device. Thus, elements having substantially the same function as those in the first embodiment will be numbered the same here, and will not be described and/or illustrated again in detail here for the sake of brevity.

Figure 37:
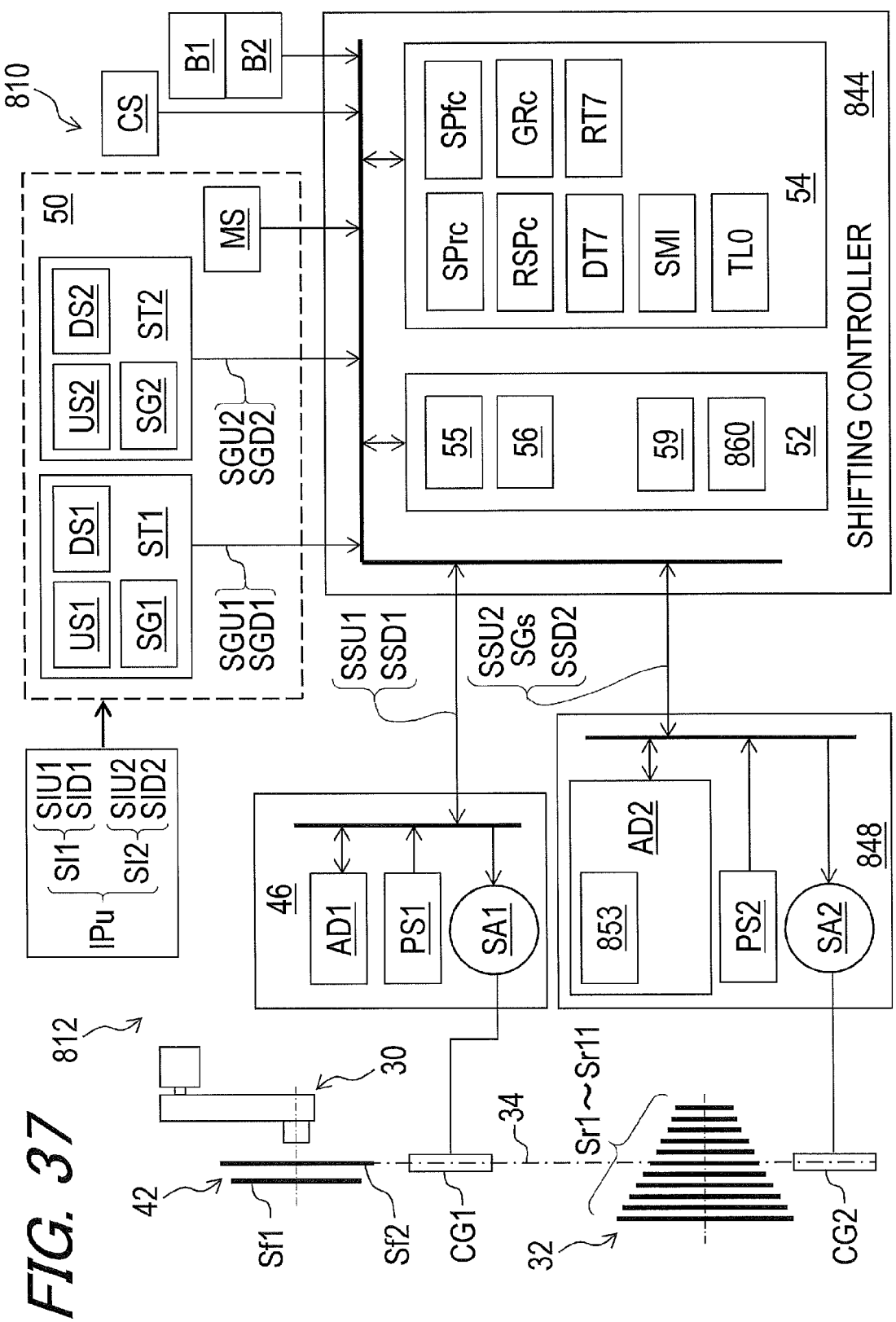
FIG. 37 is a block diagram of a bicycle including a bicycle shifting apparatus in accordance with an eighth embodiment.

As seen in FIG. 37, the bicycle shifting apparatus 812 comprises a shifting controller 844 and a rear shifting device 848. The shifting controller 844 has substantially the same structure as that of the shifting controller 244 in the second embodiment. The shifting controller 844 is configured to control one of the front shifting device 46 and the rear shifting device 848 to change one of the front shift position and the rear shift position in response to the user input IPu. The shifting controller 844 is configured to control the other of the front shifting device 46 and the rear shifting device 848 to change the other of the front shift position and the rear shift position with a delay time period DT7 in conjunction with the one of the front shifting device 46 and the rear shifting device 848 in response to the user input IPu.

The shifting controller 844 is configured to change the delay time period DT7 based on at least one of the gear ratio, the rear shift position, and the current rotational speed of the bicycle crank 30. In this embodiment, the shifting controller 844 changes the delay time period DT7 based on the current rear shift position.

Unlike the shifting controller 244, however, the shifting controller includes a speed selector 860. The speed selector 860 selects a driving speed of the rear chain guide CG2 of the rear shifting device 848 to change the delay time period DT7. The speed selector 860 selects the driving speed from a reference table RT7 shown in FIG. 38 based on the current rear shift position, for example. The shift signal generator 56 generates the rear upshifting signal SSU2 including a speed signal SGs indicating a selected driving speed.

As seen in FIG. 38, the reference table RT7 includes a first speed V21, a second speed V22, and a third speed V23. The first speed V21 is higher than the second speed V22 and the third speed V23. The third speed V23 is lower than the first speed V21 and the second speed V22. The second speed V22 is lower than the first speed V21 and higher than the third speed V23.

As seen in FIG. 37, the rear shifting device 848 has substantially the same structures as those of the rear shifting device 48 of the bicycle shifting apparatus 12 in the first embodiment. Unlike the rear shifting device 48, however, the rear shifting device 848 provides the delay time period DT. The rear shifting device 848 includes a speed detector 853. The speed detector 853 detects the selected driving speed based on the speed signal SGs included in the rear upshifting signal SSU2. The rear actuator driver AD2 controls the rear shift actuator SA2 to move the rear chain guide CG2 at the selected driving speed detected by the speed detector 848.

Figure 39:
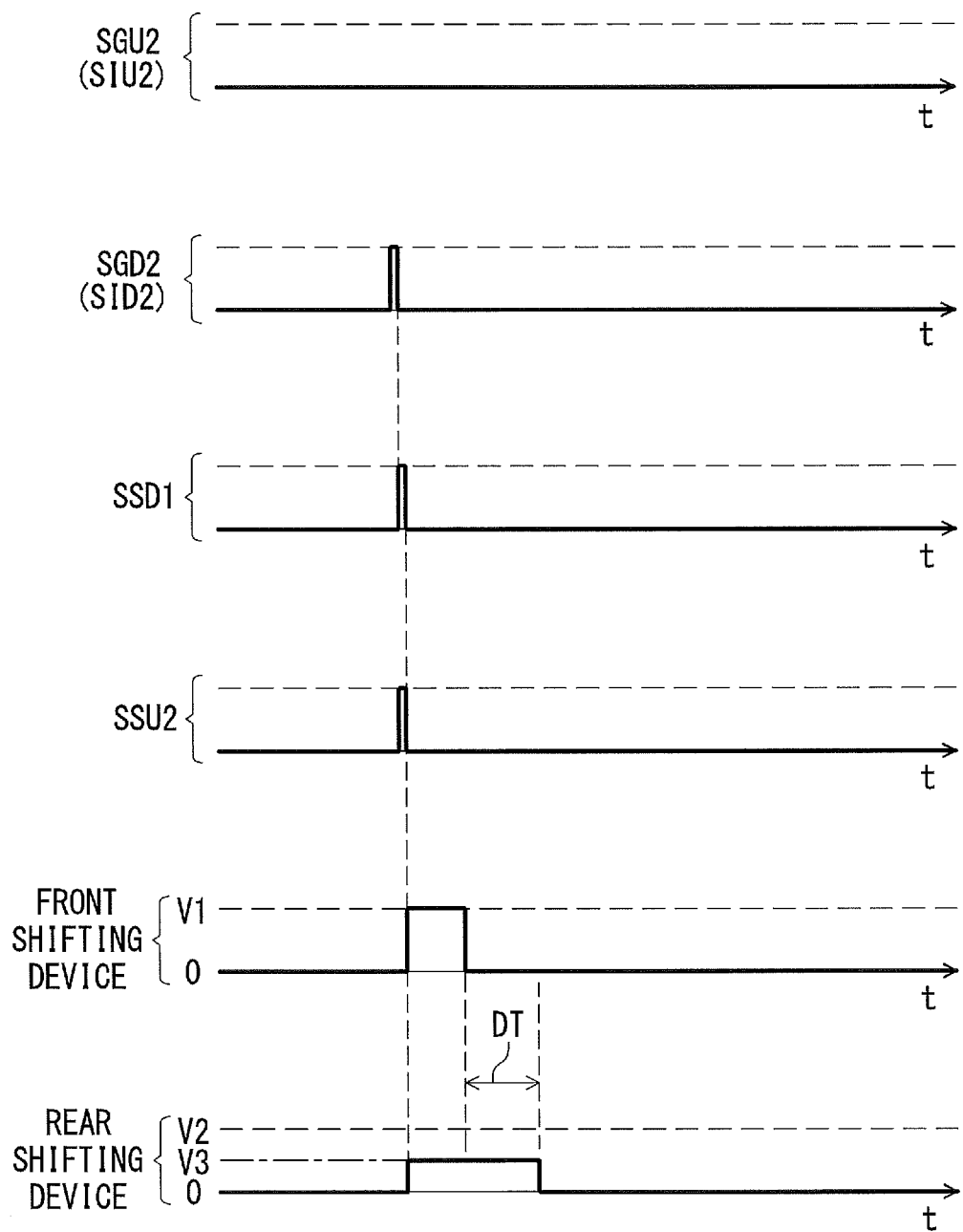
FIG. 39 is a timing chart of the bicycle shifting apparatus illustrated in FIG. 38 (second mode).

For example, as seen in FIG. 39, the rear actuator driver AD2 controls the rear shift actuator SA2 to move the rear chain guide CG2 at the selected driving speed V3. The selected driving speed V3 is lower than the normal driving speed V2 of the rear chain guide CG2. Thus, the shifting controller 844 controls the rear shifting device 848 to upshift with the delay time period DT7 in conjunction with the front shifting device 46 in response to the rear upshift input SIU2. In this embodiment, the delay time period DT7 is defined from a timing at which the front shift actuator SA1 stops the front chain guide CG1 to a timing at which the rear shift actuator SA2 stops the rear chain guide CG2.

Figure 40:
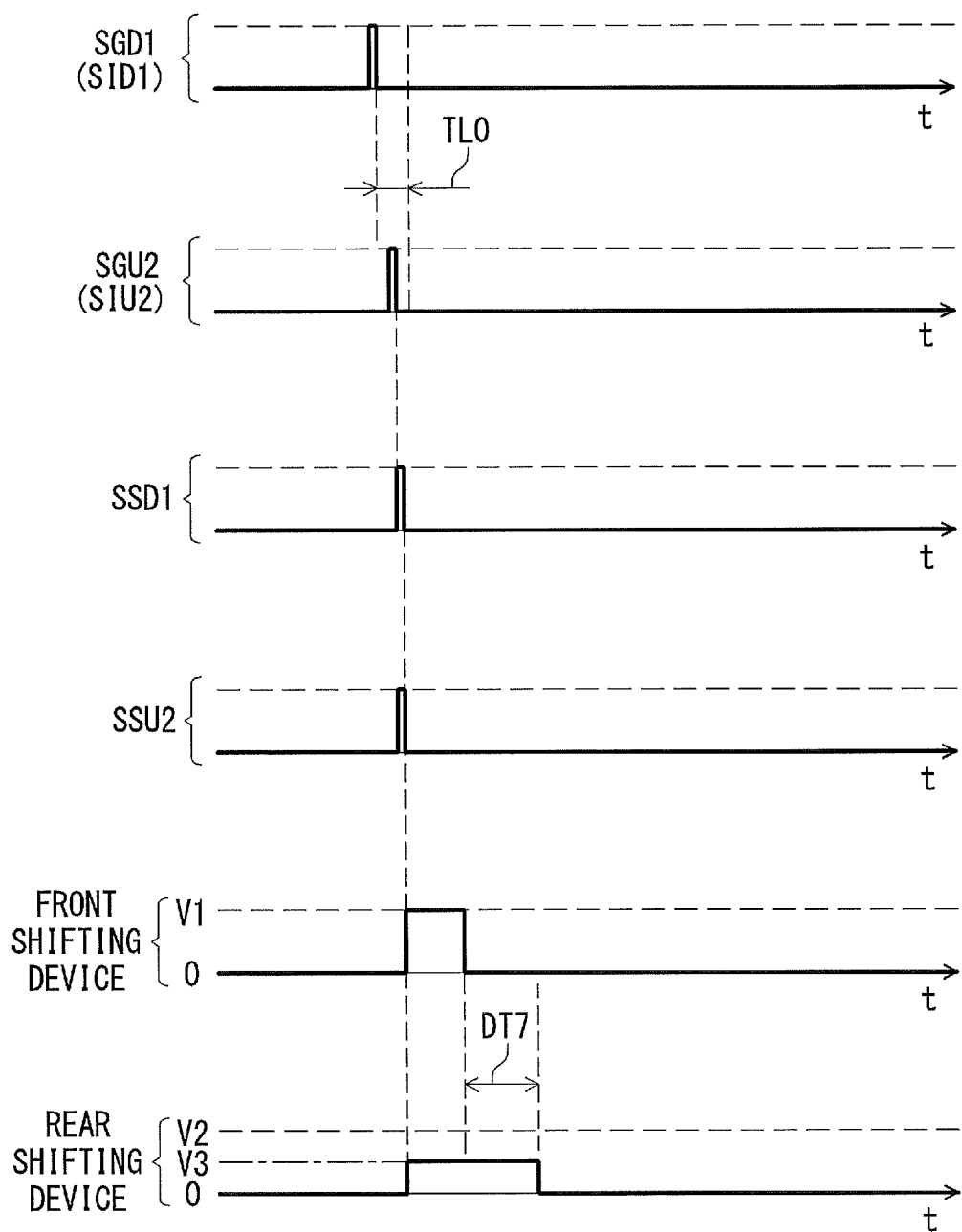
FIGS. 40 and 41 are timing charts of the bicycle shifting apparatus illustrated in FIG. 38 (first mode).
Figure 41:
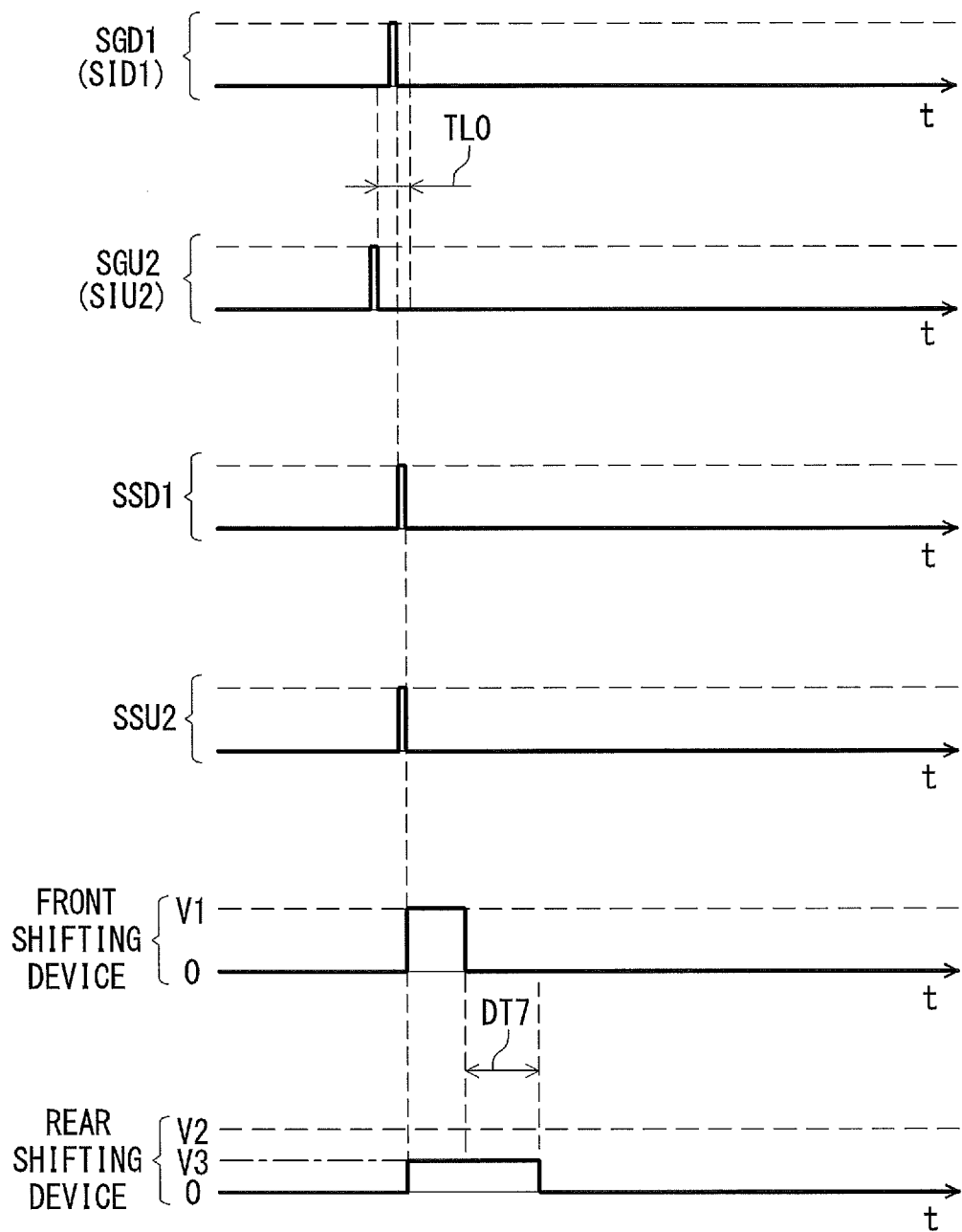

As seen in FIGS. 40 and 41, in the first mode, the shifting controller 844 is configured to control the front shifting device 46 to change the front shift position in response to the front shift input SI1. The shifting controller 844 is configured to control the rear shifting device 848 to change the rear shift position with the delay time period DT7 in conjunction with the front shifting device 46 in response to the rear shift input SI2 when the shifting controller 844 receives the front shift input SI1 and the rear shift input SI2 within the predetermined time lag TL0. In this embodiment, in the first mode, the rear actuator driver AD2 controls the rear shift actuator SA2 to move the rear chain guide CG2 at the selected driving speed V3. The same can be applied to the third mode.

With the bicycle shifting apparatus 812, it is possible to obtain substantially the same effects as those of the bicycle shifting apparatus 12 in accordance with the first embodiment.

Figure 42:
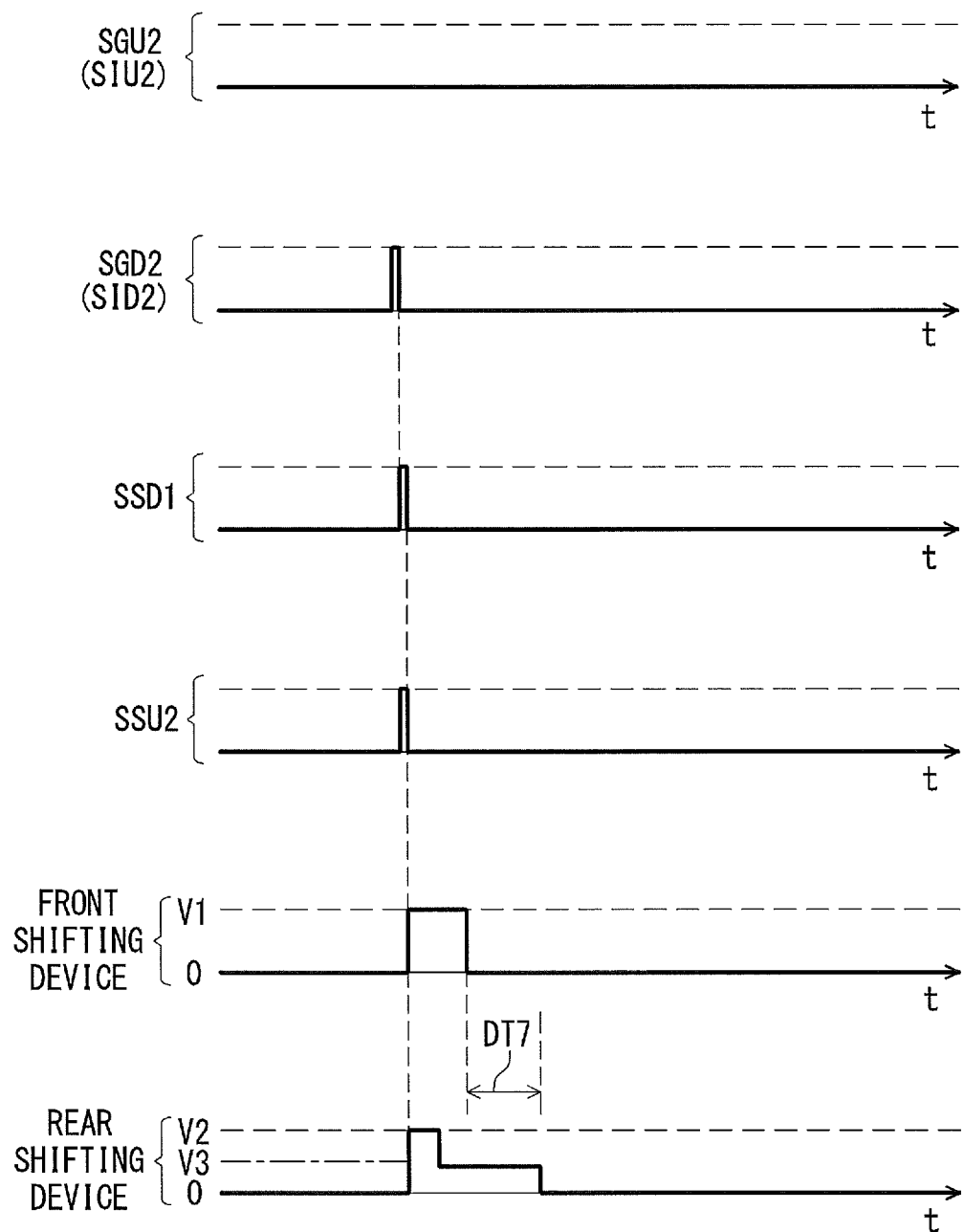
FIG. 42 is a timing chart of the bicycle shifting apparatus in accordance with a modified embodiment (second mode).
Figure 43:
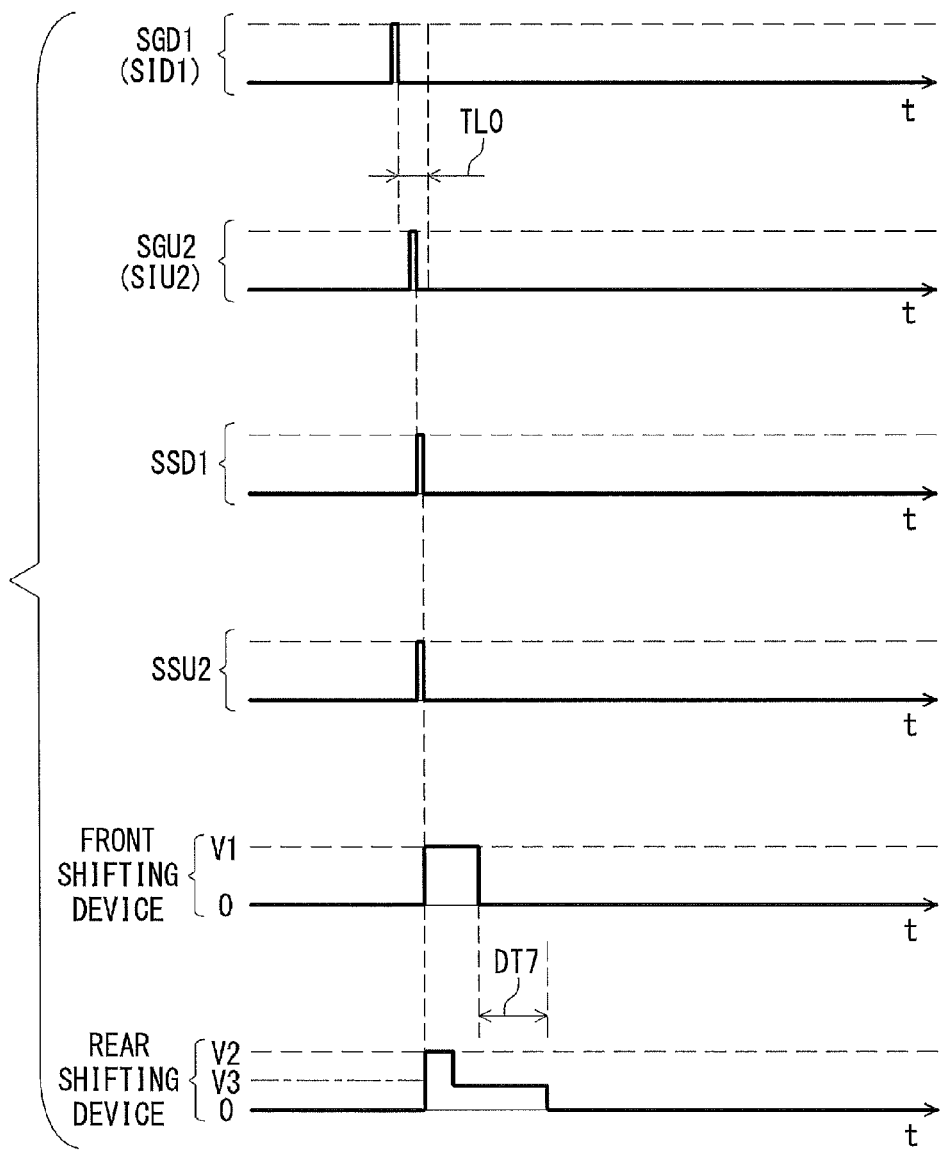
FIGS. 43 and 44 are timing charts of the bicycle shifting apparatus in accordance with the modified embodiment (first mode).
Figure 44:
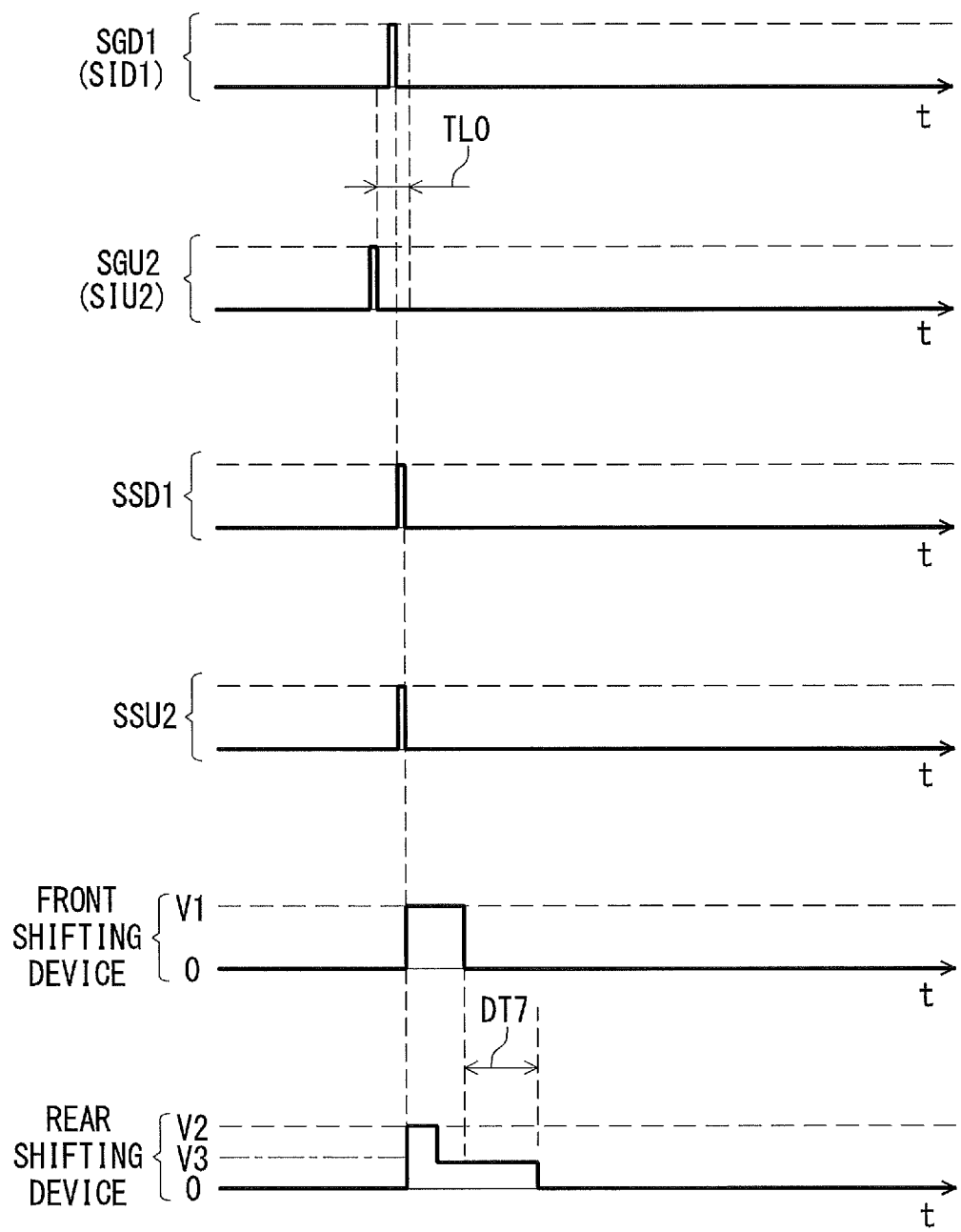
Figure 45:
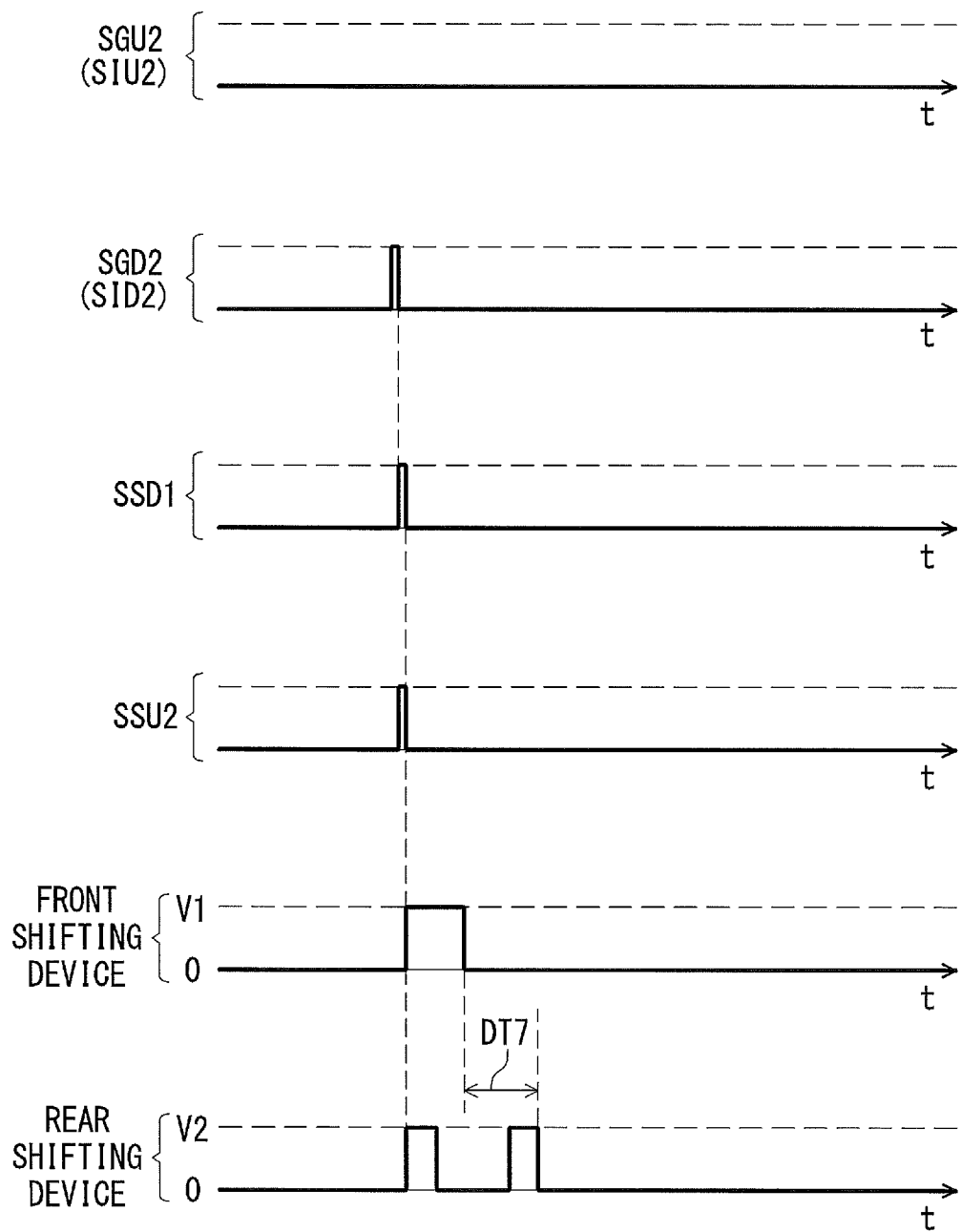
FIG. 45 is a timing chart of the bicycle shifting apparatus in accordance with an additional modified embodiment (second mode).

As seen in FIGS. 42 to 47, the driving speed of the rear chain guide CG2 can be changed between zero and the normal driving speed V2. FIGS. 42 and 45 show timing charts of the bicycle shifting apparatus at the second conjunction point JP2 of the shift-map information in the second mode. FIGS. 43, 44, 46, and 47 show timing charts of the bicycle shifting apparatus in the first mode. The same modifications can be applied to the third mode.

Figure 46:
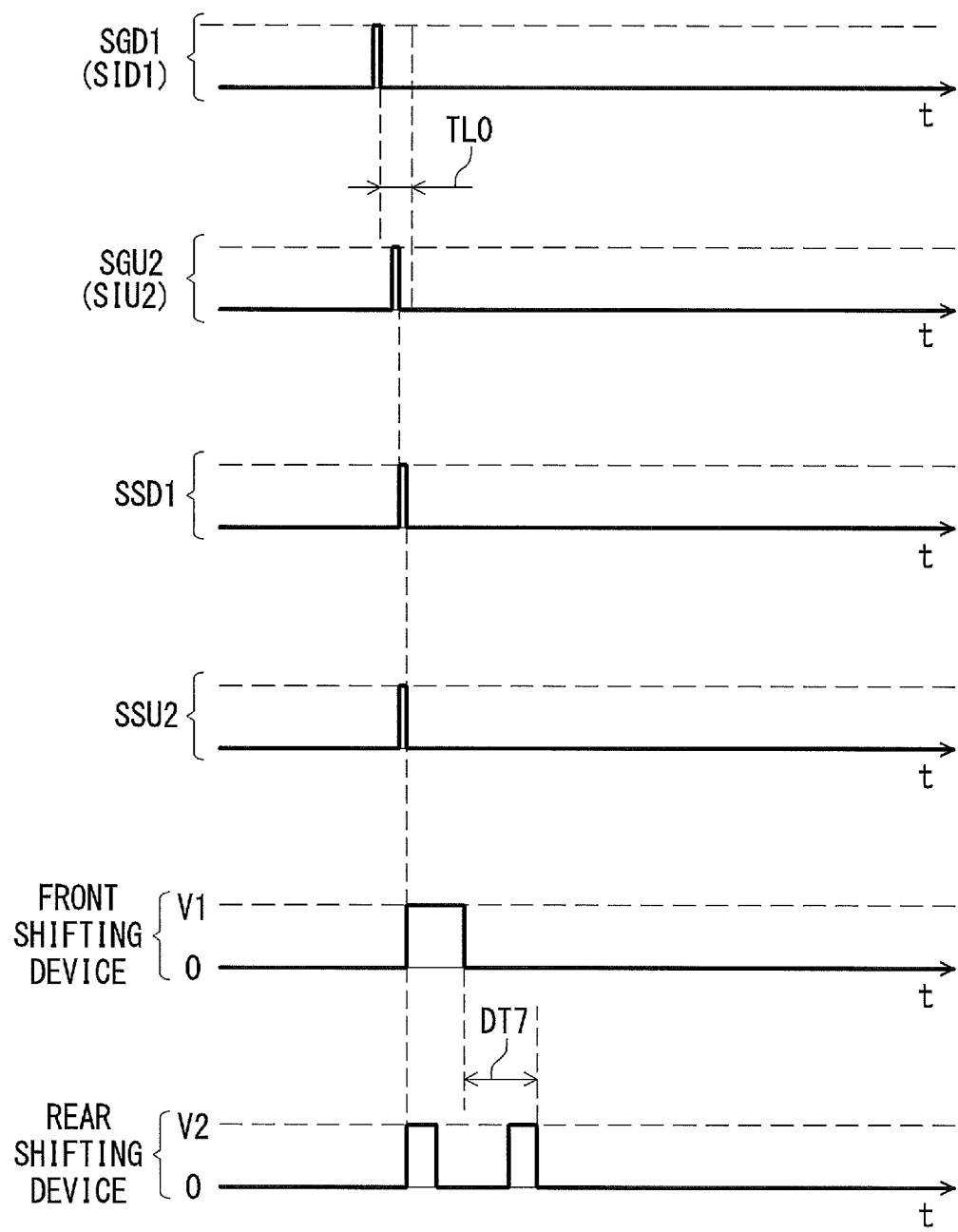
FIGS. 46 and 47 are timing charts of the bicycle shifting apparatus in accordance with the additional modified embodiment (first mode).
Figure 47:
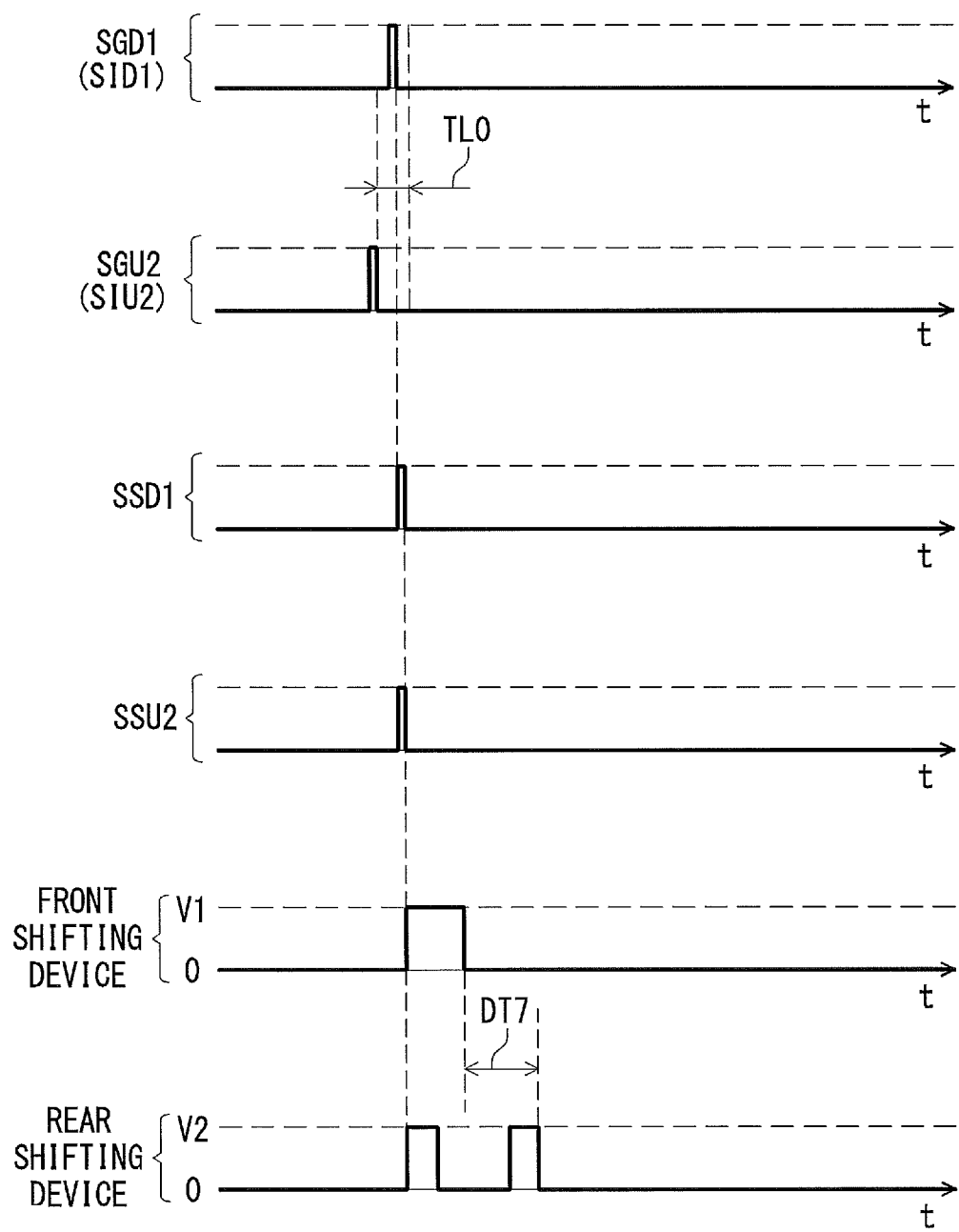

As seen in FIGS. 42 to 44, the rear shifting device 848 starts to move the rear chain guide CG2 at the driving speed V2 and changes the driving speed V2 to the selected driving speed V3. As seen in FIGS. 45 to 47, the rear shifting device 848 starts to move the rear chain guide CG2 at the driving speed V2, temporarily stops the rear chain guide CG2, and moves the rear chain guide CG2 at the driving speed V2 again. With these modified embodiments, it is possible to obtain substantially the same effects as those of the bicycle shifting apparatus 812 in accordance with the eighth embodiment.

It will be apparent to those skilled in the bicycle field from the present disclosure that the above embodiments can be at least partly combined with each other.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle shifting apparatus comprising:
a shifting controller configured to control a front shifting device and a rear shifting device to change a gear ratio defined based on a front shift position of the front shifting device and a rear shift position of the rear shifting device,
the shifting controller being configured to control one of the front shifting device and the rear shifting device to change one of the front shift position and the rear shift position in response to a user input,
the shifting controller being configured to control the other of the front shifting device and the rear shifting device to change the other of the front shift position and the rear shift position with a delay time period in conjunction with the one of the front shifting device and the rear shifting device in response to the user input, and
the shifting controller being configured to change the delay time period based on at least one of the gear ratio, the rear shift position, and a current rotational speed of a bicycle crank.

2. The bicycle shifting apparatus according to claim 1, wherein
the shifting controller includes a storage device configured to store at least one reference time period as the delay time period, and
the at least one reference time period is defined based on at least one of the gear ratio, the rear shift position, and a rotational speed of the bicycle crank.

3. The bicycle shifting apparatus according to claim 2, wherein
the shifting controller includes a time-period selector configured to select, as the delay time period, one of the at least one reference time period based on the current rotational speed of the bicycle crank.

4. The bicycle shifting apparatus according to claim 2, wherein the at least one reference time period includes a plurality of reference time periods, the storage device is configured to store a first reference table and a second reference table, the first reference table includes a first reference time period of the plurality of reference time periods, the second reference table includes a second reference time period of the plurality of reference time periods, and the second reference time period is different from the first reference time period.

5. The bicycle shifting apparatus according to claim 2, wherein the rear shifting device has a first shift position range and a second shift position range, at least one of the first shift position range and the second shift position range includes a plurality of shift positions, the at least one reference time period includes
a first reference time period configured to be set based on the first shift position range, and
a second reference time period configured to be set based on the second shift position range, and the second reference time period is different from the first reference time period.

6. The bicycle shifting apparatus according to claim 2, wherein the rear shifting device has a first shift position and a second shift position as the rear shift position, the at least one reference time period includes
a first reference time period configured to be set based on the first shift position, and
a second reference time period configured to be set based on the second shift position, and the second reference time period is different from the first reference time period.

7. The bicycle shifting apparatus according to claim 1, wherein the shifting controller is configured to output a first shifting signal to the front shifting device to change the front shift position in response to the user input, and the shifting controller is configured to output a second shifting signal to the rear shifting device to change the rear shift position in response to the user input after a lapse of the delay time period from a timing at which the shifting controller outputs the first shifting signal.

8. The bicycle shifting apparatus according to claim 7, wherein the front shifting device is configured to change the front shift position to downshift in response to the first shifting signal, and the rear shifting device is configured to change the rear shift position to upshift in response to the second shifting signal.

9. The bicycle shifting apparatus according to claim 1, wherein the shifting controller is configured to output a first shifting signal to the front shifting device to change the front shift position in response to the user input, the shifting controller is configured to output a second shifting signal to the rear shifting device to change the rear shift position in response to the user input, and the second shifting signal includes a delay-time signal indicating the delay time period.

10. The bicycle shifting apparatus according to claim 9, wherein the rear shifting device is configured to change the rear shift position after a lapse of the delay time period indicated by the delay-time signal from a timing at which the rear shifting device receives the second shifting signal.

11. The bicycle shifting apparatus according to claim 9, wherein the front shifting device is configured to change the front shift position to downshift in response to the first shifting signal, and the rear shifting device is configured to change the rear shift position to upshift after a lapse of the delay time period indicated by the delay-time signal from a timing at which the rear shifting device receives the second shifting signal.

12. The bicycle shifting apparatus according to claim 1, wherein the rear shifting device has a low gear position and a top gear position as the rear shift position, the shifting controller is configured to set a minimum time period as the delay time period based on the low gear position, the shifting controller is configured to set a maximum time period as the delay time period based on the top gear position, and the maximum time period is longer than the minimum time period.

13. The bicycle shifting apparatus according to claim 1, wherein the shifting controller includes a time-period selector configured to select a maximum time period as the delay time period when the current rotational speed of the bicycle crank is equal to a first rotational speed, the time-period selector is configured to select a minimum time period as the delay time period when the current rotational speed of the bicycle crank is equal to a second rotational speed, the first rotational speed is smaller than the second rotational speed, and the maximum time period is longer than the minimum time period.

14. The bicycle shifting apparatus according to claim 1, wherein the shifting controller is configured to set the delay time period to be different in accordance with the rear shift position and the current rotational speed.

15. The bicycle shifting apparatus according to claim 1, wherein the shifting controller includes a storage device configured to store shift-map information, the shift-map information includes combinations of
the front shift position of the front shifting device,
the rear shift position of the rear shifting device, and
a shifting action to be performed at the front shift position and the rear shift position in response to a single input command defined as the user input, and the shifting controller is configured to control the front shifting device and the rear shifting device based on the shift-map information in response to the single input command.

16. The bicycle shifting apparatus according to claim 15, wherein the shifting controller is configured to control one of the front shifting device and the rear shifting device to change one of the front shift position and the rear shift position in response to the single input command based on at least one first combination defined in the shift-map information, and the shifting controller is configured to control the other of the front shifting device and the rear shifting device to change the other of the front shift position and the rear shift position with the delay time period in conjunction with the one of the front shifting device and the rear shifting device in response to the single input command based on the at least one first combination defined in the shift-map information.

17. The bicycle shifting apparatus according to claim 16, wherein the shifting controller is configured to control the front shifting device and the rear shifting device to change only one of the front shift position and the rear shift position in response to the single input command based on at least one second combination defined in the shift-map information, and the at least one second combination is different from the at least one first combination.

18. The bicycle shifting apparatus according to claim 1, wherein the shifting controller is configured to control the front shifting device to change the front shift position in response to a front shift input, and the shifting controller is configured to control the rear shifting device to change the rear shift position with the delay time period in conjunction with the front shifting device in response to the front shift input.

19. A bicycle shifting apparatus comprising:

a shifting controller configured to control a front shifting device and a rear shifting device to change a gear ratio defined based on a front shift position of the front shifting device and a rear shift position of the rear shifting device, the shifting controller being configured to control the front shifting device to change the front shift position in response to a front shift input, the shifting controller being configured to control the rear shifting device to change the rear shift position with a delay time period in conjunction with the front shifting device in response to a rear shift input when the shifting controller receives the front shift input and the rear shift input within a predetermined time lag, and the shifting controller being configured to change the delay time period based on at least one of the gear ratio, the rear shift position, and a current rotational speed of a bicycle crank.

20. A method of controlling a front shifting device and a rear shifting device, comprising:

controlling, by a shifting controller, one of the front shifting device and the rear shifting device to change one of a front shift position of the front shifting device and a rear shift position of the rear shifting device in response to user input;

controlling, by the shifting controller, the other of the front shifting device and the rear shifting device to change the other of the front shift position and the rear shift position with a delay time period in conjunction with the one of the front shifting device and the rear shifting device in response to the user input; and changing the delay time period based on at least one of a gear ratio, the rear shift position, and a current rotational speed of a bicycle crank.

21. A method of controlling a front shifting device and a rear shifting device, comprising:

controlling, by a shifting controller, the front shifting device to change a front shift position in response to a front shift input;

controlling, by the shifting controller, the rear shifting device to change a rear shift position with a delay time period in conjunction with the front shifting device in response to the rear shift input when the shifting controller receives the front shift input and the rear shift input within a predetermined time lag; and changing the delay time period based on at least one of a gear ratio, the rear shift position, and a current rotational speed of a bicycle crank.

* * * * *